US012672065B2

(12) United States Patent     (10) Patent No.:     US 12,672,065 B2
Soldati et al.                    (45) Date of Patent:     Jun. 30, 2026

(54) COORDINATION OF ENERGY METRIC REPORTING

(71) Applicant: Telefonaktiebolaget LM Ericsson (publ), Stockholm (SE)

(72) Inventors: Pablo Soldati, Solna (SE); Luca Lunardi, Genoa (IT); Reem Karaki, Aachen (DE); Henrik Rydén, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 312 days.

(21) Appl. No.: 18/288,792

(22) PCT Filed: Apr. 29, 2022

(86) PCT No.: PCT/EP2022/061567
§ 371 (c)(1),
(2) Date: Oct. 27, 2023

(87) PCT Pub. No.: WO2022/229430
PCT Pub. Date: Nov. 3, 2022

(65) Prior Publication Data
US 2025/0081101 A1     Mar. 6, 2025

Related U.S. Application Data

(60) Provisional application No. 63/182,168, filed on Apr. 30, 2021, provisional application No. 63/181,988, (Continued)

(51) Int. Cl.
H04W 52/02     (2009.01)
H04W 24/10     (2009.01)
H04W 36/00     (2009.01)

(52) U.S. Cl.
CPC ....... H04W 52/0229 (2013.01); H04W 24/10 (2013.01); H04W 36/0066 (2013.01)

(58) Field of Classification Search
CPC ................. Y02D 30/70; H04W 52/02; H04W 52/0209; H04W 52/0212; H04W 52/0219;
(Continued)

(56) References Cited

U.S. PATENT DOCUMENTS

| | | | |
|---|---|---|---|
| 2016/0198416 A1 | 7/2016 | Li et al. | |
| 2021/0392467 A1* | 12/2021 | Kim ...................... | H04W 76/40 |
| 2022/0039046 A1* | 2/2022 | Ianev .................... | H04W 60/00 |
| 2022/0322418 A1* | 10/2022 | Kim ...................... | H04W 28/18 |
| 2023/0143942 A1* | 5/2023 | Wu ................... | H04W 36/0055 |
| | | | 370/311 |

(Continued)

FOREIGN PATENT DOCUMENTS

| | | | | |
|---|---|---|---|---|
| CN | 111050384 A * | 4/2020 | ............ | H04W 24/08 |
| WO | 2020/066890 A1 | 4/2020 | | |
| WO | WO-2022197492 A1 * | 9/2022 | ........ | H04W 52/0216 |

OTHER PUBLICATIONS

Machine Translation of CN-111050384-A (Year: 2020).*
(Continued)

*Primary Examiner* — Paul H. Masur
(74) *Attorney, Agent, or Firm* — Weisberg I.P. Law, P.A.

(57)     ABSTRACT

A method (2300) performed by a first network node (901) for coordinating with a second network node (902) with respect to a user equipment, UE, energy state assistance information, UE-ESAI, configuration for a UE (900) or a group of UEs currently being served by the first network node. The method includes generating (s2302) a first coordination message. The method also includes transmitting (s2304) the first coordination message to the second network node. The first coordination message comprises information related to configuring the UE or the group of UEs to store and/or report UE-ESAI, and the UE-ESAI comprises a measured or estimated first energy metric.

19 Claims, 41 Drawing Sheets

Related U.S. Application Data filed on Apr. 30, 2021, provisional application No. 63/182,248, filed on Apr. 30, 2021.

(58) Field of Classification Search
  CPC ......... H04W 52/0222; H04W 52/0225; H04W 52/0229; H04W 24/10; H04W 36/0005; H04W 36/0055; H04W 36/0066
  See application file for complete search history.

(56) References Cited

U.S. PATENT DOCUMENTS

| | | | |
|---|---|---|---|
| 2023/0217368 A1* | 7/2023 | Du | H04B 17/327 370/311 |
| 2023/0308949 A1* | 9/2023 | Centonza | H04W 28/0942 |

OTHER PUBLICATIONS

Merriam-Webster, "when", definition, retrieved Nov. 5, 2025 (Year: 2025).*
International Search Report and Written Opinion issued in International Application No. PCT/EP2022/061567 dated Aug. 16, 2022 (10 pages).
ETSI TS 138 423 V16.5.0 (Apr. 2021) (459 pages).
3GPP TS 36.300 V16.5.0 (Mar. 2021) (391 pages).
3GPP TS 38.300 V16.5.0 (Mar. 2021) (151 pages).
3GPP TS 36.423 V16.5.0 (Apr. 2021) (500 pages).
3GPP TS 38.401 V15.4.0 (Dec. 2018) (40 pages).
3GPP TS 38.314 V0.1.0 (Apr. 2020) (20 pages).
3GPP TS 38.331 V16.4.1 (Mar. 2021) (949 pages).
3GPP TS 38.306 V16.4.0 (Mar. 2021) (151 pages).

* cited by examiner

2300 s2302 generating a first coordination message s2304 transmitting the first coordination message to the second network node, wherein the first coordination message comprises information related to configuring the UE or the group of UEs to store and/or report UE-ESAI, and UE-ESAI comprises a measured or estimated first energy metric

2400 s2402 receiving a first coordination message s2404 processing the first coordination message, wherein the first coordination message comprises information related to configuring the UE or the group of UEs to store and/or report UE-ESAI, and UE-ESAI comprises a measured or estimated first energy metric

2500 s2502

Figure 25:
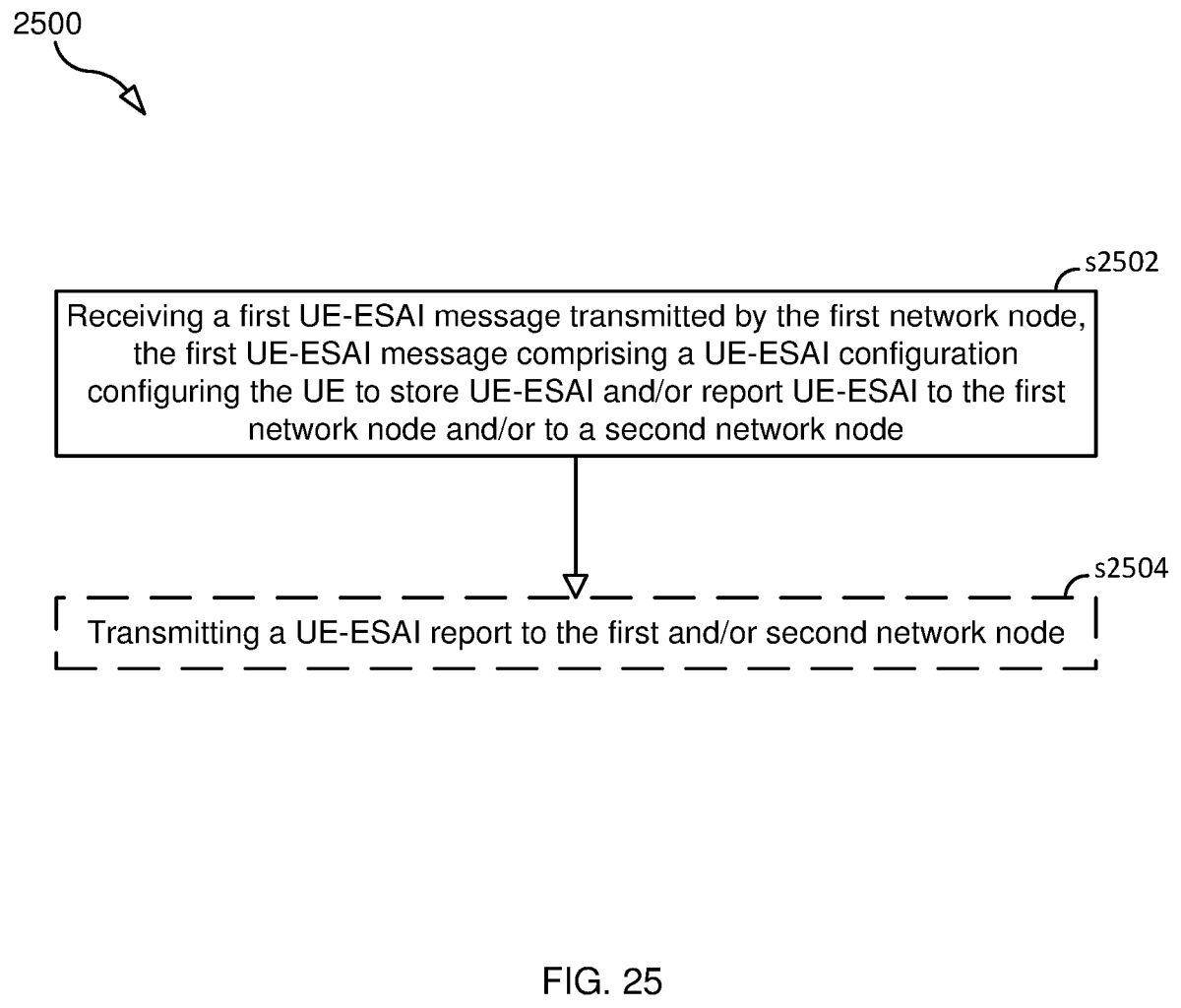

Receiving a first UE-ESAI message transmitted by the first network node, the first UE-ESAI message comprising a UE-ESAI configuration configuring the UE to store UE-ESAI and/or report UE-ESAI to the first network node and/or to a second network node s2504

Transmitting a UE-ESAI report to the first and/or second network node

A network node (typically a RAN node) acquiring capability of a wireless terminal concerning the collection of UE-ESAI s2904

A network node (typically a RAN node) configuring a wireless terminal or a group of wireless terminals for collecting, storing, and/or reporting UE-ESAI s2906

A network node receiving from wireless terminal(s) report(s) containing UE-ESAI s3002

A wireless terminal exchanging with a network node capabilities concerning collection of UE-ESAI s3004

The wireless terminal receiving from a network node UE-ESAI configuration pertaining to collection, storing, and/or reporting of UE-ESAI s3006

The wireless terminal reporting to a network node UE-ESAI reports containing power and/or energy related metrics

3100

3200 s3202

(i) Transmitting to a user equipment, UE or (ii) broadcasting a first message s3204

Receiving a second message comprising UE-ESAI

4100A

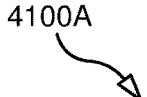

> receiving at the first node a first message transmitted by a second node, wherein the first node and the second node are in a communication network that serves one or more user equipments (UEs), and wherein the first message comprises one or more UE-related energy state assistance information (UE-ESAI), each UE-ESAI being associated with a UE; and   ⌐s4102

⌐s4104

> optimizing one or more of (i) an energy savings configuration for one or more UEs of the UEs associated with the one or more UE-ESAI; and (ii) an energy savings configuration for the first node, wherein the optimizing is based on the one or more UE-ESAI.

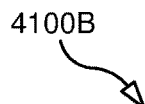

> transmitting to a first node a first message, wherein the first node and the second node are in a communication network that serves one or more user equipments (UEs), and wherein the first message comprises one or more UE-related energy state assistance information (UE-ESAI), each UE-ESAI being associated with a UE.   ⌐s4106

FIG. 41B

COORDINATION OF ENERGY METRIC REPORTING

CROSS REFERENCE TO RELATED APPLICATIONS

This application is a 35 U.S.C. § 371 National Stage of International Patent Application No. PCT/EP2022/061567, filed 2022 Apr. 29, which claims priority to the following three U.S. Provisional Patent Applications: application No. 63/181,988, filed 2021 Apr. 30, application No. 63/182,168, filed 2021 Apr. 30, and application No. 63/182,248 filed 2021 Apr. 30. The above-identified applications are incorporated by this reference.

TECHNICAL FIELD

Disclosed are embodiments related to coordination of energy metric reporting.

BACKGROUND

1. Third Generation Partnership Project (3GPP) LTE System Architecture (SA)

3GPP has specified the Long Term Evolution (LTE) Evolved Universal Terrestrial Radio Access Network (E-UTRAN) architecture. As illustrated in FIG. 1, LTE E-UTRAN comprises base stations, which are referred to as "evolvedNodeBs (eNBs)," Mobility Management Entities (MMEs), and System Architecture Evolution Gateways (S-GWs). As further shown in FIG. 1, an S1 interface connects the eNBs to the MME/S-GW, and connectivity between eNBs is supported by an X2 interface.

2. 3GPP Next Generation (NG) Radio Access Network (NG-RAN) SA

The current fifth generation (5G) RAN (NG-RAN) (which is also referred to as New Radio (NR)) architecture is illustrated in FIG. 2A and described in 3GPP Technical Specification (TS) 38.401v15.4.0 (TS 38.401). The NG-RAN architecture can be further described as follows. The NG-RAN includes of a set of base stations that are called "gNBs," and the gNBs are connected to the 5G Core Network (5GC) through the NG interface. A gNB can be connected to another gNB through the Xn interface. A gNB may consist of a gNB central unit (gNB-CU) and one or more gNB distributed units (gNB-DUs_. A gNB-CU and a gNB-DU are connected via the F1 logical interface. For resiliency, a gNB-DU may be connected to multiple gNB-CU by appropriate implementation. The NG interface, the Xn interface, and the F1 interface are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to an eNB via the X2 interface. Another architectural option is that where an eNB connected to an Evolved Packet Core (EPC) network is connected over the X2 interface with a so called nr-gNB. The latter is a gNB not connected directly to a core network (CN) and connected via X2 to an eNB for the sole purpose of performing dual connectivity.

The architecture in FIG. 2A can be expanded by spitting the gNB-CU into two entities. One gNB-CU-UP, which serves the user plane (UP) and hosts the Packet Data Convergence Protocol (PDCP) protocol and one gNB-CU-CP, which serves the control plane (CP) and hosts the PDCP and Radio Resource Control (RRC) protocol. A gNB-DU also hosts lower layer protocols.

3. Energy Savings in LTE and NR Systems

3.1 RAN Energy Saving

It is advantageous to reduce the operational cost of the RAN through energy savings. This can be achieved by, among other things, turning on/off capacity cells to lower the energy consumption. The decision is typically based on cell load information. The decision can be taken by a RAN node (e.g., base station) or also by an Operation and Maintenance (O&M) function.

A gNB serving a cell that the gNB has deactivated in order to reduce energy consumption can inform a neighboring node of the deactivation by means of an NG-RAN node Configuration Update procedure over the Xn interface, as illustrated in FIG. 2B and described in 3GPP TS 38.423 v16.5.0. Additionally, a gNB node can request another gNB to switch on/off a cell by means of Cell Activation procedure over Xn interface.

Additionally, a RAN node may take energy efficiency actions by reducing load in its served cells. Such reduction in load may translate into reducing the number of served user equipments (UEs) or the number of bearers, and, therefore it may enable the activation of idle periods in the usage of certain functions, such reduction in use consequently generating a saving in energy consumption.

3.2 UE Energy Efficiency

A UE is any device (e.g., smartphone, tablet, computer, sensor, appliance, residential gateway, etc.) that is capable of wirelessly communicating with a RAN node. Power and energy consumption are important operational characteristics for UEs, affecting and in some cases mandating configurations when operating in certain network and traffic scenarios. The network (NW) is expected to allow configurations where these are minimized to avoid overheating and to extend UE battery life, respectively.

There are several ways in which a UE can reduce energy consumption. These include: (1) increasing the fraction of time that the UE spends in a sleep state, especially a deep sleep where radio frequency (RF) circuitry and/or other circuitry is turned off, and (2) when monitoring signals, operating at minimum necessary receiver configurations, e.g., few antennas, narrow bandwidth (BW), minimum necessary RF quality, etc. The NW can enable and assist this by configuring and signaling to the UE numerous mechanisms. With reference to NR, a gNB can:

Configure signal monitoring (DRX) timelines that allow short monitoring intervals and long sleep intervals between them:

Connected DRX for data scheduling in connected mode (e.g., period, onDuration length)

DRX for paging monitoring in idle/inactive modes (e.g., period, PO length, number of POs)

Minimize inactivity timers cDRX inactivity timer from last data scheduling to returning to cDRX, Data inactivity time from last data scheduling to returning to idle mode Enable mechanisms that pre-signal whether monitoring is necessary in upcoming intervals WUS in connected mode to indicate status of next onDuration PEI in idle mode to indicate status of next PO Guarantee sufficient time for receiver reconfiguration from a minimal to a performance-optimized mode Cross-slot scheduling specifying a minimum PDCCH/PDSCH distance Indicate a PDCCH skipping duration Search space (periodicity) adaptation Provide guarantees about maximum required receiver performance to handle scheduled data formats Indication of maximum MIMO layers that will be scheduled Avoid unnecessary measurements that diminish UE sleep opportunities UE measurement reduction in connected mode for stationary UEs in good conditions Activate UAI functionality for the UE to indicate specific configuration preferences, etc.

Measurement relaxation, e.g., RRM, RLM, BFD in connected or idle (RRC_idle/inactive) mode.

Reduction of power consumption over Scells, e.g., by dynamic Scell release or activation/deactivation, Scell dormancy, etc.

4. Mobility and Handover (HO) in Radio Networks

4.1 Mobility in the LTE System

When the NW determines that a signal degradation for the serving cell of a UE and that a neighboring cell (a.k.a., a target cell) could serve the UE with a better signal quality, a handover procedure between the serving cell and the target cell can be initiated (e.g., a handover procedure between the eNB providing the serving cell and the eNB providing the target cell). A handover procedure may additionally be initiated to balance the load between cells, and therefore optimize the usage of the system resources and increase the system throughput.

The eNBs providing the serving cell and the target cell may directly exchange load information by using the X2 interface prior to initiating a handover preparation procedure so as to avoid moving a UE to a loaded cell which, despite having a stronger radio signal towards the UE, may not be able to serve the UE with sufficient radio resources. In this case, initiating the handover would degrade the performance of the UE moved to the target cell as well as of the UEs already connected to the target cell (since the available radio resources would be shared among more UEs).

To determine whether a handover decision should be made, the UE can be configured to periodically, or upon the occurrence of an event, send to the serving eNB a measurement report (e.g., through uplink by using radio resource control (RRC) signaling).

The handover procedure in a 3GPP LTE system has three phases: handover preparation, handover execution, and handover completion. When the conditions to start a handover preparation are met, the handover preparation procedure is mainly made up for a handover decision stage in serving eNB and for an admission control stage in target eNB as shown in FIG. 3, which illustrates an example handover message flow.

In an LTE system, the handover decision in the handover preparation procedure is made by the radio resource management (RRM) function based on the measurement report from the UE. To avoid ping-pong effects between source and target eNBs, the handover decision made by the serving eNB shall meet a robust handover criterion comprising threshold parameters for signal strength, hysteresis, and time to trigger.

The initial handover condition to be met for a positive handover decision is that the received signal strength (RSS) of the serving eNB is less than a given threshold value. In order to make the handover decision more robust, a signal strength threshold and a hysteresis operation can be enforced for the signal measured from the target eNB. In essence, if the candidate target eNB provides a higher RSS than that of the serving eNB during a period of time, a hysteresis operation is considered by the serving eNB for the target eNB. Once the conditions to trigger a handover procedure are met, a handover request is transmitted from the serving eNB to the target eNB. If the UE can be admitted by the target eNB, a handover request acknowledgment (Ack) message is transmitted back from the target eNB to the serving eNB. At this point, the serving eNB can issue a handover command to the UE to begin the handover, as shown in FIG. 3.

Figure 10.1.2.1.1-1 of 3GPP TS 36.300 V16.5.0 shows an illustration of the of Intra-MME/Serving Gateway handover for the 3GPP LTE-A system. Steps 7 to 16 provide means to avoid data loss during handover and are discussed in detail in Sections 10.1.2.1.2 and 10.1.2.3 of 3GPP TS 36.300. In step 7, the target eNB generates the RRC message to perform the handover, i.e. RRCConnectionReconfiguration message including the mobilityControlInformation, to be sent by the source eNB towards the UE. The source eNB performs the necessary integrity protection and ciphering of the message.

The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the handover (HO). If RACH-less HO is configured, the RRCConnectionReconfiguration includes timing adjustment indication and optionally preallocated uplink grant for accessing the target eNB. If preallocated uplink grant is not included, the UE should monitor PDCCH of the target eNB to receive an uplink grant. The UE does not need to delay the handover execution for delivering the HARQ/ARQ responses to source eNB.

If Make-Before-Break HO is configured, the connection to the source cell is maintained after the reception of RRCConnectionReconfiguration message with mobility-ControlInformation before the UE executes initial uplink transmission to the target cell. In this case, the source eNB can deliver/receive additional user plane data to/from the UE. If Make-Before-Break HO is configured, the source eNB decides when to stop transmitting to the UE

4.2 Mobility in the NR System

The basic mobility solution in NR shares some similarities to LTE. The UE may be configured by the network to perform cell measurements and report them, to assist the network to take mobility decisions. However, a difference is that the UE may be configured to perform L3 beam measurements based on different reference signals (SSBs and CSI-RSs) and report them, for each serving and triggered cells, i.e. for each cell fulfilling triggering conditions for measurement report (e.g. A3 event).

4.3 Measurements to Support Mobility in NR

The measurement model in NR, as described in 3GPP TS 38.300 V16.5.0 states that in RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB. The corresponding high-level measurement model is illustrated in FIG. 4. Referring now to FIG. 4:

K beams correspond to the measurements on Synchronization Signal Block (SSB) or Channel State Information (CSI) Reference signal (RS) (CSI-RS) resources configured for L3 mobility by gNB and detected by UE at L1. A: measurements (beam specific samples) internal to the physical layer. Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard. $A^1$: measurements (i.e. beam specific measurements) reported by layer 1 to layer 3 after layer 1 filtering. Beam Consolidation/ Selection: beam specific measurements are consolidated to derive cell quality. The behaviour of the Beam consolidation/selection is standardised and the configuration of this module is provided by RRC signalling. Reporting period at B equals one measurement period at A. B: a measurement (i.e. cell quality) derived from beam-specific measurements reported to layer 3 after beam consolidation/selection. Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B. C: a measurement after processing in the layer 3 filter. The reporting rate is identical to the reporting rate at point B. This measurement is used as input for one or more evaluation of reporting criteria. Evaluation of reporting criteria: checks whether actual measurement reporting is necessary at point D. The evaluation can be based on more than one flow of measurements at reference point C e.g. to compare between different measurements. This is illustrated by input C and $C^1$. The UE shall evaluate the reporting criteria at least every time a new measurement result is reported at point C, $C^1$. The reporting criteria are standardised and the configuration is provided by RRC signalling (UE measurements). D: measurement report information (message) sent on the radio interface. L3 Beam filtering: filtering performed on the measurements (i.e. beam specific measurements) provided at point $A^1$. The behaviour of the beam filters is standardised and the configuration of the beam filters is provided by RRC signalling. Filtering reporting period at E equals one measurement period at $A^1$. E: a measurement (i.e. beam-specific measurement) after processing in the beam filter. The reporting rate is identical to the reporting rate at point $A^1$. This measurement is used as input for selecting the X measurements to be reported. Beam Selection for beam reporting: selects the X measurements from the measurements provided at point E. The behaviour of the beam selection is standardised and the configuration of this module is provided by RRC signalling. F: beam measurement information included in measurement report (sent) on the radio interface.

Measurement reports are characterized by the following:

Measurement reports include the measurement identity of the associated measurement configuration that triggered the reporting; Cell and beam measurement quantities to be included in measurement reports are configured by the network; The number of non-serving cells to be reported can be limited through configuration by the network; Cells belonging to a blacklist configured by the network are not used in event evaluation and reporting, and conversely when a whitelist is configured by the network, only the cells belonging to the whitelist are used in event evaluation and reporting; and Beam measurements to be included in measurement reports are configured by the network (beam identifier only, measurement result and beam identifier, or no beam reporting).

Intra-frequency neighbour (cell) measurements and inter-frequency neighbour (cell) measurements are defined as follows:

SSB based intra-frequency measurement: a measurement is defined as an SSB based intra-frequency measurement provided the centre frequency of the SSB of the serving cell and the centre frequency of the SSB of the neighbour cell are the same, and the subcarrier spacing of the two SSBs is also the same;

SSB based inter-frequency measurement: a measurement is defined as an SSB based inter-frequency measurement provided the centre frequency of the SSB of the serving cell and the centre frequency of the SSB of the neighbour cell are different, or the subcarrier spacing of the two SSBs is different (for SSB based measurements, one measurement object corresponds to one SSB and the UE considers different SSBs as different cells);

CSI-RS based intra-frequency measurement: a measurement is defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same; and CSI-RS based inter-frequency measurement: a measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

4.3 Cell-Level Mobility in NG-RAN

Section 9.2.3 of the 3GPP TS 38.300 specify the cell-level mobility for the NG-RAN system. Network controlled mobility applies to UEs in RRC_CONNECTED and is categorized into two types of mobility: cell level mobility and beam level mobility.

Cell Level Mobility requires explicit RRC signalling to be triggered, i.e. handover. For inter-gNB handover, the signalling procedures consist of at least the following elemental components illustrated in FIG. 5 and described in 3GPP TS 38.300. The procedure consists if the following steps:

1. The source gNB initiates handover and issues a HANDOVER REQUEST over the Xn interface.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete. User Data can also be sent in step 4 if the grant allows.

The handover mechanism triggered by RRC requires the UE at least to reset the MAC entity and re-establish radio link control (RLC). RRC managed handovers with and without PDCP entity re-establishment are both supported. For data radio bearers (DRBs) using RLC acknowledge mode (AM), PDCP can either be re-established together with a security key change or initiate a data recovery procedure without a key change. For DRBs using RLC un-acknowledge mode (UM) and for signaling radio bearers (SRBs), PDCP can either be re-established together with a security key change or remain as it is without a key change.

Data forwarding, in-sequence delivery, and duplication avoidance at handover can be guaranteed when the target gNB uses the same DRB configuration as the source gNB. Timer based handover failure procedure is supported in NR. RRC connection re-establishment procedure is used for recovering from handover failure.

4.5 Beam-Level Mobility in NG-RAN

In LTE and NR, handovers decisions or Primary Secondary Cell (PSCell) change decisions (when the UE is operating in dual connectivity, carrier aggregation, etc.) are typically taken based on the coverage and quality of a serving cell compared to the quality of a potential neighbour. Quality is typically measured in terms of Reference Signal Received Quality (RSRQ) or signal-to-interference-plus-noise ratio (SINR), while coverage is typically measured based on Reference Signal Received Power (RSRP). In NR, a cell may be comprised by a set of beams where PSS/SSS are transmitted in different downlink beams. FIG. 6A illustrates reference signals (Primary Synchronization Signal (PSS), Secondary Synchronization Signal (SSS)) for LTE and FIG. 6B illustrates reference signals for NR.

Beam Level Mobility does not require explicit RRC signaling to be triggered. The gNB provides via RRC signaling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signaling, and RRC is not required to know which beam is being used at a given point in time.

SSB-based Beam Level Mobility is based on the SSB associated with the initial downlink (DL) bandwidth part (BWP) and can only be configured for the initial DL BWPs and for DL BWPs containing the SSB associated with the initial DL BWP. For other DL BWPs, Beam Level Mobility can only be performed based on CSI-RS. FIG. 7 illustrates an example of beam-level handover decision in a NG-RAN system.

Beam measurement information (SSB/CSI-RS indexes with or without associated measurements) may be included in measurement reports. One of the purposes of these beam reports is to enable the source node to take educated decisions in terms of ping-pong avoidance. For example, if multiple neighbour cells are reported (e.g. in an A3 event, namely a mobility event where the trigger condition is that the neighbor cell signal becomes better than the source by a certain offset) and these cells have somewhat equivalent quality/coverage (e.g. similar RSRP and/or similar RSRQ and/or similar RSRQ), criteria to decide where to handover the UE to could be the quality of reported beams. For example, network could prioritize the cells with more beams than another cell.

4.6 C-Plane and U-Plane Handling in Handover

FIG. 8 illustrates the Intra-AMF/UPF Handover for 3GPP NG-RAN system (see Section 9.2.3.2.1 of 3GPP TS 38.300). Upon the handover preparation is completed (steps 1a-5), the RAN handover initialization is started (see step 6).

During the RAN handover initialization, from a control plane perspective, the source gNB triggers the handover by sending an RRCReconfiguration message to the UE, containing the information required to access the target cell: at least the target cell ID, the new cell radio network temporary identifier (C-RNTI), the target gNB security algorithm identifiers for the selected security algorithms. It can also include a set of dedicated Random Access Channel (RACH) resources, the association between RACH resources and SSB(s), the association between RACH resources and UE-specific CSI-RS configuration(s), common RACH resources, and system information of the target cell, etc.

The user plane handling during the Intra-NR-Access mobility activity for UEs in RRC_CONNECTED takes the following principles into account to avoid data loss during HO: 1) During handover preparation, U-plane tunnels can be established between the source gNB and the target gNB; 2) During handover execution, user data can be forwarded from the source gNB to the target gNB; and 3) Forwarding should take place in order as long as packets are received at the source gNB from the UPF or the source gNB buffer has not been emptied.

SUMMARY

Certain challenges presently exist. For example, existing mobility and energy saving procedures in radio networks do not provide a solution for enabling a UE to store (e.g., log) user-related energy status assistance information during a mobility event configuration or reconfiguration, and to send the energy status report to one or more network nodes during and/or after the mobility event. As another example, existing mobility and energy saving procedures in radio networks do not consider the possibility for two network nodes to coordinate and/or negotiate whether and how to configure a UE for logging user-related energy status assistance information before the mobility event, so that the UE may continue logging information also after the mobility event without a reconfiguration. As yet another example, existing system do provide for two network nodes to exchange user reports comprising user-related energy status assistance information before mobility events, thereby limiting the possibility to configure UEs for optimal energy savings.

Accordingly, in one aspect there is provided a method performed by a first network node for coordinating with a second network node with respect to a UE, energy state assistance information, UE-ESAI, configuration for a UE or a group of UEs currently being served by the first network node. The method includes generating a first coordination message. The method also includes transmitting the first coordination message to the second network node. The first coordination message comprises information related to configuring the UE or the group of UEs to store and/or report UE-ESAI, and the UE-ESAI comprises a measured or estimated first energy metric. In another aspect there is provided a computer program comprising instructions which when executed by processing circuitry of a first network node causes the first network node to perform the above described method. In one embodiment, there is provided a carrier containing the computer program wherein the carrier is one of an electronic signal, an optical signal, a radio signal, and a computer readable storage medium. In another aspect there is provided a network node apparatus that is configured to perform the above described method. The network node apparatus may include memory and processing circuitry coupled to the memory.

In another aspect there is provided a method performed by a second network node for coordinating with a first network node with respect to a UE-ESAI configuration for a UE or a group of UEs currently being served by the first network node. The method includes receiving a first coordination message transmitted by the first network node. The method also includes processing the received first coordination message (e.g., obtaining information included in the message). The first coordination message comprises information related to configuring the UE or the group of UEs to store and/or report UE-ESAI, and the UE-ESAI comprises a measured or estimated energy metric. In another aspect there is provided a computer program comprising instructions which when executed by processing circuitry of a second network node causes the second network node to perform the above described method. In one embodiment, there is provided a carrier containing the computer program wherein the carrier is one of an electronic signal, an optical signal, a radio signal, and a computer readable storage medium. In another aspect there is provided a network node apparatus that is configured to perform the above described method. The network node apparatus may include memory and processing circuitry coupled to the memory.

In another aspect there is provided a method performed by a UE for reporting UE-ESAI. The method includes receiving a first UE-ESAI message transmitted by a first network node, the first UE-ESAI message comprising a UE-ESAI configuration for configuring the UE to store and/or report UE-ESAI to the first network node and/or to a second network node. The UE-ESAI comprises a measured or estimated energy metric. In another aspect there is provided a computer program comprising instructions which when executed by processing circuitry of a UE causes the UE to perform the above described method. In one embodiment, there is provided a carrier containing the computer program wherein the carrier is one of an electronic signal, an optical signal, a radio signal, and a computer readable storage medium. In another aspect there is provided a UE that is configured to perform the above described method. The UE may include memory and processing circuitry coupled to the memory.

An advantage of the embodiments disclosed herein is that they provide an efficient solution to enable a UE to store (e.g., log) and/or report assistance information associated with a UE energy state prior to, during, and/or after a mobility event between two network nodes. Embodiments enable the UE to collect UE related UE-ESAI without interruptions during the entire mobility event. Another advantage is to enable a network node involved in a mobility event to efficiently optimize the energy efficiency configuration for UEs that move towards one of the serving cell of a network node, e.g., by optimizing the user configuration to reduce energy consumption associated with certain procedures or certain events.

For instance, by configuring the UE to measure its energy consumption during a mobility event, it enables selecting the best type of handover to use (e.g. traditional handover, conditional handover, dual active protocol stack (DAPS) handover), the best candidate for handover (e.g. at cell level, at carrier frequency level) and the optimal configuration of handover related parameters (e.g. thresholds, offset, time-to-trigger) also in terms of energy consumption at the device. For example, in case of inter-frequency mobility, selecting one target carrier in case the energy consumption for mobility could result in a higher energy consumption compared to handing over the device towards another carrier (e.g. depending of the Frequency Ranges to which the different targets belong to). The target network node can also, in another embodiment, activate a capacity cell in case the UE energy consumed due to handovers would be large without the possibility of being served by the capacity cell. Or in another embodiment, changing the cell and/or beam shapes in one of source/target node can be done based on the energy consumption feedback. For NR, the cell shapes can be altered by increasing the number of SSB beams to improve coverage. The embodiments also enable the network to estimate how costly a ping-pong handover can be at the device in terms of energy consumption. This can be used, for example, to select optimal setting for the mobility events (e.g. thresholds, offsets, and time to triggers). Another advantage is that the embodiments enable the network node to optimize one or more network configurations for improving energy efficiency of a network node or a cluster of network nodes (i.e., network-level optimization).

BRIEF DESCRIPTION OF THE DRAWINGS

The accompanying drawings, which are incorporated herein and form part of the specification, illustrate various embodiments.

FIG. 25. is a flowchart illustrating a process according to some embodiments.

FIG. 41A is a flowchart illustrating a process according to some embodiments.

FIG. 41B is a flowchart illustrating a process according to some embodiments.

DETAILED DESCRIPTION

Figure 1:
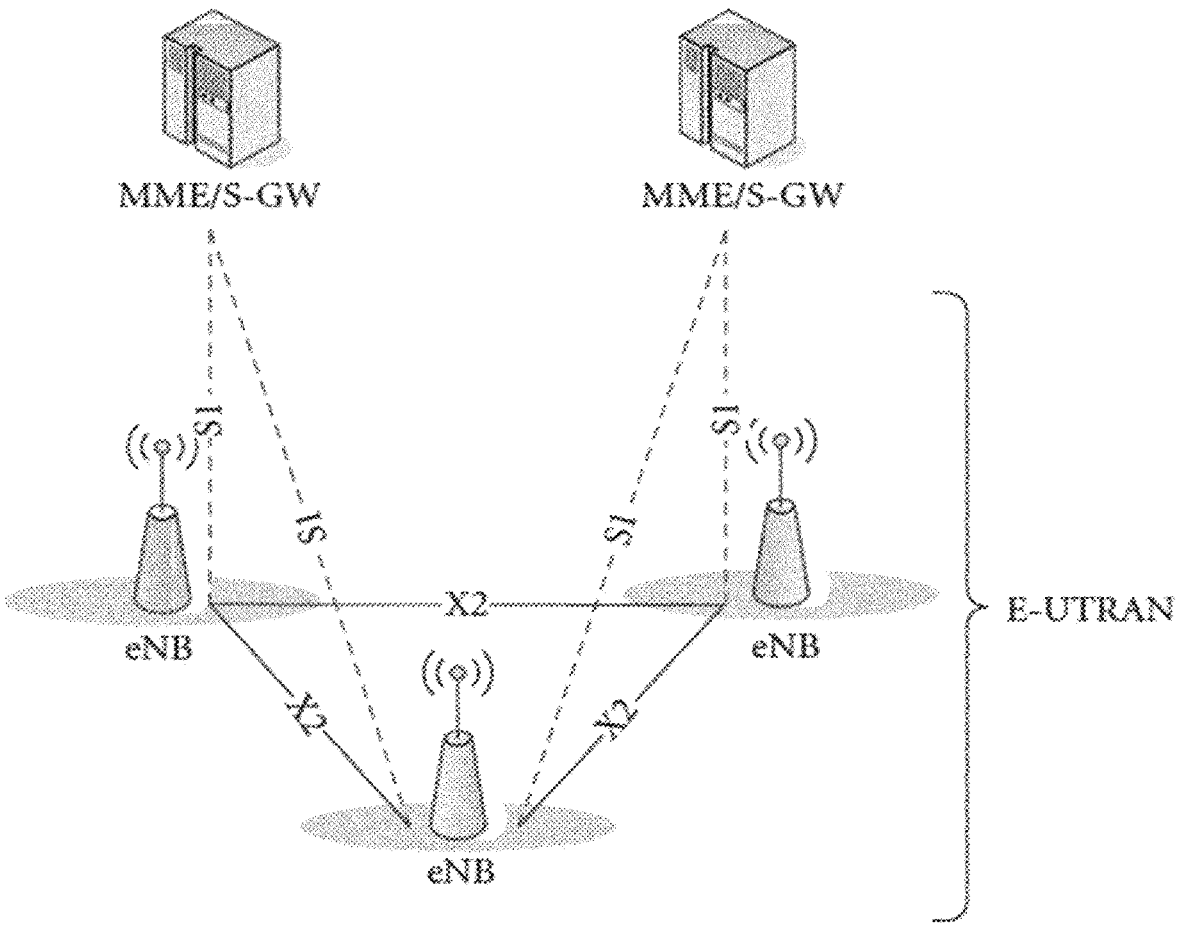
FIG. 1 illustrates an E-UTRAN.
Figure 2A:
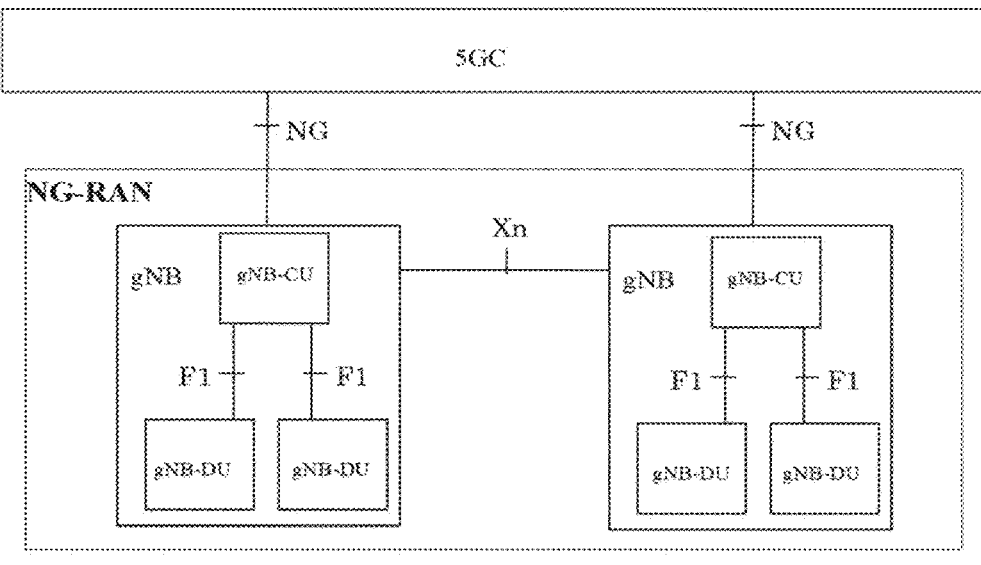
FIG. 2A illustrates an NG-RAN.
Figure 2B:
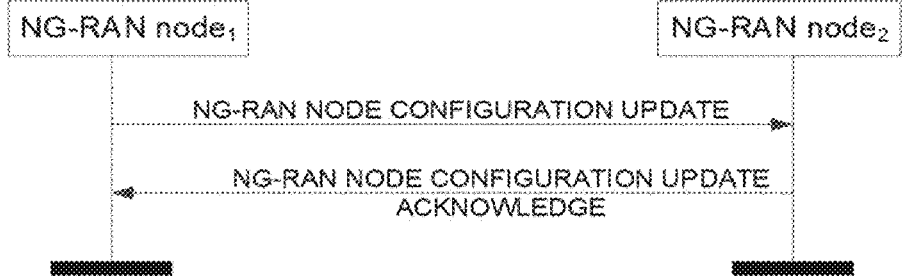
FIG. 2B illustrates a configuration update procedure.
Figure 3:
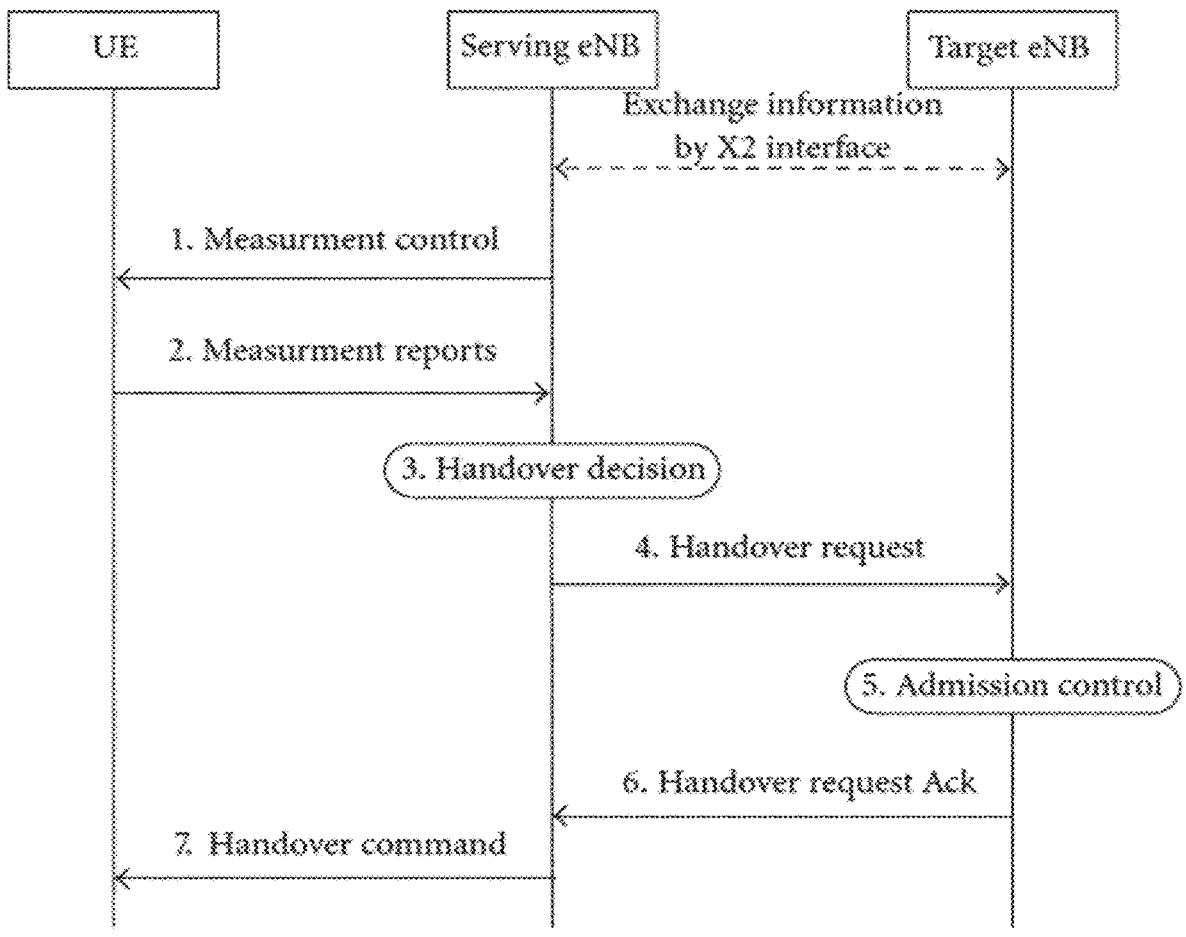
FIG. 3 illustrates a handover message flow.
Figure 4:
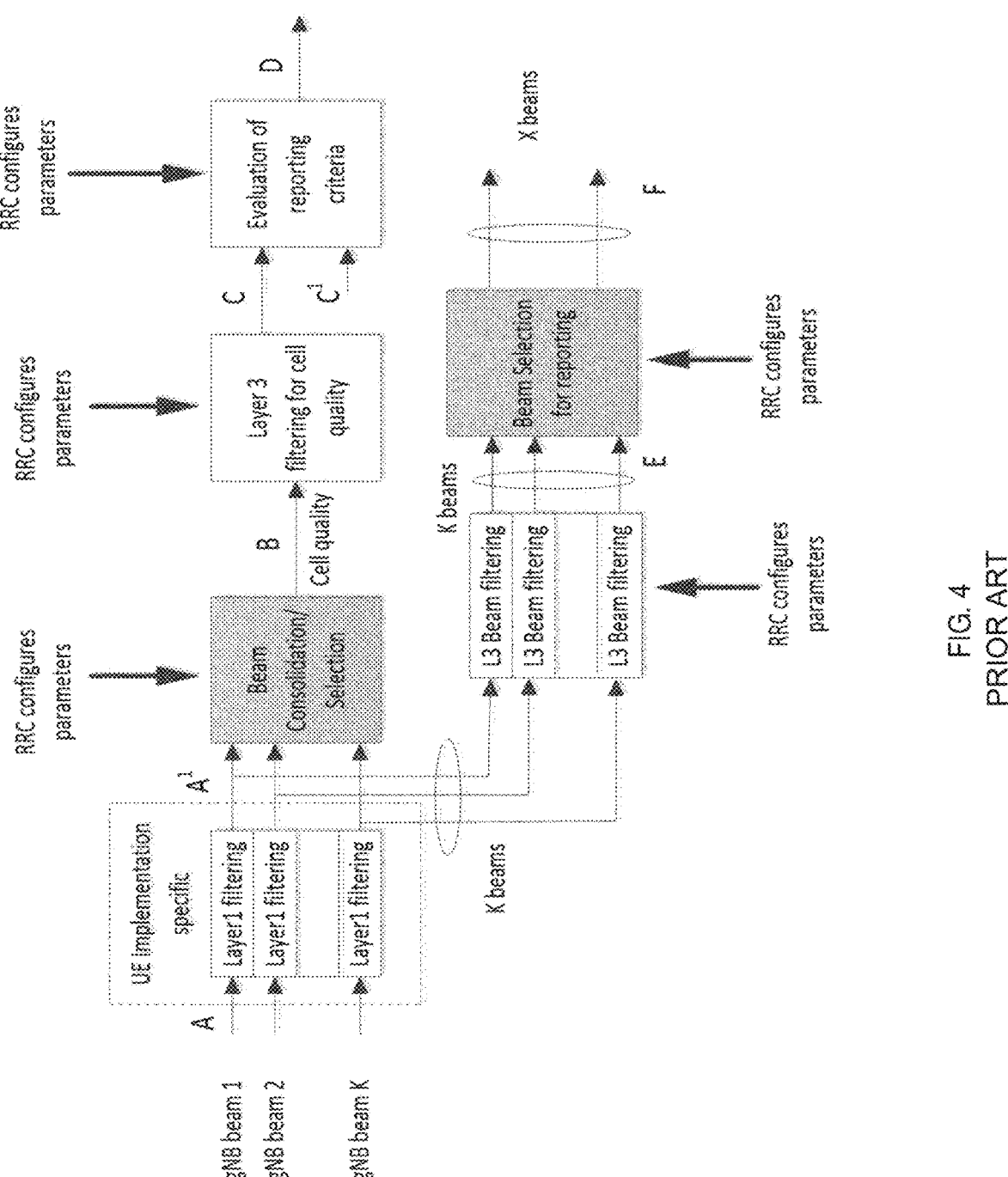
FIG. 4 illustrates a high-level measurement model.
Figure 5:
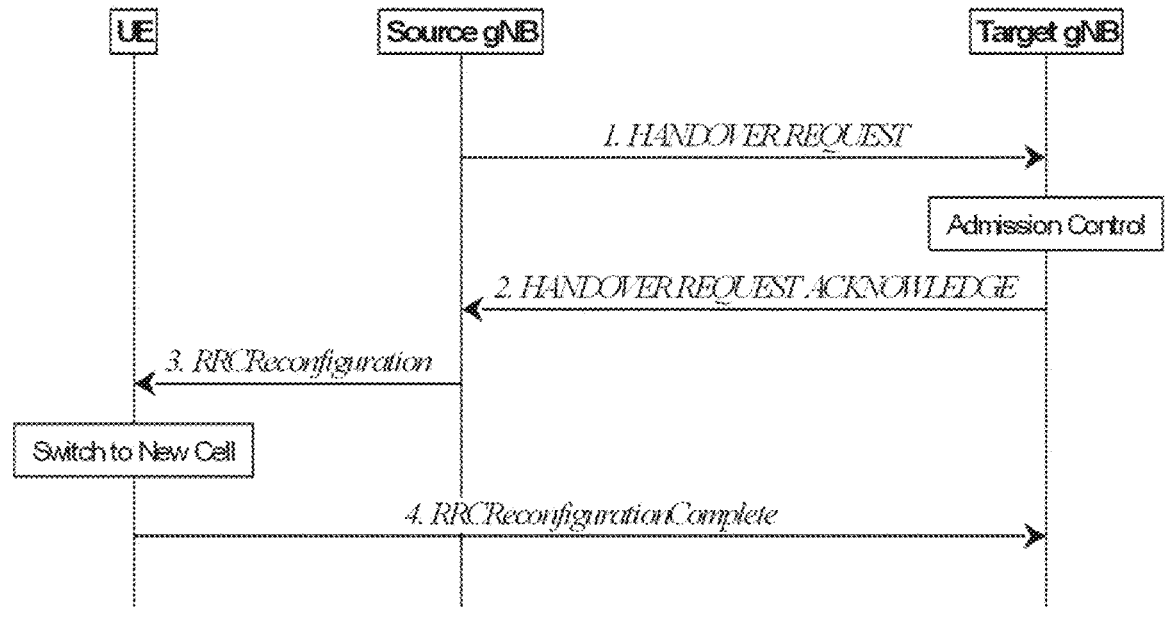
FIG. 5 illustrates a handover message flow.
Figure 6A:
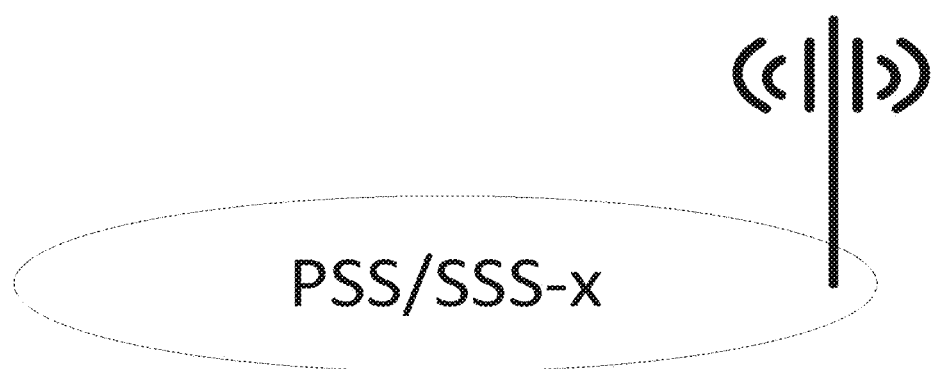
FIG. 6A illustrates LTE reference signals.
Figure 6B:
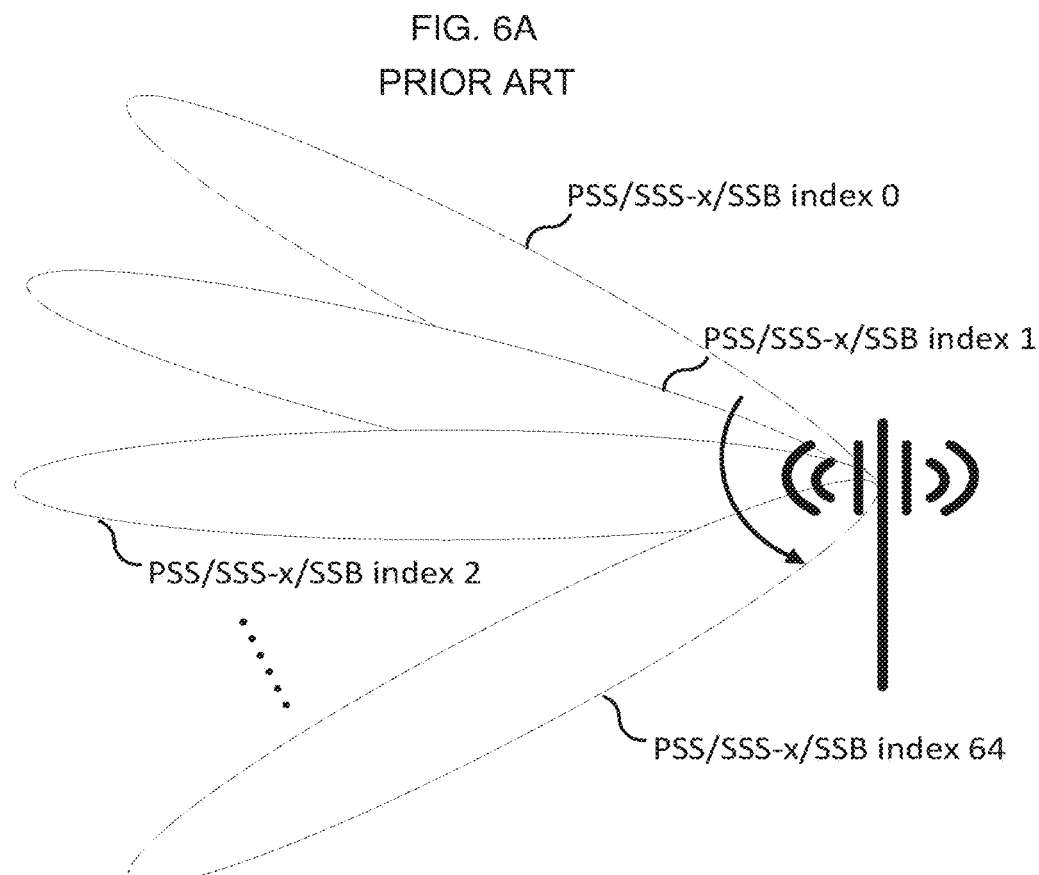
FIG. 6B illustrates NR reference signals.
Figure 7:
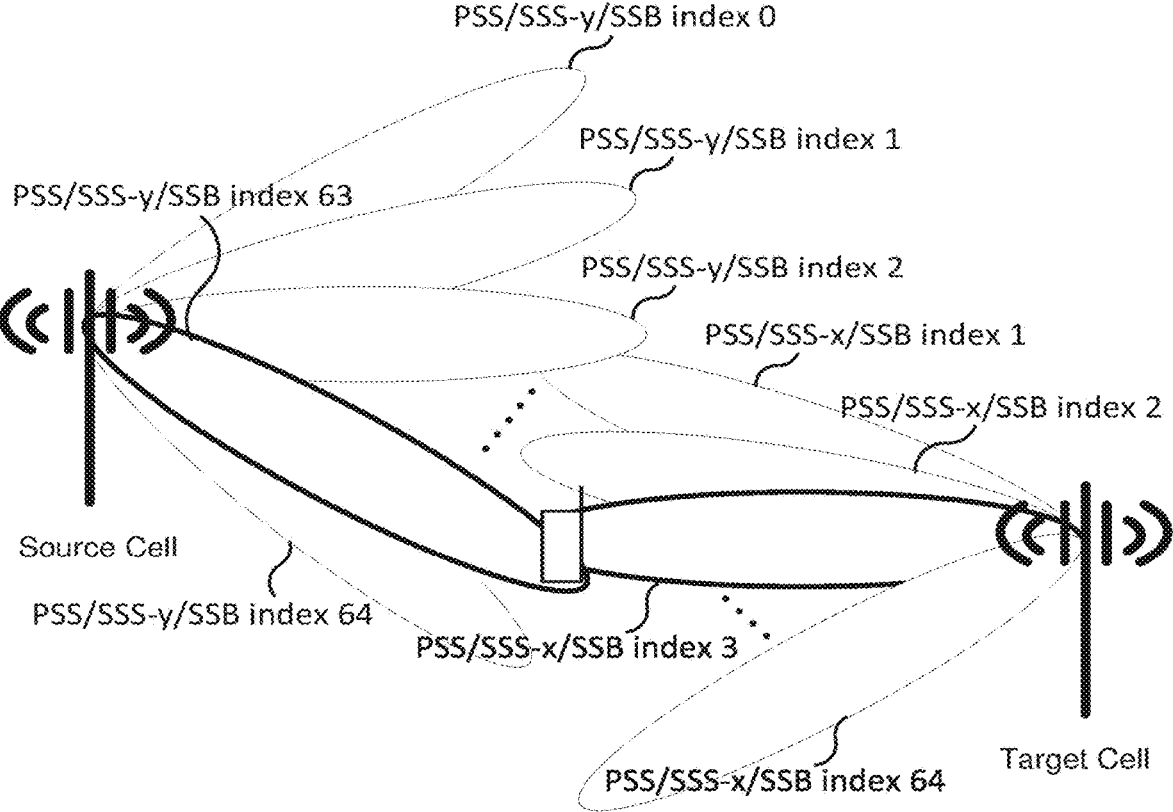
FIG. 7 illustrates an example of beam-level handover.
Figure 8:
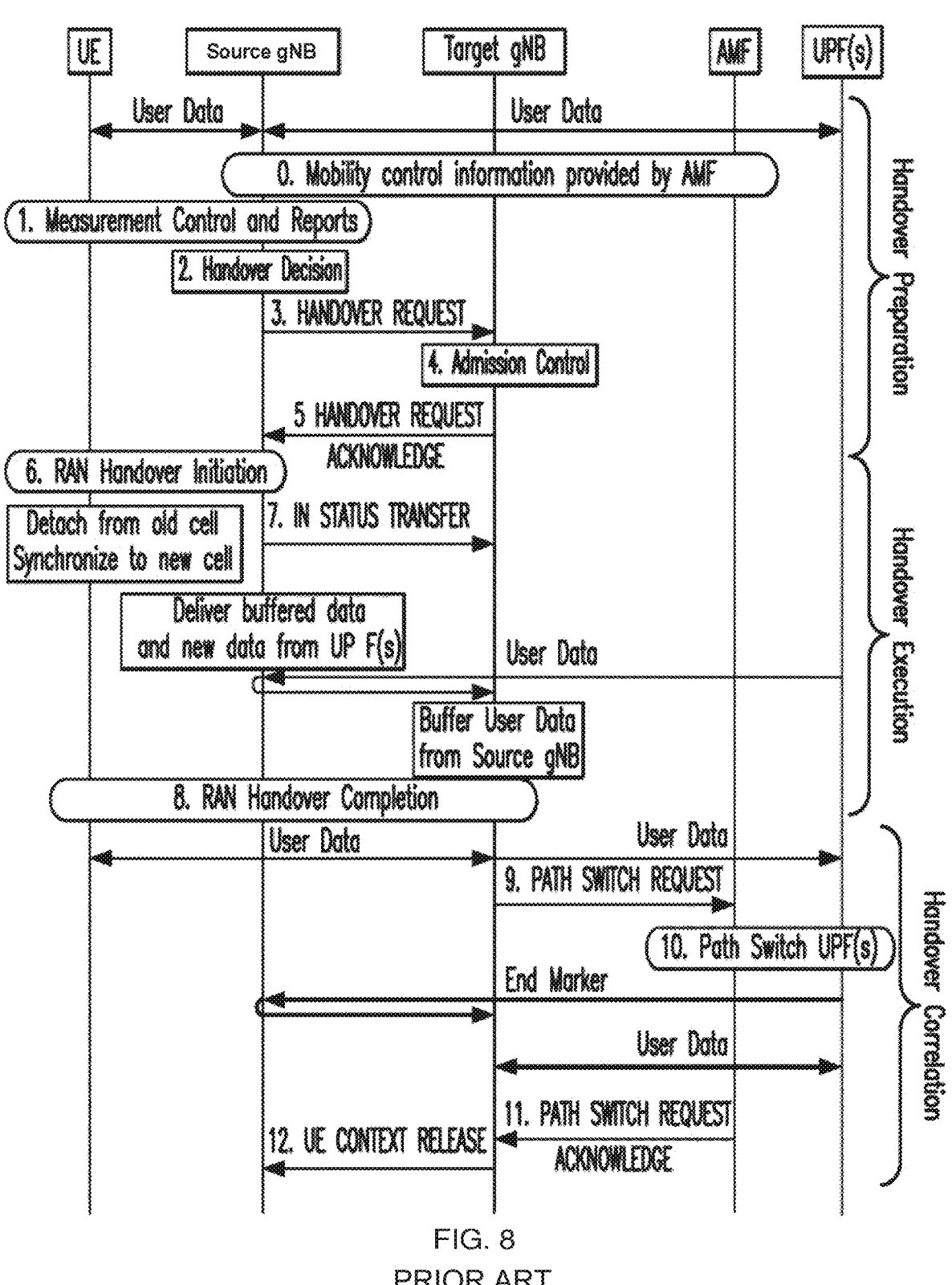
FIG. 8 illustrates a handover message flow.

The term RAN node, network node, source node, target node can refer to LTE or NR technology and may be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, IAB-node, IAB-donor DU, IAB-donor-CU, IAB-DU, IAB-MT, O-CU, O-CU-CP, O-CU-UP, O-DU, O-RU, O-eNB.

The term "transmit to" means "transmit directly or indirectly to." Accordingly, transmitting a message to a node encompasses transmitting the message directly to the node or transmitting the message indirectly to the node such that the message is relayed to the node via one or more intermediate nodes. Similarly, the term "receive from" means "receive directly or indirectly from." Accordingly, receiving a message from a node encompasses receiving the message directly from the node or receiving the message indirectly from node such that the message is relayed from the sender to the node via one or more intermediate nodes.

This disclosure provides, among other things, a method for two network nodes to coordinate and configure a UE to store and/or report UE related UE-ESAI, which comprises a set of one or more energy metrics (e.g., an energy score, a power score, an energy consumption indicator, an energy efficiency indicator, etc.) for the UE (e.g., energy metrics determined by the UE). An energy metric for the UE may be associated with a specific radio configuration, but this is not a requirement. For instance, the energy metric may be related to sensor information (e.g. temperature, battery level, velocity, orientation), end-user behavior (e.g. which service types are provided by the application layer, identity of the applications).

At least one of the network nodes may provide to the UE an indication pertaining to operational conditions and/or configurations under which the UE should store UE-ESAI for later reporting (e.g., store UE-ESAI in a log file that its subsequently provided to a network node).

One use case relates to user mobility (such as a mobility due to radio conditions and/or load balancing and/or traffic steering), wherein the source network node (or "source node" for short) and the target network node (or "target node" for short) involved in the mobility of the UE can determine whether and how to configure the UE for storing and/or reporting UE-ESAI prior to, during and/or after a mobility event or procedure.

For example, the source node and the target node can coordinate to determine whether to configure the UE to store UE-ESAI when connected to the source node. In this case, the source node configures the UE to store UE-ESAI when the UE is still connected to the source node prior to and/or during the handover.

As another example, the source node and the target node can coordinate to determine whether to configure the UE to store UE-ESAI when connected to the target node. In this case, the UE is configured by the source node to store UE-ESAI when a connection is established/being established between the UE and the target node, thereby during and/or after a mobility event. The target node can then optionally further trigger the UE to report the collected UE-ESAI in specific resources and/or with a specific format.

As another example, the source node and the target node can coordinate to determine whether to configure the UE to store UE-ESAI when it is connected to/served by the source node as well as when it is connected to/served by the target node. In addition, the source node and the target node can additionally coordinate to whether the UE shall report the information to the source node, to the target node or to both.

Method at the First Network Node

In one aspect there is provided, a method performed by a first network node in a communication network for coordinating with a second network node a configuration for enabling a UE to store and/or report UE-ESAI. The method, in one embodiment, includes the first network node transmitting a first coordination message to the second network node associated with at least a UE connected to/served by the first network node. The first coordination message comprises configuration information related to configuring the UE to store and/or report UE-ESAI.

In some embodiments, the method also includes the first network node receiving a second coordination message transmitted by the second network node associated with at least a UE connected to/served by the first network node, the second coordination message comprising configuration information related to configuring the UE to store and/or report UE-ESAI.

In some embodiments, the method also includes the first network node determining a UE-ESAI configuration for at least one UE. A UE-ESAI configuration is a set of information that comprises configuration information related to configuring the UE(s) to store and/or report UE-ESAI (e.g., the UE-ESAI configuration may contain configuration information specifying the type or types of UE-ESAI that the UE should store and report). In some embodiments, the first network node determines the UE-ESAI configuration based also on the second coordination message.

In some embodiments, the method also includes the first network node transmitting a first UE-ESAI message to at least a UE, the first UE-ESAI message comprising at least a UE-ESAI configuration instructing the UE to store and/or report UE-ESAI to the first network node and/or to a second network node.

In some embodiments, the method also includes the first network node receiving a second UE-ESAI message from the UE, the second UE-ESAI message comprising at least a UE-ESAI report. A UE-ESAI report is a set of information that includes part of the UE-ESAI stored by the UE or all of the UE-ESAI stored by the UE.

Method at the Second Network Node

In another aspect there is provided a method performed by the second network node in a communication network for coordinating with the first network node a configuration for enabling a UE to store and/or report energy state assistance information (UE-ESAI) (which can also be called UE energy efficiency assistance information (UE-EEAI)—that is UE-ESAI and UE-EEAI are synonymously in this disclosure). The method, in one embodiment, includes the second network node receiving a first coordination message transmitted by the first network node associated with at least a UE connected to the first network node, the first coordination message comprising configuration information related to configuring the UE to store and/or report UE-ESAI.

In some embodiments, the method also includes the second network node generating a second coordination message comprising configuration information related to configuring the UE to store and/or report UE-ESAI based on the first coordination message.

In some embodiments, the method also includes the second network node transmitting a second coordination message to the first network node associated with a UE connected to the first network node, the second coordination message comprising configuration information related to configuring the UE to store and/or report UE-ESAI.

In some embodiments, the method also includes the second network node sending to the first network node UE-ESAI reports transmitted by the UE.

In some embodiments, the method also includes the second network nod retrieving UE-ESAI that UE(s) has (have) been (re)configured to store by a first network node. For example, in some embodiments, the method also includes the second network node receiving a second UE-ESAI message from UE(s), a second UE-ESAI message comprising a UE-ESAI report including at least part of or the complete set of the UE-ESAI stored by the UE.

Method at the UE

In another aspect there is provided a method performed by a UE in a communication network for storing and/or reporting UE-ESAI to a first network node and/or to a second network node. The method, in one embodiment, includes the UE receiving a first UE-ESAI message from a first network node comprising at least a UE-ESAI configuration instructing the UE to store and/or report UE-ESAI to the first network node and/or to a second network node. The method also may include the UE transmitting a second UE-ESAI message to the first network node and/or a second network node, the second UE-ESAI message comprising at least a UE-ESAI report including part of or the complete UE-ESAI related to an energy metric stored by the UE.

In some embodiments, the method also includes the UE receiving a third UE-ESAI message from a second network node, the third UE-ESAI message triggering and/or configuring and/or requesting the UE to report part of or the complete set of the UE-ESAI stored by UE(s).

In some embodiments, the method also includes the UE transmitting a fourth UE-ESAI message to the second network node, the fourth UE-ESAI message comprising: i) a positive acknowledgment (ACK) indicating a successful configuration/initialization of UE-ESAI reporting from the UE or ii) a negative acknowledgment (NACK) indicating an unsuccessful or failed configuration/initialization of UE-ESAI reporting from the UE.

Figure 9:
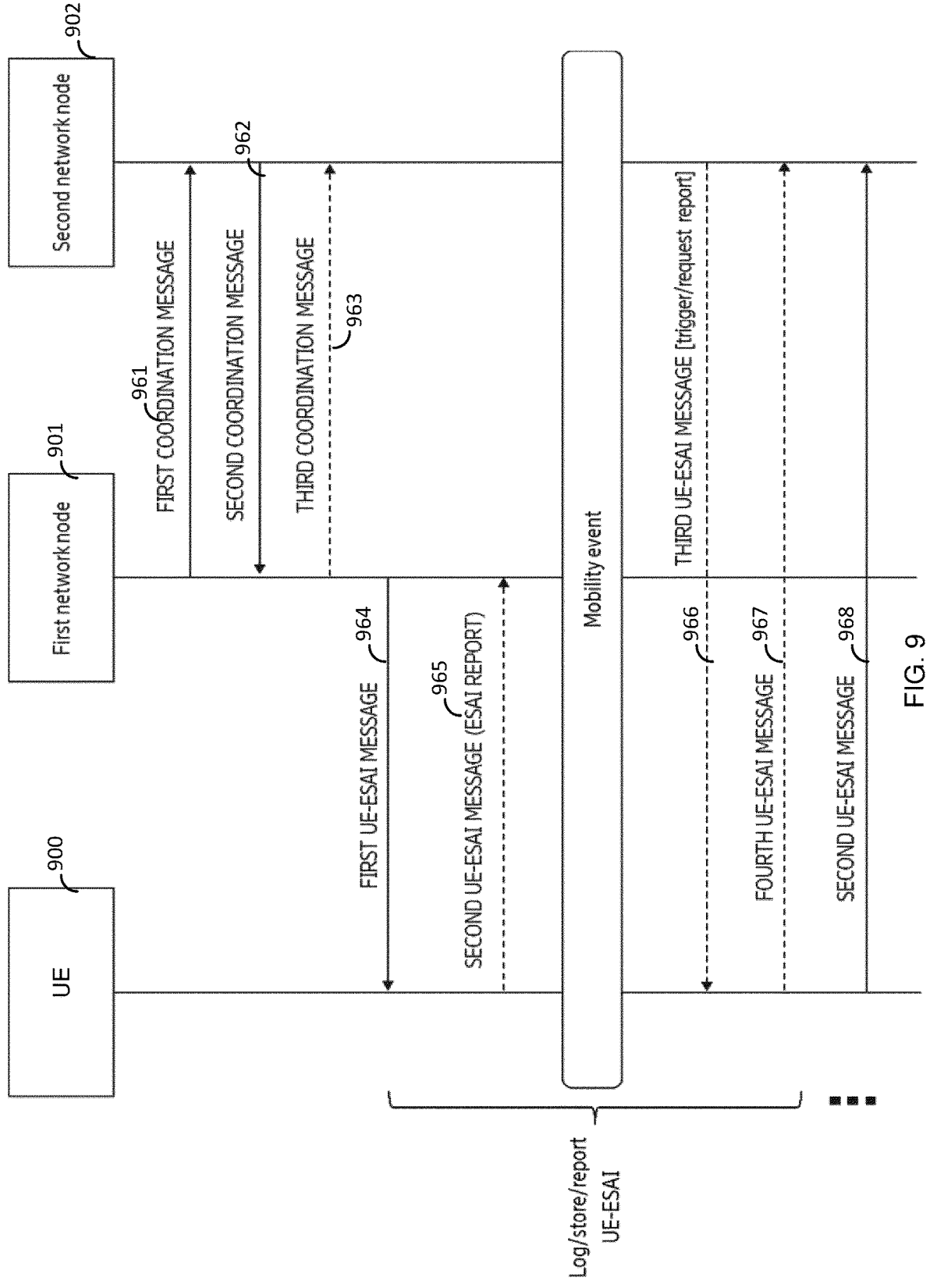
FIG. 9 illustrates a message flow according to some embodiments.

Referring now to FIG. 9, FIG. 9 illustrates a message flow diagram in which two network nodes (first network node 901 and second network node 902) coordinate the configuration of a UE 900 to store and/or report UE-ESAI prior to a mobility event.

As shown in FIG. 9, first network node 901 transmits a first coordination message 961 to the second network node 902. The first coordination message comprises configuration information related to configuring UE 900 to store and/or report UE-ESAI.

In one embodiment, the first network node transmits the first coordination message to trigger or initiate a coordination procedure with the second network node 902 to determine a configuration for at least a UE 900 which is connected to the first network node to enable the UE to store and/or report UE-ESAI. The first coordination message may be associated with UE 900 served by the first network node or a group of UEs served by the first network node.

The first network node may additionally receive a second coordination message 962 transmitted by the second network node associated with UE 900 (or another UE connected to the first network node or a group of UEs connected to first network node), the second coordination message comprising configuration information related to configuring the UE to store and/or report UE-ESAI. Thereby, the first network node may determine a UE-ESAI configuration for storing and/or reporting UE-ESAI for a UE served by the first network node and/or for a group of UEs of the first network node.

The first network node may additionally determine, update, or modify a UE-ESAI configuration for storing information related to energy state associated with the UE (e.g., an energy metric for the UE) and/or to one or more network node (such as the first and the second network node).

The first network node may additionally transmit a first UE-ESAI message 964 to UE 900, the first UE-ESAI message instructing the UE to store and/or report UE-ESAI to the first network node and/or to a second network node.

In one embodiment, wherein at least UE 900 is already configured to store and/or report UE-ESAI, the first network node may transmit the UE-ESAI configuration message to UE 900 only if the new UE-ESAI configuration determined for the UE is different from the UE-ESAI configuration currently used by the UE.

The first network node may also transmit a third coordination message 963 to the second network node indicating a successful or unsuccessful termination of the coordination procedure. In addition, the third coordination message may comprise information associated with the UE-ESAI configuration determined for UE 900 based on the coordination between the first and the second network node.

The terms "first," "second," "third," etc. do not necessarily represent an ordering.

Figure 10:
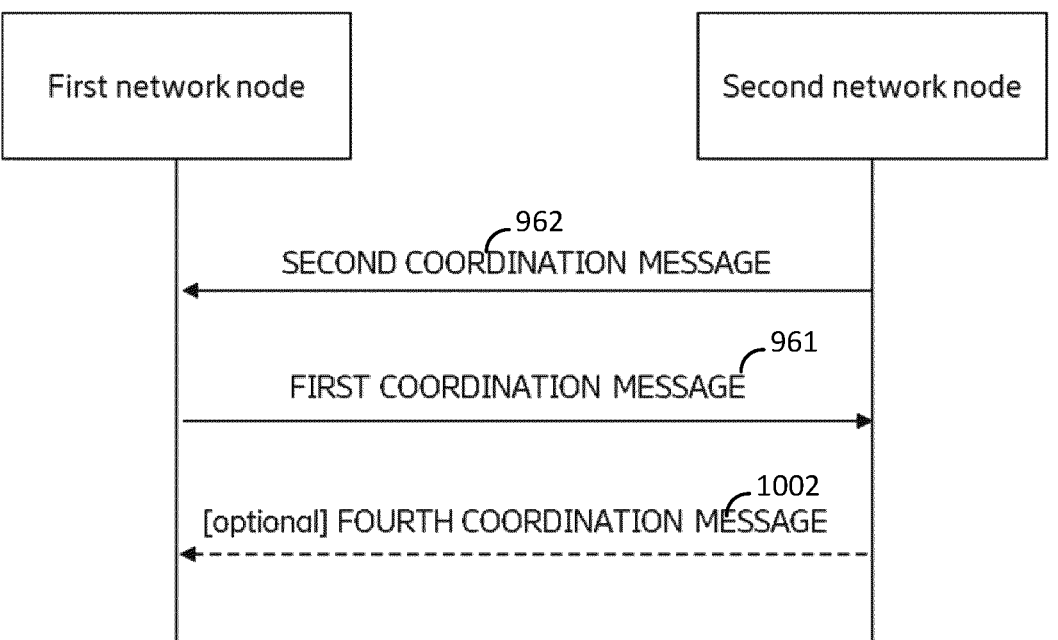
FIG. 10 illustrates a message flow according to some embodiments.

In one exemplifying embodiment, illustrated in FIG. 10, the first network node receives second coordination message 962 before transmitting first configuration message 961, where, in this embodiment, the second coordination message is for triggering the coordination procedure. Thereby, in this case, the first network node may transmit the first coordination message in response to receiving a second coordination message. In this embodiment, the first network node may receive a fourth coordination message 1002 transmitted by the second network node indicating a successful or unsuccessful termination of the coordination procedure.

Embodiments Related to UE-ESAI in Mobility Procedures

In one embodiment, the first network node is the source node of a mobility event associated with a UE or a group of UEs connected to the first network node, and the second network node is the target node of the mobility event. Hereafter, we may refer to the first network node as the source node and to the second network node as the target node.

Thereby, the source node and the target node may coordinate to configure at least a UE, prior to initializing/ triggering a mobility event, to store and/or report UE-ESAI. Thereby, prior to a mobility event, the source node may configure the UE to store and/or report UE-ESAI prior to, and/or during, and/or after the mobility event between the source node and the target node.

In one example, the source node may configure the UE to report the stored UE-ESAI to the target node prior to a new connection is established with the target node, that is reporting occurs prior to the successful completion of the mobility event. In another example, the source node may configure the UE to report the stored UE-ESAI to the target node upon a successful completion of a mobility event. In another example, the source node may configure the UE may to report the stored UE-ESAI to both the source node and to the target node upon a successful completion of the mobility event. For example, the UE may be configured to report to the source node also in case of an unsuccessful mobility event.

Figure 11:
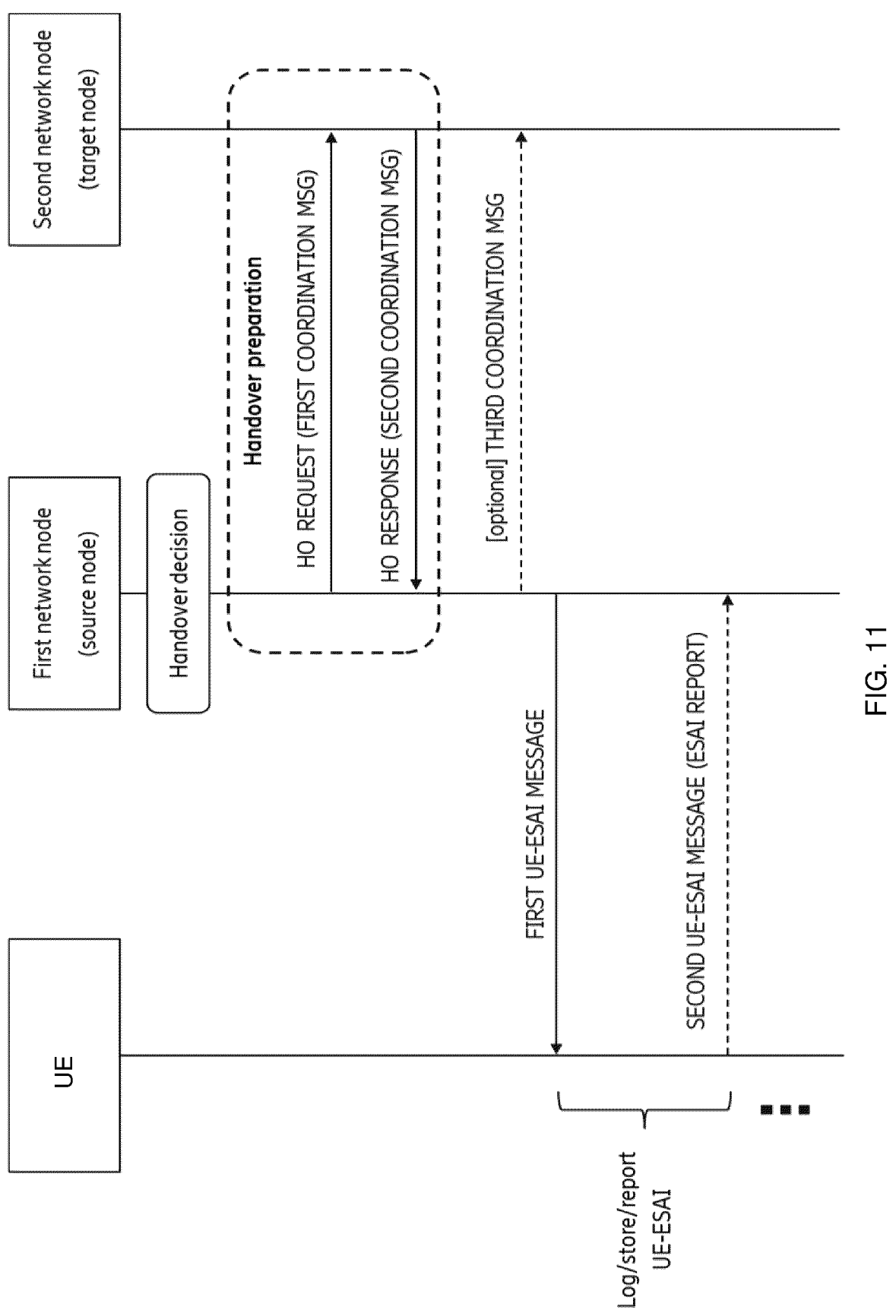
FIG. 11 illustrates a message flow according to some embodiments.

In one embodiment, illustrated in FIG. 11, the source node and the target node may reuse the handover preparation procedure to coordinate the configuration for a UE for storing and/or reporting UE-ESAI. In this example, the source node may transmit the first coordination message as part of a HANDOVER (HO) REQUEST message associated with at least a UE connected to the first network node. Similarly, the first network node may receive the second coordination message as part of the HANDOVER (HO) RESPONSE message associated with the UE or to the group of UEs. In addition, the source node may transmit a third coordination message to the source node separately from the signaling used for the Handover preparation procedure or as an extension of the handover preparation procedure.

Figure 12:
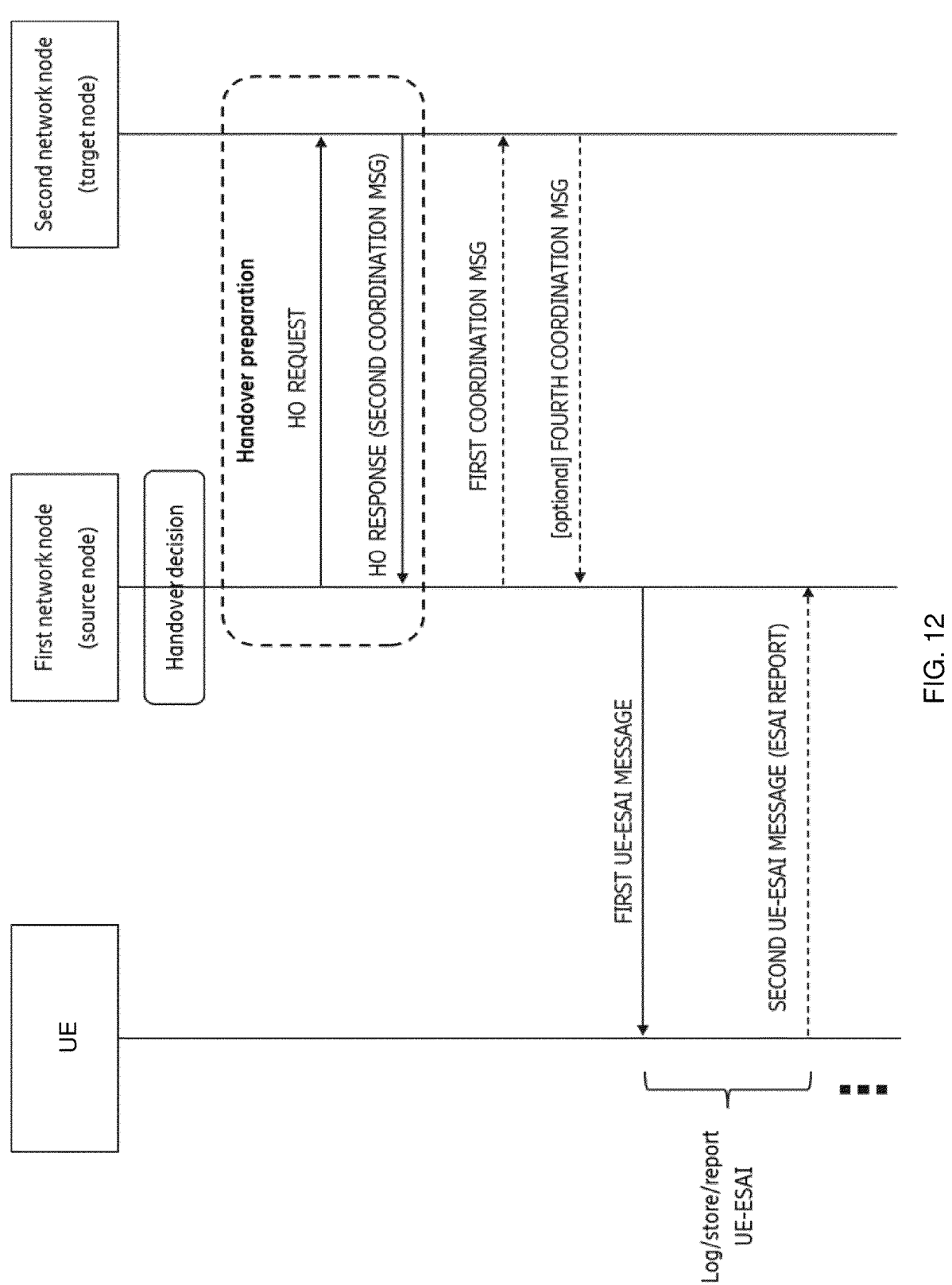
FIG. 12 illustrates a message flow according to some embodiments.

In one embodiment, illustrated in FIG. 12, the source node and the target node may partly reuse the handover preparation procedure to coordinate the configuration for a UE for storing and/or reporting UE-ESAI. In this example, the source node initiates the handover preparation procedure by transmitting the HANDOVER REQUEST message to the target node. The source node may then receive a HANDOVER RESPONSE message transmitted by the target node comprising the second coordination message. Thereby, the second network node may in this case initiate the coordination procedure with the first network node for configuring at least a UE to store and/or report UE-ESAI using the HANDOVER RESPONSE message.

In this case, the source node may transmit the first coordination message to the target node in response to the second coordination message, using a dedicated signaling not being part of the handover preparation procedure or a signaling extension of the handover preparation procedure. In this case, the first coordination message may, for instance, acknowledge a request of the target node to configure the UE or the group of UEs to store and/or report UE-ESAI.

In addition, the source node may receive a fourth coordination message transmitted by the target node using a dedicated signaling not being part of the handover preparation procedure or a signaling extension of the handover preparation procedure.

Figure 13:
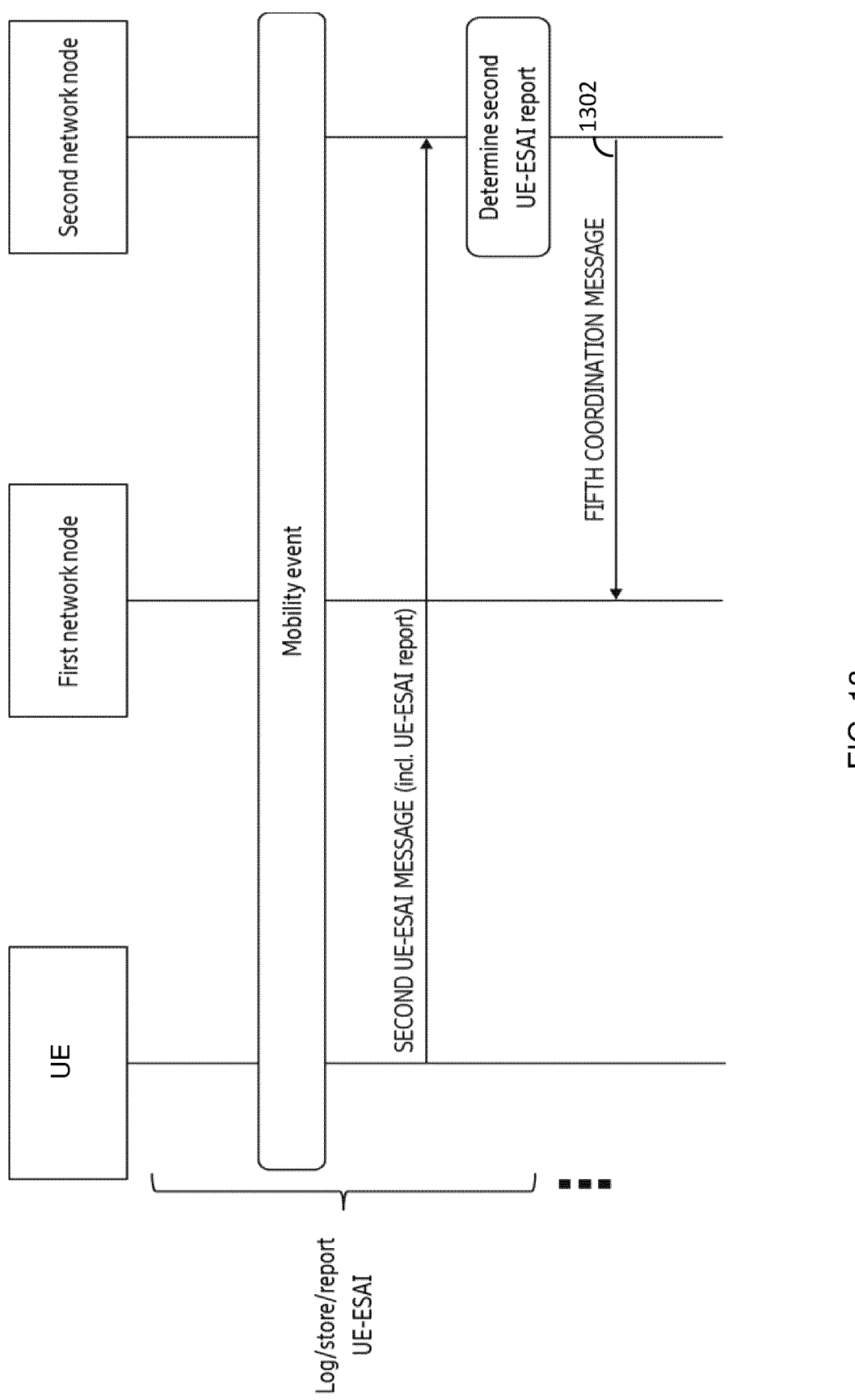
FIG. 13 illustrates a message flow according to some embodiments.

In one embodiment, illustrated in FIG. 13, the source node may additionally receive a fifth coordination message 1302 transmitted by the target node, wherein the fifth coordination message comprising at least a UE-ESAI report associated with at least one UE. The UE-ESAI report may comprise a UE-ESAI, associated with the UE when connected to the first and/or to the target node, that the target node receives from the UE upon a mobility event of the UE from the source node to the target node.

In one embodiment, the source node can use UE-ESAI reports received from a plurality of UEs to determine an order among the UEs to be transferred towards the target node for load balancing purpose. For example, among the candidates for load balancing, the source node prioritizes UEs with higher energy consumption or higher increase in energy consumption over a period of time. As another example, among the candidates for load balancing, the source node prioritizes wireless terminals with lower energy efficiency or higher decrease in energy efficiency over a period of time.

The source node an also use the UE-ESAI reports to generate aggregated UE-ESAI (e.g., an aggregated energy metric, such as the total amount of energy consumed for the group of UEs or an average UE efficiency for the group of UEs). The source node can then share the aggregate UE-ESAI with the target node.

Embodiments for First Coordination Message

In one embodiment, the first coordination message 901 comprises one or more of the information element identified in the below:

A UE identifier (such as a C-RNTI) (or a group of UE identifiers);

An indication related to the support and/or capabilities of the identified UE(s) for storing and/or reporting information pertaining energy related metrics. Thereby the first network node can notify to the second network node the possibility of configuring the identified UE to collect UE-ESAI. In one example, the indication may comprise one or more in the group of:

One or multiple single bits of information, each associated with one capability/support for storing and/or reporting UE-ESAI;

An indication of available storage for UE-ESAI;

A list of one or more energy metrics (e.g., energy or power measurements) that can be configured for the UE to store and/or report. The second network node can indicate or request to the first network node that at least one UE indicated by the first coordination message is configured to store UE-ESAI;

A request to acknowledge whether a UE or group of UEs connected to the first network node should be configured for storing and/or reporting UE-ESAI;

A request to provide a list of one or more energy metrics that the UE should be configured to store and/or report;

A request to provide a list of one or more configuration parameters that should be used for configuring the UE to store and/or report UE-ESAI;

A request to provide a UE-ESAI configuration for a UE connected to the first network node for storing and/or reporting UE-ESAI;

One or more recommended/preferred UE-ESAI reporting configurations a UE connected to the first network node for storing and/or reporting UE-ESAI. Thereby, the first network node may inform the second network node of possible configurations that can be used to configure the UE;

In one example, the second network node may confirm at least one of the recommended/preferred configurations or provide a new or modified configuration. In this case, the first network node can configure the UE based on the original recommendation or based on the information received from the second network node;

In another example, the indicated configuration could be used by the second network node upon a mobility event of the UE from the first network node to the second network node;

In another example, the indication configuration(s) may refer to configurations that the UE could use prior to, and/or during, and/or after a mobility event from the first network node. In this case, the second network node could indicate one or more preferred configuration to be used for the UE. The first network node can then configure the UE, prior to a mobility event, for storing and/or reporting UE-ESAI, with a configuration known to the second network node and/or preferred by the second network node;

A UE-ESAI reporting configuration for a UE for storing and/or reporting UE-ESAI. In this way, the source node provides to the target node UE-ESAI reporting configuration for the UE. In one example, the first coordination message may comprise an indication of at least an UE-ESAI configuration already configured and/or currently used by the UE (that is, the current configuration for the UE);

One or more UE-ESAI reports that have been receive from one or more UEs. In this way, the source node can provide to the target node a previously retrieved UE-ESAI reports from one or more UEs within a previous time interval;

An indication acknowledging one or more configuration received from the source node for a UE (or group of UEs);

In one example, a positive acknowledgement is used to confirm that a configuration provided by the second network node is or will be used to for the UE(s);

In another example, a negative acknowledgment is used to reject (fully or in part) a configuration provided by the second network node.

The configuration indicated by the first network node with the first coordination message may therefore be associated with a UE when connected to the first network node a UE when connected to the second network node (e.g., upon a successful mobility event from the first network node to the second network node).

In another embodiment, the first network node may transmit the first coordination message to acknowledge, reject and/or modify part or all the information received with second coordination message from the second network node. In this case, the first network node may receive a second coordination message from the second network node prior to transmitting a first coordination message, as illustrated in FIG. 10. Thereby, as specified above, the first coordination message may comprise comprises a positive acknowledgment (ACK) or a negative acknowledgment (NACK) in response to receiving (from the second network node) a second coordination message associated with a UE connected to the first network node.

Embodiments Related to the Second Coordination Message

In one embodiment, second coordination message 902 can include one or more of the information elements described above with respect to the first coordination message 901.

Accordingly, the second coordination message may comprise a positive acknowledgment (ACK) or a negative acknowledgment (NACK) in response to a first coordination message that includes a request to acknowledge whether a UE connected to the first network node should be configured for storing and/or reporting UE-ESAI. In this case, the first network node receives either a confirmation or a rejection to configure the UE for storing and/or reporting UE-ESAI.

In one embodiment, the second coordination message may comprise an indication or a request to configure a UE connected to the first network node to store and/or report UE-ESAI. In one example, the second network node receives a first coordination message comprising one or more one UE identifiers associated with UEs connected to the first network node and/or an indication of the UEs capabilities of storing and/or reporting UE-ESAI, and the second network node may transmit a second coordination message indicating to the first network node which UE to configure for storing and/or reporting UE-ESAI, and/or at least a UE-ESAI configuration to be used for least a UE indicated by the second network node, and/or at least list of one or more energy metrics that can be configured for the UE to store and/or report.

In one embodiment, the second coordination message may comprise a list of one or more energy metrics that should be configured for at least a UE to store and/or report. In this case, the second network node may indicate to the first network node what energy metrics are relevant to be configured for the UE. In one example, the second network node may receive a first coordination message comprising a request to provide a list of one or more energy metrics.

In one embodiment, the second coordination message may comprise a list of one or more configuration elements that should be used for configuring a UE to store and/or report UE-ESAI. In this case, the second network node may indicate to the first network node part of the configuration elements for configuring the UE, for example upon receiving a first coordination message requesting such information.

In one embodiment, the second coordination message may comprise a configuration a UE connected to the first network node for storing and/or reporting UE-ESAI. In one example, the second network node provides a configuration for storing and/or reporting UE-ESAI to the first network node upon receiving a first coordination message from the first network node requesting a configuration for storing and/or reporting UE-ESAI for at least a UE connected to the first network node.

In another example, the second network node may provide a modified configuration for storing and/or reporting UE-ESAI to the first network node upon receiving a first coordination message from the first network node comprising a recommended/preferred configuration for storing and/or reporting UE-ESAI for at least a UE connected to the first network node.

In yet another example, the second network node may indicate to the first network node a configuration to be used for UEs connected to the first network node. Such configuration could be a configuration preferred by the second network node or a requested configuration to be used for the UEs. For instance, in case of a mobility event of a UE from the first network node to the second network node, the second network node may determine the configuration to use for the UE prior to the mobility event.

In addition, the UE-ESAI configuration may be associated with the UE when connected to the first network node or when connected to the second network node (e.g., upon a successful mobility event from the first network node to the second network node) or both.

In another embodiment, the second coordination message may comprise an indication associated with configuring a UE or a group of UEs connected to the first network node for storing and/or reporting UE-ESAI. The indication may be associated, for instance, to at least a recommended/preferred configuration received by the second network node in a first coordination message. Accordingly, one possible option is that the indication included in the second coordination message simply indicates to the first network node that the first network node should configure the UE to store and/or report UE-ESAI. Another option is that the indication included in the second coordination indicates to the first network node that the first network node should modify a proposed configuration for the UE or the group of UEs for storing and/or reporting UE-ESAI.

In one embodiment, the second coordination message may comprise a request to configure a UE (our group of UEs) connected to the first network node for storing and/or reporting UE-ESAI. The second coordination message may additionally include a configuration for configuring the UE(s) to perform the storing and/or reporting of the UE-ESAI. The request to configure the UE(s) may additionally be associated with the UE(s) when connected to the first network node, when connected to the second network node (e.g., upon a successful mobility event from the first network node to the second network node), or both.

In on example, illustrated in FIG. 11, the second network node may receive a legacy handover request message transmitted by the first network node, where the handover request message is associated with a UE or a group of UEs connected to the first network node. In response, the second network node may transmit a second coordination message in response to the request.

In one embodiment, the second coordination message is transmitted/received as part of a HANDOVER RESPONSE message, as illustrated in FIGS. 11 and 12.

In another embodiment, the second coordination message is contained within an RRC message. In one example, when the second coordination message comprises a UE-ESAI configuration, an RRC message could be used to exchange the configuration from the first network node to the second network node.

In one example, the first network node is a distributed unit (DU) of a RAN node with split architecture and the second network node is a centralized unit (CU) of the RAN node. Examples are the gNB-DU and the gNB-CU of an NG-RAN node of a 3GPP NG-RAN system. In this case, according to other embodiments, the gNB-CU may transmit to the gNB-DU a second coordination message comprising at least a recommended or a mandatory configuration for storing and/or reporting UE-ESAI associated with least a UE of the gNB-DU.

In this case, the gNB-DU, according to other embodiments, may either configure the at least one UE with the configuration indicated by the gNB-CU, or determine a new or modified configuration to configure the UE for storing and/or reporting UE-ESAI. In the latter case, the gNB-DU may further transmit a first coordination message to the gNB-CU indicating the new or modified configuration determined for the at least one UE.

Embodiments Related to the Third Coordination Message

As noted above with respect to FIG. 9, in some embodiments, the first network node may transmit to the second network node third coordination message 963, which may indicate a successful or unsuccessful termination of the coordination procedure. Accordingly, third coordination message 963 may include: i) a positive acknowledgement (ACK) indicating a successful termination of the coordination procedure or ii) a negative acknowledgement (NACK) indicating a successful termination of the coordination procedure; in this case, the third coordination message may additionally comprise a cause for the failure.

In one embodiment, the third coordination message may comprise information associated with a UE-ESAI configuration for a UE, where the UE-ESAI configuration for the UE was determined by the first network node based on the coordination procedure between the first and the second network node, e.g., based on information included in the second coordination message. In this way, the first network node can use the third coordination message to inform the second network node of the UE-ESAI configuration that will be used for the UE (e.g. that will be provided to the UE).

In another embodiment, the third coordination message may further comprise an indication acknowledging one or more UE-ESAI configuration(s) received from the second network node. For example, the second coordination message 962 received at the first network node may contain one or more UE-ESAI configurations for one or more UEs. In one example, the third coordination message comprises, for each UE-ESAI configuration included in the second coordination message, a positive acknowledgement (ACK) or a negative acknowledgement (NACK), where the ACK confirms that the first network node has approved the UE-ESAI configuration and the NACK is used to indicate that the first network node does not approve the UE-ESAI configuration.

Embodiments Related to the Fourth Coordination Message

As noted above, the coordination procedure may be initiated by the second network node. In such an embodiment, the first network node may receive fourth coordination message 1002, which is transmitted by the second network node and which may indicate a successful or unsuccessful termination of the coordination procedure. For example, fourth coordination message 1002 may include an ACK indicating a successful termination of the coordination procedure or it may include or a NACK indicating an unsuccessful termination of the coordination procedure; in this case, the fourth coordination message may additionally comprise a cause for the failure Embodiment Related to the Fifth Coordination Message As noted above with respect to FIG. 13, in one example, the first network node receives fifth coordination message 1302, which may comprise at least one UE-ESAI report associated with a UE (e.g., a UE-ESAI report generated by the UE and provided to the second network node). In one example, when the UE has completed a mobility event from the first network node to the second network node (e.g., after the UE has established an RRC connection with the second network node), the UE may report UE-ESAI to the second network node, wherein the reported information may be associated with the UE when connected to the first network node and/or the UE when connected with the second network node.

In this example, the first network node may have configured the UE to store and/or report the UE-ESAI prior to the mobility event (e.g., prior to the mobility event, the first network node may have transmitted a UE-ESAI configuration to the UE which configured the UE to store UE-ESAI), and the second network node may have retrieved all or part of the UE-ESAI stored by the UE during the mobility event. Thereby, the second network node may forward the retrieved UE-ESAI in a UE-ESAI report to the first network node. This allows the first network node to optimize future UE configurations for energy efficiency in the presence of mobility events by means, for instance of a machine learning or other artificial intelligence techniques or algorithms.

In an embodiment, the fifth coordination message may further comprise a new and/or modified UE-ESAI configuration used by the UE for storing and/or reporting UE-ESAI, and/or an indication of the UE state corresponding to the report. The UE state information may include: i) antenna configuration, Carrier Aggregation and transmission mode; ii) traffic information; iii) service type; iv) mobility information; and/or radio related measurements, such as RSRP, RSRQ, RSSI, Timing advance (distance to Base Station).

In one example, the second network node may (re-) configure the UE with a new and/or modified configuration to continue and/or resume the storing and/or reporting UE-ESAI, and/or the UE state changes as compared to the existing state while being served by the first node, i.e., changed traffic patterns, new apps activated, new data radio bearer configured to the UE, etc. In this case, in order for the first network node to be able to use the UE-ESAI collected by the UE while connected to the second network node, the first network node may need to further receive the new and/or modified UE-ESAI configuration used by the UE, and an indication of the UE state corresponding to the report.

In one embodiment, the fifth coordination message may further comprise a UE configuration associated with the UE-ESAI report. The UE configuration included in the fifth coordination message may be a new or modified configuration that the second network node has applied to the UE after the mobility event and with respect to which the UE has stored and/or reported UE-ESAI to the second network node.

In some embodiments, the fifth coordination message comprises multiple UE-ESAI reports from one or more UEs. In some embodiments, the fifth coordination message comprise combined and/or aggregated and/or processed information associated with one or multiple UE-ESAI reports. In this case, fifth coordination message may comprise statistical measurements, such as standard average, deviation, maximum and minimum values for at least a type of energy metric comprised in the UE-ESAI report(s) received from one or more UEs.

In one example, wherein the first network node and the second network node are RAN nodes, such as a NG-RAN node or an EUTRAN node, the second network node may transmit the fifth coordination message to the first network node using an X2 or and Xn interface of a 3GPP NR and/or LTE system.

In another example, the first and the second network nodes are logical nodes of a RAN node with split architecture. In one example, the second network node is a distributed unit of a NG-RAN node (e.g., a gNB-DU) and the first network node is a centralized unit of an NG-RAN node (e.g, a gNB-CU). In this case, the gNB-CU may further be connected to another gNB-DU serving the UE prior to the mobility event. In this case, the first and the second network node may exchange the fifth coordination message using an F1 interface of a 3GPP NR system.

UE-ESAI

In one embodiment, the UE-ESAI that the first network node and/or the second network node may configure a UE to store and/or report may comprise one or more energy metrics (e.g., measurements and/or predictions and/or estimates of energy metrics of the UE, such as power/energy consumption, power/energy efficiency, etc.). The UE may predict/estimate an energy metric based on energy estimation model to which the UE has access (e.g., the model may be provided to the UE by a network node). For instance, inputs to the model may include the amount of data in the UE's transmit buffer and the transmit power, and based on this input information and the model, the UE can estimate the amount of energy it will consume to clear its buffer. In some embodiments, each energy metric is associated with one or more operations, functions, configurations, such as the following:

Discontinuous Transmission (DTX) configuration

One or more MIMO transmission mode

MIMO configuration, such as maximum number of layer

Radio measurements, such as RRM measurements configuration

Carrier aggregation configuration

Dual connectivity configuration

Quality of service (QoS) configuration

Quality of experience (QoE) configuration

In one example, each energy metric included in the UE-ESAI may be associated with a set of parameter settings (e.g., one energy metric included in the UE-ESAI may be associated with a DTX configuration parameter, whereas another energy metric may be associated with a MIMO transmission mode parameter). In addition, operation/function for which the UE has store and/or report one or more UE-ESAI may be operation/function configured at the UE or potential configurations for the UE.

In one embodiment, UE-ESAI may comprise measurement and/or prediction and/or estimate of an energy metric.

The list below provides examples of types of energy metrics that may be included in UE-ESAI:

power and/or battery consumption of the UE (measured, estimated, or predicted) associated with or more operations/functions configured for the UE;

power and/or battery saved by the of the UE (measured, estimated, or predicted) associated with or more operations/functions configured for the UE;

power and/or battery efficiency of the of the UE (measured, estimated, or predicted) associated with or more operations/functions configured for the UE; and power and/or batter lifetime increase or decrease (measured, estimated, or predicted) associated with or more operations/functions configured for the UE.

In one embodiment, UE-ESAI may further comprise an indication of the time when the UE-ESAI is taken and/or the time validity. For example, each energy metric included in the UE-ESAI may be associated with one or more of:

a time stamp indicating the time at which the UE obtained (e.g., measured or estimated) the energy metric;

first time interval information indicating a time interval applicable for the energy metric (e.g., the UE-ESAI may contain information specifying that the UE consumed X amount of energy within the last 24 hours and/or specifying that, over the last 24 hours, the UE had an energy efficiency of X %); and second time interval information indicating a validity period for the energy metric (i.e., the energy metric is only valid for the indicated time interval).

In one embodiment, the energy metrics included in the UE-ESAI may be:

an energy metric indicated as an absolute value (e.g., a power consumption value, remaining energy value, energy consumption value, energy efficiency value). For example: power level in mW, energy consumption in Joule;

an energy metric indicated as a percentage (for power consumption, remaining power, energy consumption, energy efficiency), wherein a value (e.g. 0) indicates a minimum level and another value (e.g. 100) indicates a maximum level;

an energy metric indicated as relative increase or decrease, compared to a reference, wherein a positive value indicates an increase of the metric (or vice versa) and a negative value indicate a decrease of the metric (or vice versa). For example: a positive value X_1 can indicate that the energy efficiency has increased (positive effect) compared to a reference value of X_ref; or a positive value Y_1 can indicate that the energy consumption has increased (negative effect) compared to a reference value of Y_ref (relative increase or decrease can be in absolute values or in percentage);

an energy metric indicated in qualitative sense; for example, a scalar indicating if the energy efficiency is considered as good, medium, poor;

an energy metric indicated as score value (measured, estimated, or predicted) associated with or more operations/functions configured for the UE;

A delta/offset value for a measurement, estimate, or prediction with respect to a reference value, wherein the value may refer to: an actual measurement, estimate, or prediction or a score value.

In one embodiment, the UE-ESAI comprises one or more measurements and/or predictions and/or estimates of energy metrics associated with the operation of the UE when connected with the first network node or camping in a radio cell controlled by the first network node.

In one embodiment, the UE-ESAI comprises one or more measurements and/or predictions and/or estimates of energy metrics associated with the operation of the UE when connected with the second network node or camping in a radio cell controlled by the first network node.

In one embodiment, the UE-ESAI may comprise measurements and/or predictions and/or estimates of energy metrics of the UE, such as power/energy consumption, power/energy efficiency, etc, in association to one or more network configurations in the group of:

TDD pattern configurations

Spectrum sharing configuration (e.g., between NR and LTE)

Configuration of unlicensed spectrum (e.g., license assisted access for LTE)

Downlink reference signals configuration, such as CRS configuration, SSB beams configurations, discovery reference signal configurations, etc.

Number of configured/available component carriers at a network node

Dual connectivity configuration

Transmission mode configured in one or more radio cells of a network node

MIMO transmission mode

Bandwidth configuration

Downlink transmission power configuration

Cell sleeping mode

Entry and/or exit conditions related to mobility events configured for at least a radio cell and/or a SSB coverage area of a network node, e.g. i) Threshold/offset settings or ii) Time to trigger settings Embodiments Related the First UE-ESAI Message In one embodiment, the first network node transmits the first UE-ESAI message comprising a UE-ESAI configuration for a UE, where the UE-ESAI configuration was determined by either the first or the second network node. The UE-ESAI configuration may be for use by the UE i) when the UE connected to the first network node, ii) when the UE is connected to the second node (e.g., the UE-ESAI configuration may be active upon a successful mobility event from the first network node to the second network node), or iii) when the UE is connected to either network node.

In one embodiment, the UE-ESAI configuration for a UE may comprise information elements in the group of:

A list of instructions to start, stop, pause, resume or modify the storing and/or reporting of UE-ESAI, such as explicit commands or triggering conditions to be evaluated by the UE;

A list of measurements and/or predictions and/or estimates for one or more types of energy metrics;

A list of information not directly related to any UE-ESAI metric;

A list of instruction for reporting the stored UE-ESAI to the first network node;

A list of instruction for reporting the stored UE-ESAI to the second network node.

Method and Embodiments for Second Network Node

In one aspect this disclosure provides a method executed by the second network node for coordinating with the first network node to establish a UE-ESAI configuration for a UE or a group of UEs. The method includes the second network node receiving a first coordination message transmitted by the first network node, where the first coordination message is associated with at least one UE connected to the first network node, and the first coordination message comprises configuration information related to configuring the UE to store and/or report UE-ESAI (e.g., the first coordination message comprises a UE-ESAI configuration).

In one embodiment, the second network node may additionally perform the steps of: generating, based on the first coordination message (e.g., based on the configuration information included in the first coordination message), a second coordination message comprising configuration information related to configuring the UE to store and/or report UE-ESAI and transmitting the second coordination message to the first network node.

In one embodiment, the second network node may additionally receive a third coordination message transmitted by the first network node indicating a successful or unsuccessful termination of the coordination procedure; or transmit a fourth coordination message to the first network node indicating a successful or unsuccessful termination of the coordination procedure.

Figure 14:
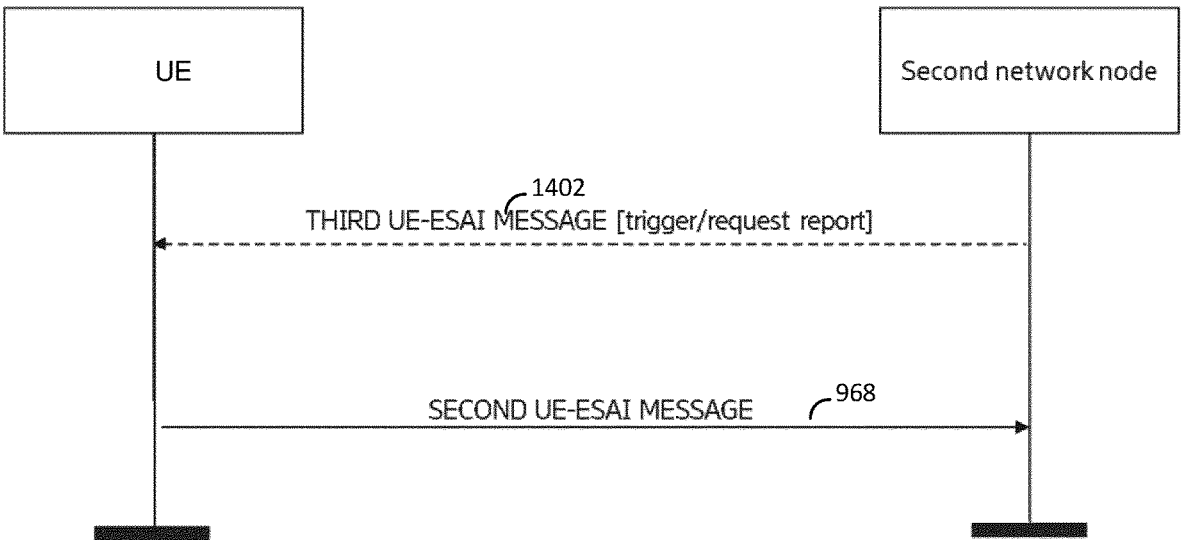
FIG. 14 illustrates a message flow according to some embodiments.

The method performed by the second network node may additionally comprise one or more steps for retrieving UE-ESAI that a UE has been configured to store by the first or second network node. In one embodiment, illustrated in FIG. 14, the second network node may transmit a third UE-ESAI message 1402 to at least one UE, where the third UE-ESAI message requests the UE to report part of or the complete set of the UE-ESAI stored by the UE (e.g., the third UE-ESAI message triggers or configures the UE to send to the second network node the UE-ESAI). Accordingly, in this embodiment, the second network node receives a second UE-ESAI message 968 transmitted by the UE, wherein the second UE-ESAI message includes a UE-ESAI report including at least part of or the complete set of the UE-ESAI stored by the UE.

In one embodiment, newly defined signaling procedures and messages can be used (e.g. TRIGGER ASSISTANCE INFORMATION—or the like—from a first network node to a user terminal and report ASSISTANCE INFORMATION—or alike—from a user terminal to a first network node), either specifically designed to signal UE-ESAI related information, or more generic procedures and messages, in which case UE-ESAI-related information can be comprised in the newly defined procedures/messages together with other non-UE-ESAI related information.

Figure 15:
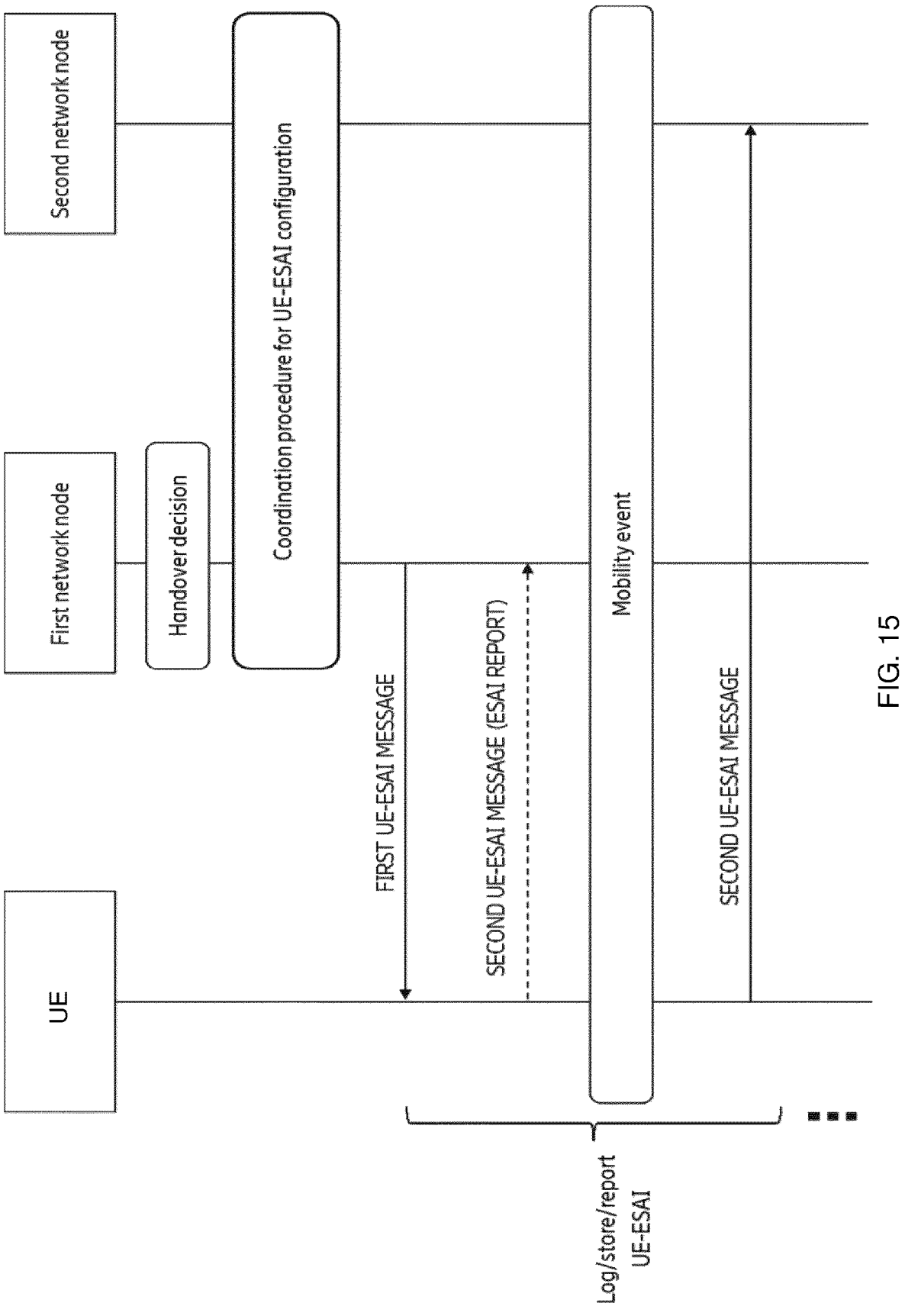
FIG. 15 illustrates a message flow according to some embodiments.

In one embodiment, illustrated in FIG. 15, the second network node receives the second UE-ESAI message from the UE comprising the UE-ESAI report without prior transmission of a third UE-ESAI message to the UE to request the UE to report part of or the complete set of the available UE-ESAI. For example, the first node may configure the UE to report UE-ESAI to the second network node in response to an event (e.g., a mobility event such as the completion of a handover from the first network node to the second network node).

In one example, the first network node may be the source node of the mobility event, whilst the second network node may be the target node of a mobility event involving the UE. Thereby, the source node may configure the UE to report UE-ESAI to the target node once the UE has established a connection (such as a RRC connection) with the target node. The source node and the target node of the mobility event may additionally coordinate prior to the mobility event to negotiate a reporting configuration for the UE. Once the mobility event is successfully completed and the UE has established a connection with the target node, such as a RRC connection, the UE can begin the UE-ESAI reporting as instructed by the source node.

Figure 16:
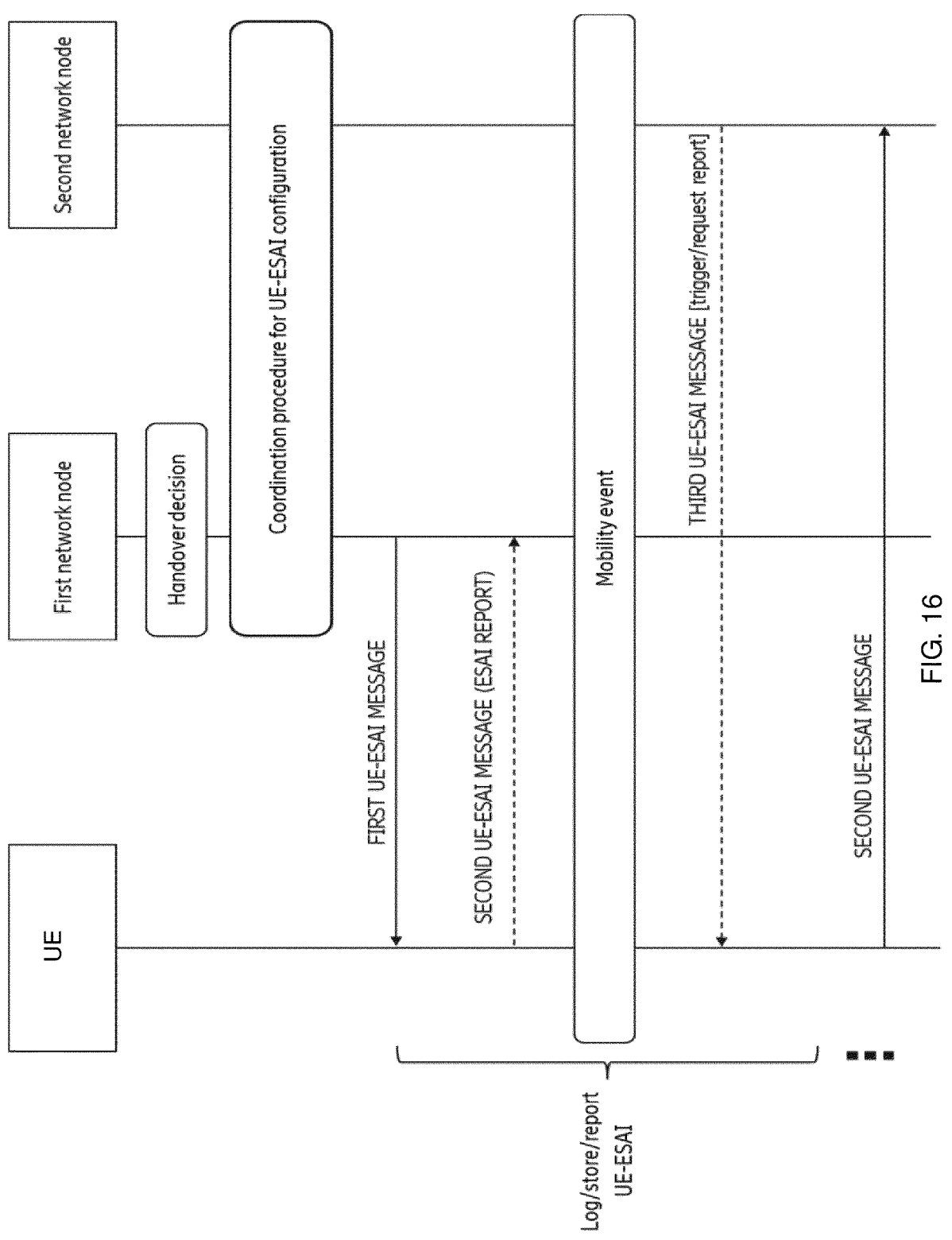
FIG. 16 illustrates a message flow according to some embodiments.

In one embodiment, illustrated in FIG. 16, the second network node transmits the third UE-ESAI message to the UE to trigger the UE to transmit the second UE-ESAI message to the second network node. The third UE-ESAI message may comprise a reporting configuration that a UE can/should use to generate the UE-ESAI report that is included in the second UE-ESAI message.

In one example, the second network node may transmit the third UE-ESAI message as part of a signaling procedure intended to trigger the reporting of UE-ESAI from the UE, for instance, upon successful completion of a mobility event from a first network node (the source node of the mobility event), as illustrated in FIG. 16. Therefore, in this example, the source node may configure the UE only to store UE-ESAI prior to, during and after a mobility event, but not necessarily to transmit a UE-ESAI report to the target node upon a successful completion of the mobility event. The target node, by means of the third UE-ESAI message, may trigger the UE to report the UE-ESAI collected prior to, during and after the mobility event. Thereby, the reported UE-ESAI may refer to when the UE has a connection with the source node and/or to when the UE has established a connection with the target node.

In one embodiment, pre-existing signaling procedures, such as a 4-step or 2-step random-access procedure used by the UE to set up a connection with the second network node, an RRC connection establishment, or a RRC reconfiguration), can be used for the method. In one example, the second network node may transmit the third UE-ESAI message as part of a messages transmitted during a random-access procedure of the UE, as illustrated in FIG. 17A and FIG. 17B.

Figure 17A:
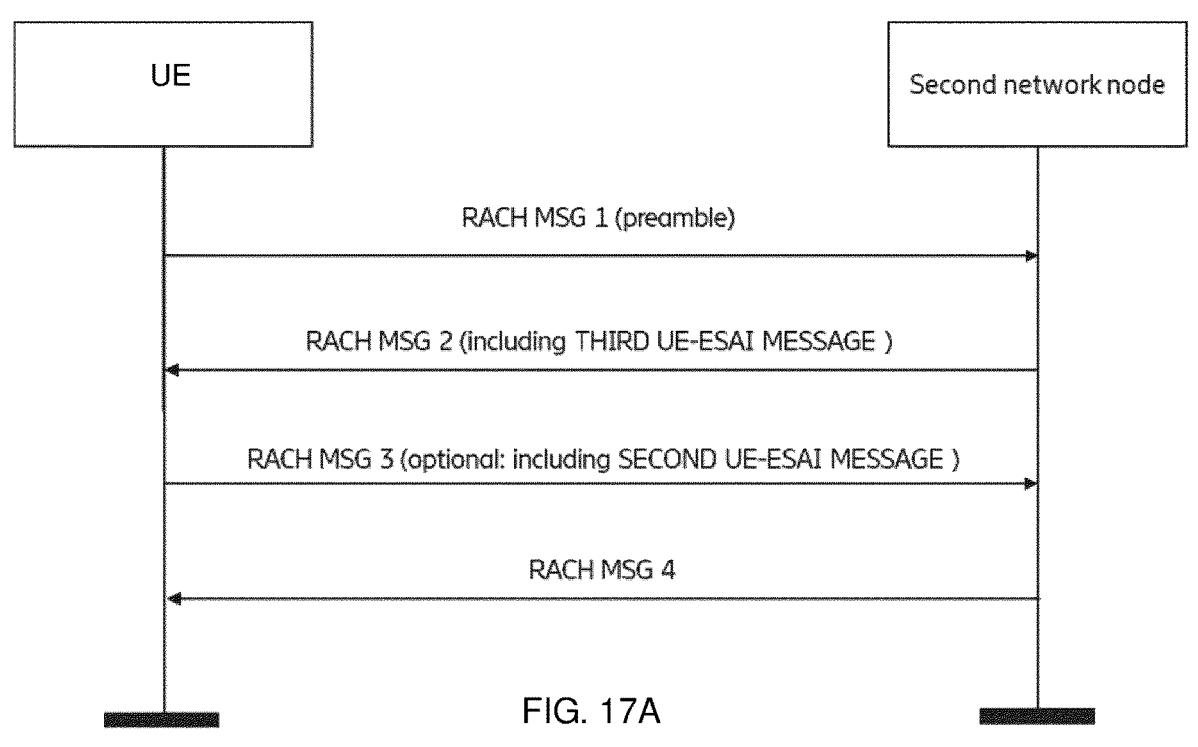
FIG. 17A illustrates a message flow according to some embodiments.

In one example, shown in FIG. 17A, the second network node transmits entirety or a part of the third UE-ESAI message within a 4-step random access PRACH response message (also known as RACH MSG-2) of the random-access procedure of an LTE-A or NG-RAN system. In this case, the second network node may additionally receive the second UE-ESAI message comprising a UE-ESAI report as part of a random-access message-3 (also known as RACH MSG-3).

Figure 17B:
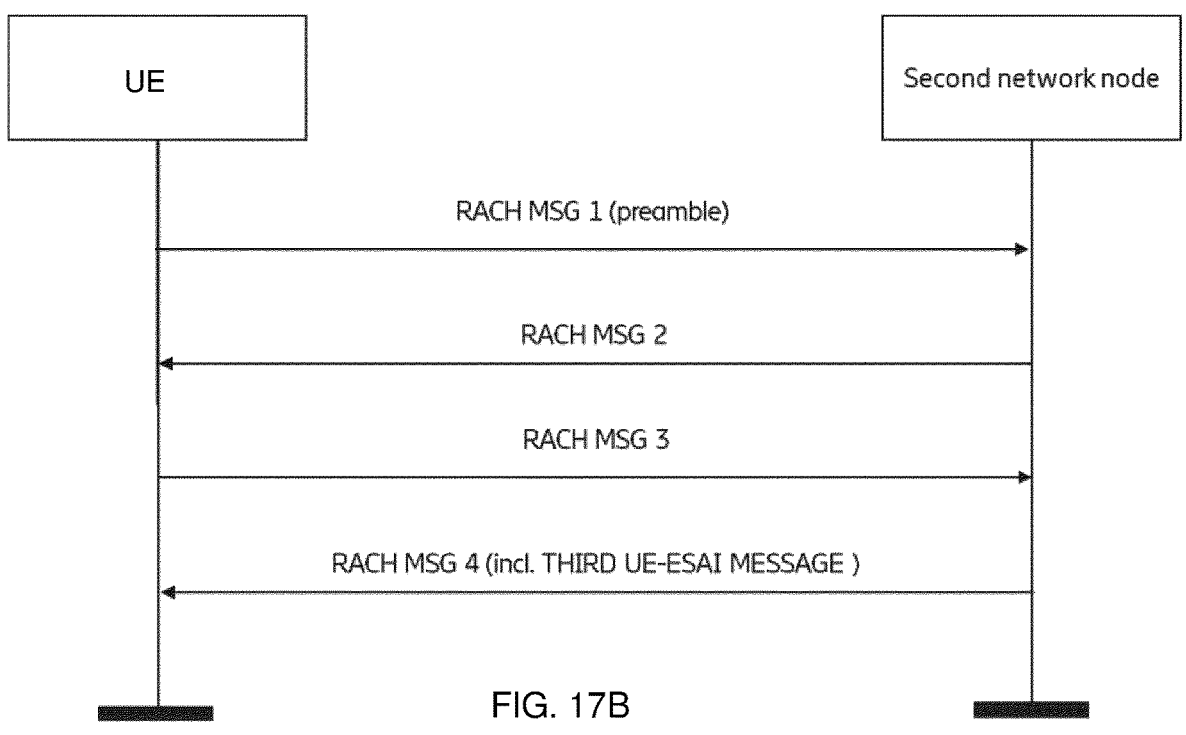
FIG. 17B illustrates a message flow according to some embodiments.

In an alternative example, showed in FIG. 17B, the second network node may transmit the entirety or part of the third UE-ESAI message as part of a RRC connection setup message (also known as RACH MSG-4) of the random-access procedure of an LTE-A or NG-RAN system. This has the benefit to configure the UE to report link UE-ESAI prior to start receiving user data plane transmission, such as PDSCH transmissions, from the second network node.

In another example, the second network node transmits the entirety or a part of the third UE-ESAI message within an MSG-A message of a 2-step random access procedure. In this case, the second network node may additionally receive the second UE-ESAI message comprising a UE-ESAI report as part of an MSG-B message of 2-step random access procedure.

Figure 18:
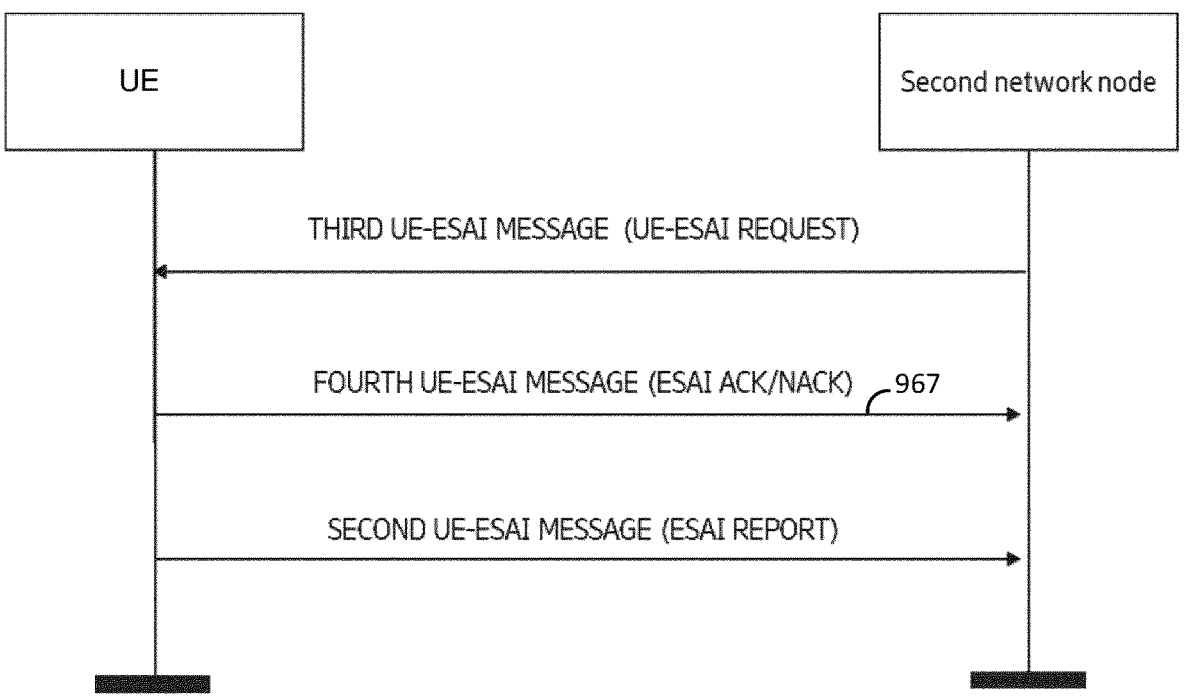
FIG. 18 illustrates a message flow according to some embodiments.

In one embodiment where the second network node transmits the third UE-ESAI message, the method performed by the second network node may further comprise receiving a fourth UE-ESAI message 967 (see FIG. 9 and FIG. 18) transmitted by the UE, wherein the fourth UE-ESAI message may indicate whether the UE can report all, part of, or none of the requested UE-ESAI, and/or whether the UE supports the reporting in the requested format.

In one example, the fourth UE-ESAI message may comprise one of: A) an ACK indicating a successful initialization or a partially successful initialization of the UE-ESAI reporting; in case of a partial successful initialization, the message may comprise additional information indicating, for instance, that: a) one or more of the requested UE-ESAI elements are not available (e.g., the UE was not configured to store certain type of energy metric) or b) one or more of the requested UE-ESAI elements are not available in the format requested by the first network node, such as in the granularity over time, frequency and space requested by the first network node; in this case, the message may indicate in which format the requested information is available or B) a NACK indicating an unsuccessful initialization of the UE-ESAI reporting; n this case, the message may additionally comprise a cause for the failure (e.g. requested information not available, or reporting format not supported).

In one embodiment, the second network node receives the fourth UE-ESAI message from the UE as part of a pre-existing signal/message and/or procedures (such as a legacy signal/message) supporting existing operations, procedures or functions between the second network node and the UE. In one example, the second network node receives the fourth UE-ESAI message as part of a 4-step random-access procedure, such as the RRC connection request message (also known as RACH MSG-3) received by the second network node form the UE as part of the random-access procedure of an LTE-A or NG-RAN system. In another example, the second network node receives the fourth UE-ESAI message as part of a 2-step random access procedure, such as an MSG-B received by the second network node from the UE.

In one embodiment, the third UE-ESAI message may include the same information that is included in the above described first UE-ESAI message. Thereby, the third UE-ESAI message may comprise a new or a modified UE-ESAI configuration for the UE to resume and/or continue storing and/or reporting UE-ESAI when connected to the second network node. In this case, the third UE-ESAI message may comprise one or more of reporting information:

A list of instructions to start, stop, pause, resume or modify the storing and/or reporting of UE-ESAI, such as explicit commands or triggering conditions to be evaluated by the UE A list of measurements and/or predictions and/or estimates for one or more types of UE-ESAI metrics, as described in other embodiments (see cf. Section [0187]), to be stored and/or reported A list of information not directly related to any UE-ESAI metric.

A list of instruction for reporting the stored UE-ESAI to the second network node.

Thereby, the second network node may additionally configure the UE to start, stop, pause, resume, or modify the storing of UE-ESAI based on a pre-existing configuration of the UE (such as, for instance, a configuration that the first network node has configured the UE to use prior to a mobility event to the first network node). In addition, the second network node may configure the UE to start or resume the storing and reporting of UE-ESAI based on a new configuration provided by the second network node itself.

In one embodiment, the third UE-ESAI message transmitted by the second network node may trigger the UE to report to the second network node UE-ESAI that the UE may have stored while connected to the first network node and/or stored while connected to the second network node.

In one embodiment, the second network node may transmit the third UE-ESAI message comprising a request for the UE to send a UE-ESAI report. In this case, the third UE-ESAI message may comprise one or more of:

a request of availability for UE-ESAI stored, wherein the UE-ESAI may have been stored while the UE was connected to a second network node or to the first network node;

a request for specific types of UE-ESAI;

a request for the granularity used to store one or more type of UE-ESAI, such as over time, frequency and/or spatial domain;

a request to transmit the configuration used by the UE to store UE-ESAI;

a request for availability to continue storing and/or reporting UE-ESAI;

a request to provide the current configuration used by the UE for storing and/or reporting UE-ESAI.

In one embodiment, the second network node may transmit the third UE-ESAI message comprising a UE-ESAI configuration for the UE. In this case, the third UE-ESAI message may comprise one or more of: i) a list of instructions to start, stop, pause, resume reporting some or all the UE-ESAI stored by the UE, such as explicit commands or triggering conditions to be evaluated by the UE or ii) a list of measurements and/or predictions and/or estimates for one or more types of energy metrics to be reported to the second network node.

Embodiments Related to Forwarding UE-ESAI Report to First Network Node

In one embodiment, illustrated in FIG. 13, upon receiving the second UE-ESAI message comprising a UE-ESAI report, the second network node may determine a second UE-ESAI report based at least on the received second UE-ESAI message and transmit the fifth coordination message to at least the first network node, the fifth coordination message comprising at least the second UE-ESAI report.

In one example, the second network node may forward the received UE-ESAI report to the first network node. In another example, wherein the second network node receives multiple UE-ESAI reports from one or more UEs, the second UE-ESAI report may therefore comprise multiple UE-ESAI report received from the one or more UEs, which are forwarded to at least the first network node. In another example, when the second network node receives multiple UE-ESAI reports from one or more UEs, the second network node may combine and/or aggregate the UE-ESAI reports received from the one ore multiple UEs into the second UE-ESAI report. In this case, the second UE-ESAI report may comprise statistical measurements, such as standard average, deviation, maximum and minimum values for at least a type of energy state information metric comprised in the UE-ESAI reports received from one or more UEs.

Embodiments for Node Level Architecture

This section describes some non-limiting examples of the first and second network nodes.

In one embodiment, the first network node is a first RAN node (e.g. a gNB or an eNB) and a second network node is a second RAN node (e.g. another gNB or another eNB) and the communication between the first network node and the second network node can occur directly or indirectly (e.g. via XnAP, X2AP) or via a third network node (e.g. NGAP, S1AP).

In one example, the first network node and the second network node are enhanced NodeBs of 3GPP E-UTRAN system. In this case, the first configuration message and the second coordination message can be exchanged using a X2 interface of the E-UTRAN system (e.g., LTE and/or LTE-A).

In another example, the first network node and the second network node are NG-RAN nodes (e.g., gNB) of a 3GPP NG-RAN system (also knowns as NR system). In this case the first configuration message and the second coordination message can be exchanged using a Xn interface of the NG-RAN system.

Figure 22:
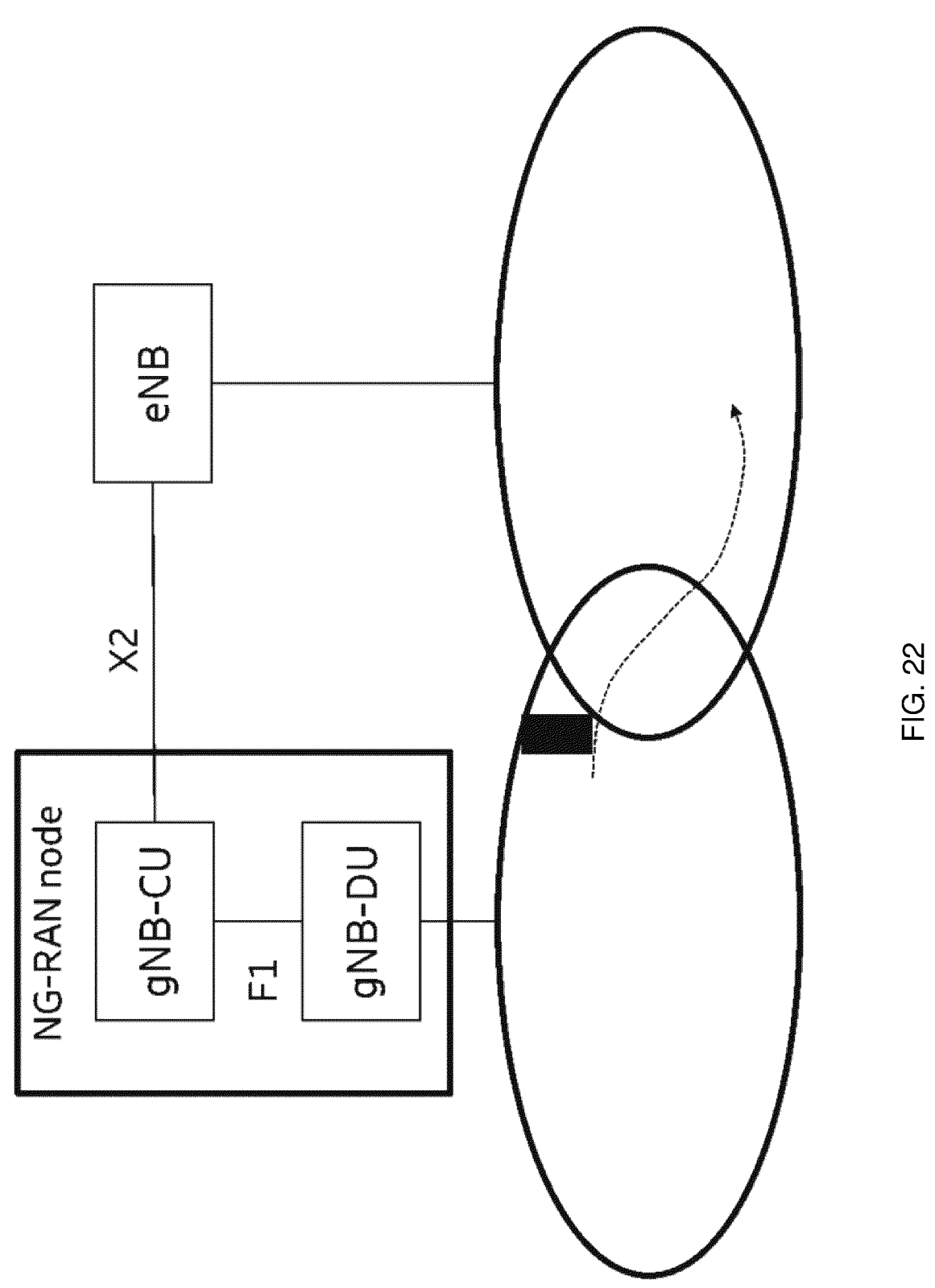
FIG. 22 illustrates a node level architecture according to some embodiments.

In another example, the first network node is an NG-RAN node of an NG-RAN system, while the second network node is enhanced NodeB (i.e., eNB or en-eNB) of an E-UTRAN system. In this case, the first configuration message and the second coordination message can be exchanged using a X2 interface between the E-UTRAN system and NG-RAN system: Without loss of generality, the first network node could be a RAN node or a logical node of a RAN node, such as a gNB-CU, as illustrated in FIG. 22.

In one embodiment with distributed architecture, a first network node is a first logical entity of a RAN node and the second network node is a second logical entity of a RAN node. In one scenario, the first network node and the second network node can be two different logical entities of the same RAN node. In another scenario, the first network node and the second network node are two logical entities of two different RAN nodes. Examples of logical entities of a RAN node are, for in instance, the centralized unit (CU) of an NG-RAN node (e.g., a gNB-CU or the relative control plane node gNB-CU-CP) and the distributed unit (DU) of an NG-RAN node (e.g., a gNB-DU). Additionally, if present, a third network node is a third logical entity of a RAN node (e.g. a second gNB-DU).

Figure 19:
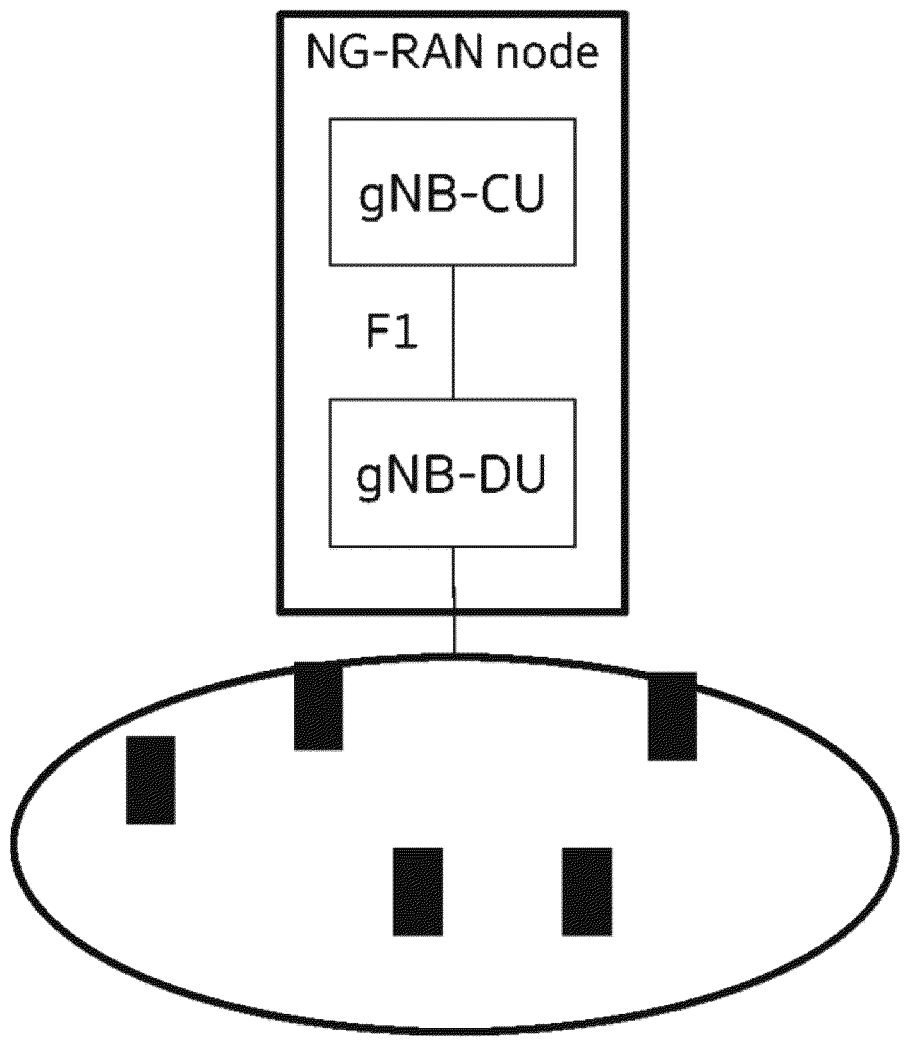
FIG. 19 illustrates a node level architecture according to some embodiments.

In one embodiment, the first network node is a distributed unit (DU) of an NG-RAN node (e.g., a gNB-DU), while the second network node is a centralized unit (CU) of an NG-RAN node (e.g., a gNB-CU or a gNB-CU-CP). In this case, the first configuration message and the second coordination message can be exchanged using a F1 interface of the NG-RAN system, as illustrated in FIG. 19.

In one embodiment, the first network node is a first centralized unit (CU) of a NG-RAN node (e.g., a gNB-CU), while the second network node is a second decentralized unit (DU) of a NG-RAN node (e.g., a gNB-CU). In this case, the first configuration message and the second coordination message can be exchanged using a F1 interface of the NG-RAN system.

Figure 20:
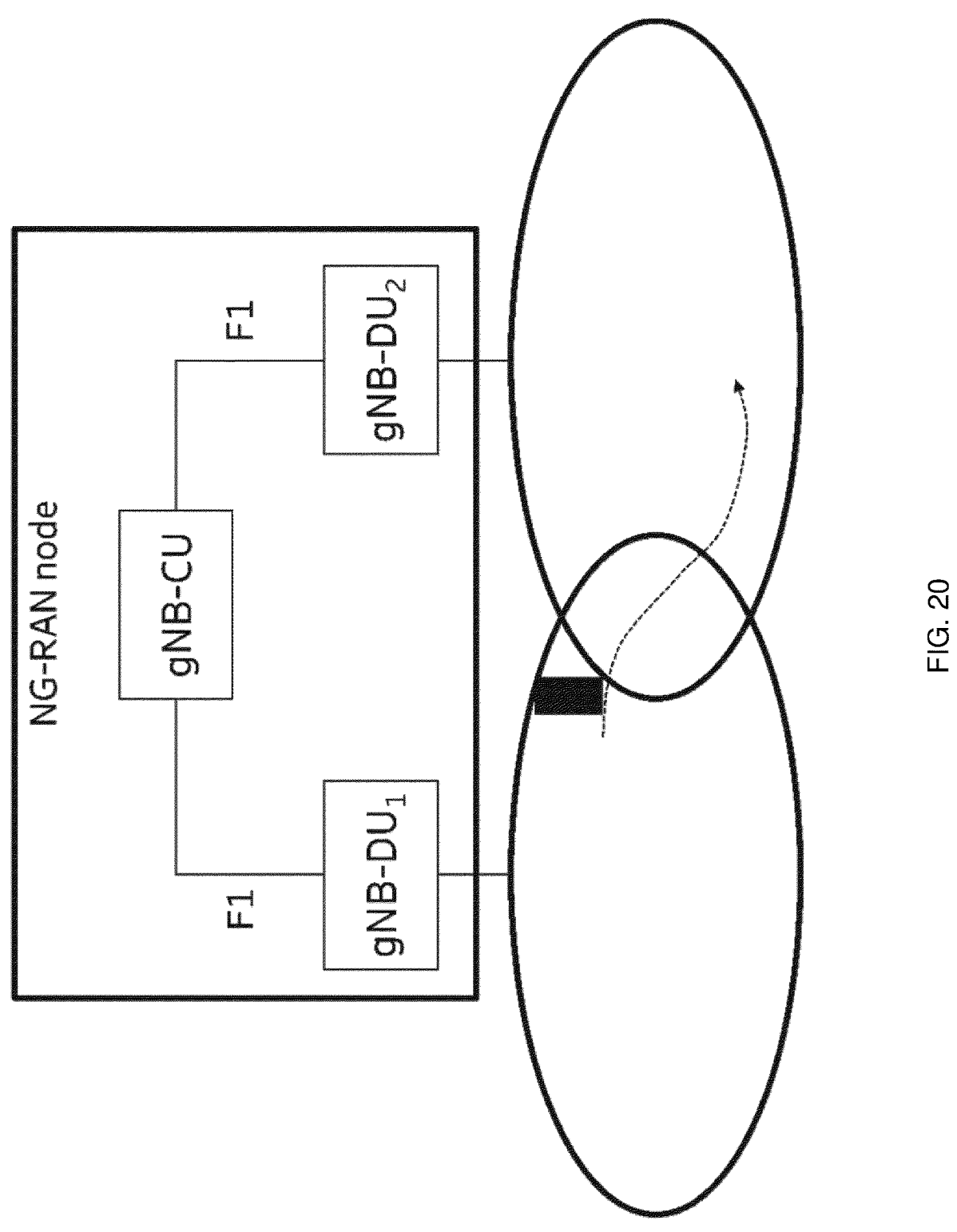
FIG. 20 illustrates a node level architecture according to some embodiments.

FIG. 20 illustrates how one or more of the embodiments of the method can be applied to configure a UE to store and/or report UE-ESAI in the case of mobility events between radio cells controlled by different distributed units (DUs) of a NG-RAN node with split architecture. In this example, an NG-RAN node consists of three or more logical nodes comprising multiple distributed units (i.e., multiple gNB-DUs) controlled by a single centralized unit (i.e., a gNB-CU). Thereby, in one embodiment method can be applied to pairs of nodes in a system with nodes to coordinate the configuration of a UE for storing and/or reporting UE-ESAI. In this example, two gNB-DUs coordinate via a gNB-CU (or the gNB-CU-CP) the configuration of a UE for storing and/or reporting UE-ESAI. The method is thereby applied between the gNB-DU$_1$ and the gNB-CU, with communication over a F1 interface and between the gNB-CU and the gNB-DU$_2$, with communication over a F1 interface.

In one embodiment, the first network node is a first centralized unit (CU) of a first NG-RAN node (e.g., a gNB-CU$_1$), while the second network node is a second centralized unit (CU) of a second NG-RAN node (e.g., a gNB-CU$_2$). In this case, the first configuration message and the second coordination message can be exchanged using a Xn interface of the NG-RAN system, as illustrated in FIG. 21.

Figure 21:
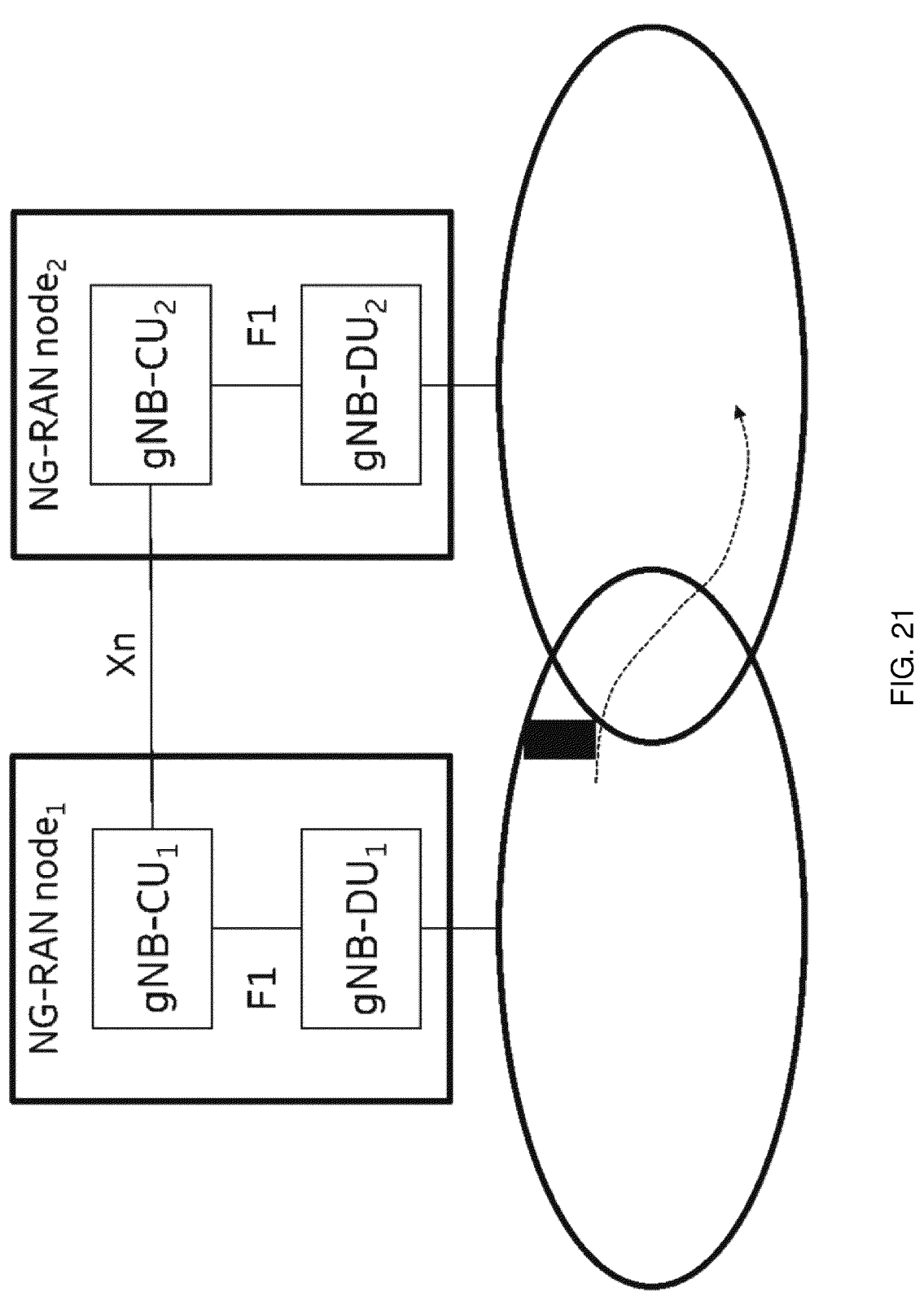
FIG. 21 illustrates a node level architecture according to some embodiments.

FIG. 21 further illustrates how one or more of the embodiments can be applied to configure a UE to store and/or report energy saving related information in the case of mobility events between radio cells controlled by different distributed units (DUs) belonging to two different NG-RAN nodes with split architecture. In this example, two gNB-DUs belonging to two different NG-RAN nodes coordinate via the respective centralized units, i.e. gNB-CU$_1$ and gNB-CU$_2$ (or the gNB-CU$_1$-CP and the gNB-CU$_2$-CP) respectively, to configure a UE for storing and/or reporting UE-ESAI. The method is thereby applied: between the gNB-DU$_1$ and the gNB-CU$_1$, with communication over a F1 interface; between the gNB-CU$_1$ and the gNB-CU$_2$, with communication over a Xn interface; and between the gNB-CU$_2$ and the gNB-DU$_2$, with communication over a F1 interface.

FIG. 22 illustrates how one or more of the embodiments can be applied to configure a UE to store and/or report UE-ESAI in the case of mobility events between radio cells controlled by a NG-RAN nodes with split architecture and an eNB. In this example, a gNB-DU belonging to the NG-RAN node coordinates via its centralized unit, i.e. gNB-CU (or the gNB-CU-CP), with a eNB to configure a UE for storing and/or reporting UE-ESAI. The method is thereby applied between the gNB-DU and the gNB-CU, with communication over a F1 interface and between the gNB-CU and the eNB, with communication over a X2 interface.

UE Embodiments

In another aspect there is provided a UE 900 in a communication network that performs a method for storing and/or reporting UE-ESAI to a first network node and/or a second network node. In one embodiment the method includes the UE receiving the first UE-ESAI message comprising at least a UE-ESAI configuration configuring the UE to store UE-ESAI and/or report UE-ESAI to the first network node and/or to a second network node. The method also includes transmitting the second UE-ESAI message to the first network node and/or the second network node, the second UE-ESAI message comprising at least a UE-ESAI report including part of or the complete UE-ESAI stored by UE. The method may also include receiving the third UE-ESAI message transmitted by the second network node, the third UE-ESAI message requesting the UE to report part of or the complete set of the UE-ESAI stored by the UE. The method may also include transmitting the fourth UE-ESAI message to the second network node, the fourth UE-ESAI message comprising an ACK indicating a successful configuration/initialization of UE-ESAI reporting from the UE or a NACK indicating an unsuccessful or failed configuration/initialization of UE-ESAI reporting from the UE.

Figure 26:
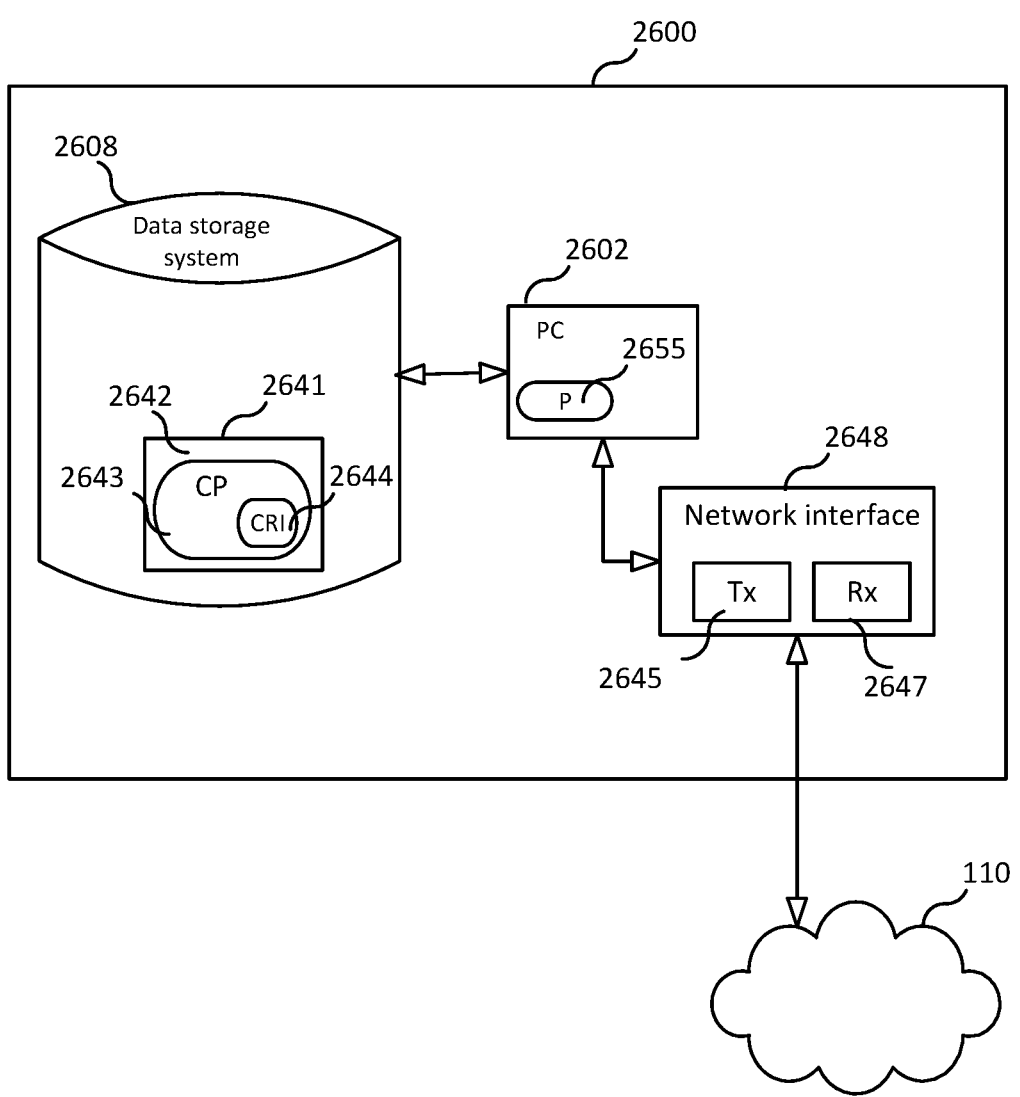
FIG. 26 shows a network node apparatus according to some embodiments.

FIG. 26 is a block diagram of a network node apparatus 2600, according to some embodiments, for performing the network methods disclosed herein (e.g., network node apparatus 2600 may implement first network node 901 or second network node 902). As shown in FIG. 26, apparatus 2600 may comprise: processing circuitry (PC) 2602, which may include one or more processors (P) 2655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 2600 may be a distributed computing apparatus); at least one network interface 2648 comprising a transmitter (Tx) 2645 and a receiver (Rx) 2647 for enabling apparatus 2600 to transmit data to and receive data from other nodes connected to a network 110 (e.g., an Internet Protocol (IP) network) to which network interface 2648 is connected (directly or indirectly) (e.g., network interface 2648 may be wirelessly connected to the network 110, in which case network interface 2648 is connected to an antenna arrangement); and a storage unit (a.k.a., "data storage system") 2608, which may include one or more non-volatile storage devices and/or one or more volatile storage devices. In embodiments where PC 2602 includes a programmable processor, a computer program product (CPP) 2641 may be provided. CPP 2641 includes a computer readable medium (CRM) 2642 storing a computer program (CP) 2643 comprising computer readable instructions (CRI) 2644. CRM 2642 may be a non-transitory computer readable medium, such as, magnetic media (e.g., a hard disk), optical media, memory devices (e.g., random access memory, flash memory), and the like. In some embodiments, the CRI 2644 of computer program 2643 is configured such that when executed by PC 2602, the CRI causes network node apparatus 2600 to perform steps described herein (e.g., steps described herein with reference to the flow charts). In other embodiments, network node apparatus 2600 may be configured to perform steps described herein without the need for code. That is, for example, PC 2602 may consist merely of one or more ASICs. Hence, the features of the embodiments described herein may be implemented in hardware and/or software.

Figure 27:
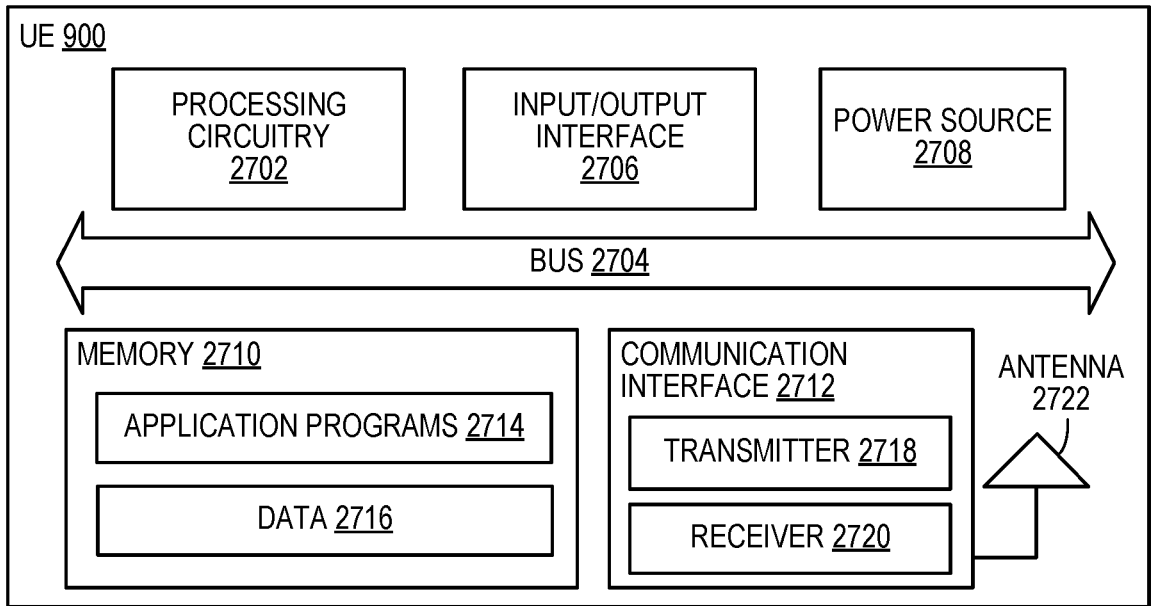
FIG. 27 shows a UE according to some embodiments.

FIG. 27 shows a UE 900 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 900 includes processing circuitry 2702 that is operatively coupled via a bus 2704 to an input/output interface 2706, a power source 2708, a memory 2710, a communication interface 2712, and/or any other component, or any combination thereof. Certain UEs may utilize all or a subset of the components shown in FIG. 27. The level of integration between the components may vary from one UE to another UE. Further, certain UEs may contain multiple instances of a component, such as multiple processors, memories, transceivers, transmitters, receivers, etc.

The processing circuitry 2702 is configured to process instructions and data and may be configured to implement any sequential state machine operative to execute instructions stored as machine-readable computer programs in the memory 2710. The processing circuitry 2702 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2702 may include multiple central processing units (CPUs).

In the example, the input/output interface 2706 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 900. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2708 is structured as a battery or battery pack. Other types of power sources, such as an external power source (e.g., an electricity outlet), photovoltaic device, or power cell, may be used. The power source 2708 may further include power circuitry for delivering power from the power source 2708 itself, and/or an external power source, to the various parts of the UE 900 via input circuitry or an interface such as an electrical power cable. Delivering power may be, for example, for charging of the power source 2708. Power circuitry may perform any formatting, converting, or other modification to the power from the power source 2708 to make the power suitable for the respective components of the UE 900 to which power is supplied.

The memory 2710 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2710 includes one or more application programs 2714, such as an operating system, web browser application, a widget, gadget engine, or other application, and corresponding data 2716. The memory 2710 may store, for use by the UE 900, any of a variety of various operating systems or combinations of operating systems.

The memory 2710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2710 may allow the UE 900 to access instructions, application programs and the like, stored on transitory or non-transitory memory media, to off-load data, or to upload data. An article of manufacture, such as one utilizing a communication system may be tangibly embodied as or in the memory 2710, which may be or comprise a device-readable storage medium.

The processing circuitry 2702 may be configured to communicate with an access network or other network using the communication interface 2712. The communication interface 2712 may comprise one or more communication subsystems and may include or be communicatively coupled to an antenna 2722. The communication interface 2712 may include one or more transceivers used to communicate, such as by communicating with one or more remote transceivers of another device capable of wireless communication (e.g., another UE or a network node in an access network). Each transceiver may include a transmitter 2718 and/or a receiver 2720 appropriate to provide network communications (e.g., optical, electrical, frequency allocations, and so forth). Moreover, the transmitter 2718 and receiver 2720 may be coupled to one or more antennas (e.g., antenna 2722) and may share circuit components, software or firmware, or alternatively be implemented separately.

In the illustrated embodiment, communication functions of the communication interface 2712 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 900 shown in FIG. 27.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Additional Embodiments

Figure 28:
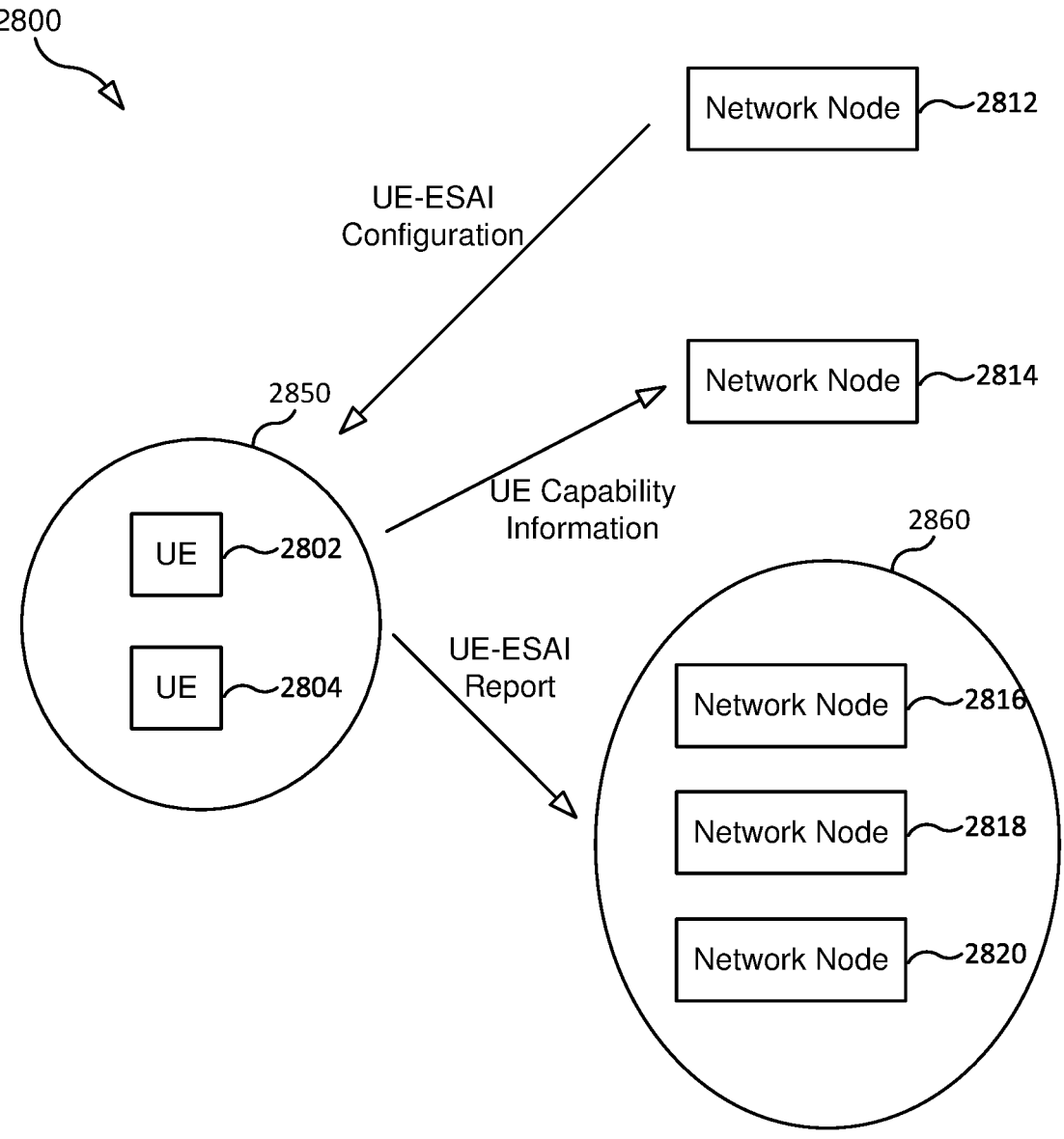
FIG. 28 shows a system according to some embodiments.

FIG. 28 shows a system 2800 according to one embodiment. System 2800 comprises (i) UE group 2850 of UEs (a.k.a., "UE group 2850"), which includes at least UE 2802 and UE 2804, (ii) a network node 2812, (iii) a network node 2814, and (iv) a network node group 2860 of network nodes 2816, 2818, and 2820. The number of UEs and the number of network nodes are provided in FIG. 28 for illustration purpose only and do not limit embodiments of this disclosure in any way. Similarly, the number of UEs included in UE group 2850 and the number of network nodes included in network node group 2860 are provided in FIG. 28 for illustration purpose only and do not limit embodiments of this disclosure in any way.

The term UE (a.k.a., wireless device) is any device (e.g., smartphone, tablet, computer, sensor, appliance, residential gateway, etc.) that is capable of wirelessly communicating with a network node.

The term RAN node and/or network node can refer to LTE or NR technology and may be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, IAB-node, IAB-donor DU, IAB-donor-CU, IAB-DU, IAB-MT, O-CU, O-CU-CP, O-CU-UP, O-DU, O-RU, O-eNB.

5. UE-ESAI Configuration for Collecting, Storing, and Reporting UE-ESAI

In one embodiment, a network node 2812 may transmit towards UE 2802 or UE group 2850 UE-ESAI configuration pertaining to UE-ESAI.

UE-ESAI is information related to energy and/or power aspect of a wireless terminal. UE-ESAI may pertain to an individual wireless terminal, and thus different wireless terminals may have different UE-ESAI.

The UE-ESAI configuration is for (1) regulating how a UE collects and/or stores UE-ESAI, (2) regulating what information is included in UE-ESAI, and/or (3) regulating how a UE reports collected, logged, and/or stored UE-ESAI. In this disclosure, logging is a specific type of storing—storing data in a log file.

A UE-ESAI configuration is a set of information that comprises configuration information related to configuring UE(s) to collect, store, and/or report UE-ESAI (e.g., the UE-ESAI configuration may contain configuration information specifying the type or types of UE-ESAI that the UE should collect, store, and report). Configuring UE(s) to collect, store, and/or report UE-ESAI may mean (1) enabling the UE(s) to collect, store, and/or report UE-ESAI and/or (2) controlling the UE(s) to collect, store, and/or report UE-ESAI in particular ways.

Network node 2812 transmitting the configurations may be the first network node (e.g., a RAN node) that configures UEs or a different network entity (e.g., another RAN node, an OAM node, a CN node, an SMO node, etc.).

Upon receiving the UE-ESAI configuration, UE 2802 may begin to collect and/or store UE-ESAI according to the received UE-ESAI configuration.

5.1 UE-ESAI Configuration for Regulating Collecting and/or Storing of UE-ESAI The UE-ESAI configuration for regulating how UE 2802 collects and/or stores UE-ESAI may specify any one or more of:

an absolute or relative time of collecting and/or storing UE-ESAI or a time interval during which UE-ESAI are to be stored;

a validity time at which stored UE-ESAI is valid or a validity time interval during which stored UE-ESAI is valid;

a maximum (e.g., allowed) size for stored UE-ESAI;

a maximum number of cells/network nodes (e.g., that can be associated with UE-ESAI to be stored at UE 2802);

a sampling rate (e.g., indicating a time interval between consecutive measurements);

filtering conditions pertaining to RRC states, RATs, slices, cells, carriers, tracking areas, and/or PLMNs;

For example, UE-ESAI satisfying the filtering conditions (e.g., associated with a particular RRC state) may be stored. Alternatively, UE-ESAI satisfying the filtering conditions (e.g., associated with a particular tracking area) may be excluded from the collection and the storing.

indications indicating (1) if collecting and/or storing of UE-ESAI should survive (i.e., should continue even after) updates of radio-related (and/or non-radio related) configurations and/or operating conditions or (2) if collecting and/or storing of UE-ESAI should or can be stopped in case radio-related (and/or non-radio related) configurations and/or operating conditions are updated.

the identity of one or more network nodes or cells to which stored UE-ESAI should or can be reported;

an indication indicating to only collect and/or store UE-ESAI when a UE is camped on, connected to, and/or served by a network node;

an indication indicating to continue to collect and/or store UE-ESAI during/after mobility from a network node to another network node;

an indication indicating to continue to collect and/or store UE-ESAI during/after a configuration/reconfiguration of dual connectivity operation;

an indication indicating to continue to collect and/or store UE-ESAI upon/after a configuration/reconfiguration of carrier aggregation in uplink/downlink and/or an addition/removal of cells operating in unlicensed spectrum;

an indication indicating to continue to collect and/or store UE-ESAI upon/after updates of various configuration parameters. Examples of such updates are an update of DRX configuration and a change of TDD configuration;

triggering condition(s) or indication(s) to start, stop, pause, resume, and/or modify UE-ESAI collection and/or storing of particular information comprised in UE-ESAI.

The triggering conditions may be relative to a reference. Nonlimiting examples of such reference include:

a maximum level (e.g., the maximum power of the UE according to the UE power class or the maximum level of energy corresponding to the maximum power);

a maximum configured level of power (or energy consumption, or energy efficiency) associated to one of the RRC states (e.g., RRC_CONNECTED) in which the UE can be;

a minimum configured level of power (or energy consumption, or energy efficiency) associated to one of the RRC states (e.g., RRC_IDLE) in which the UE can be;

a configured (e.g., preferred or suggested) level of power (or energy consumption, or energy efficiency); or a power level (or an energy consumption level, or an energy efficiency level or score) measured at an instance, evaluated over a time interval, or predicted over a time interval.

Examples of the triggering conditions are that:

at least one of UE-ESAI metrics (or an amount of increment or decrement of at least one of UE-ESAI metrics) is above a threshold or below a threshold, or between two thresholds;

at least one of UE-ESAI metrics (or an amount of increment or decrement of at least one of UE-ESAI metrics) is offset better (or worse) than a threshold;

at least one of UE-ESAI metrics (or an amount of increment or decrement of at least one of UE-ESAI metrics) is below a first threshold and at least another of UE-ESAI metrics (or an amount of increment or decrement of another of UE-ESAI metrics) is above a second threshold;

at least one of UE-ESAI metrics (or an amount of increment or decrement of at least one of UE-ESAI metrics) is above a first threshold and at least another of UE-ESAI metrics (or an amount of increment or decrement of another of UE-ESAI metrics) is below a second threshold.

5.2 UE-ESAI Configuration for Regulating Reporting of UE-ESAI

The UE-ESAI configuration for regulating how UE 2802 reports UE-ESAI may specify any one or more of:

a reporting periodicity (e.g., a reporting cycle);

that reporting of UE-ESAI is a one-time event;

that the UE should report UE-ESAI upon an occurrence of a mobility event;

The reporting can be made with a RRC Measurement Report. Alternatively, the reporting can be a part of the RRC Measurement Report or a part of RRC Reconfiguration procedures, applied to one or more of intra-frequency, inter-frequency, inter-RAT, inter-system cases.

that the UE should report UE-ESAI upon a configuration or a reconfiguration of the UE Access Stratum;

The configuration or the reconfiguration of the UE Access Stratum may be a part of RRC reconfiguration, RRC re-establishment, or RRC resume procedures.

that the UE should report UE-ESAI upon receiving a network request;

that the UE should report UE-ESAI upon the information stored for UE-ESAI reaching a certain size (e.g., a maximum size allowed);

that the UE should report UE-ESAI upon a change of the services provided by the application layer;

that the UE should report UE-ESAI when one of UE-ESAI metrics (or an amount of increment or decrement of at least one of UE-ESAI metrics) is above a threshold, below a threshold, between two thresholds, or an offset with respect to a threshold (e.g., higher than or lower than a threshold);

that the UE should report UE-ESAI upon a network node issuing a new or a modified configuration pertaining to UE-ESAI if a pre-existing UE-ESAI is available at the UE;

an indication indicating if UE-ESAI reporting can or should be done when one or more conditions are satisfied (e.g., only initiating UE-ESAI reporting if radio coverage of the UE is above a certain threshold and/or the remaining battery level of the UE is not below a certain threshold);

indications indicating to the UE to refrain from reporting UE-ESAI when one or more conditions are satisfied (e.g., not reporting if radio coverage of the UE is below a certain threshold);

indication of the dedicated radio bearer (DRB) or the signaling radio bearer (SRB) to use for transmitting UE-ESAI report;

a least of one or more filtering criteria setting the scope of UE-ESAI collection;

Examples of the filtering criteria include particular RRC states, RATs, network systems, S-NSSAIs, QoS parameters, service types, area scope, and/or carrier frequencies.

an indication indicating to report the stored UE-ESAI to the first network node while the UE is still connected to the first network node;

an indication indicating to report the stored UE-ESAI to a second network node (e.g., after mobility or after completion of (re)configuration of dual connectivity operation);

an indication indicating filtering criteria for filtering the stored data that can be transmitted towards a specific network node;

In one example, all the stored data can be transmitted towards a network node.

The network node can be a RAN node, a CN node, a OAM node, or an SMO node.

In another example, only the stored data for a specific network node or a specific cell is allowed to be reported to the specific network node or to the specific cell.

Reporting to other network nodes or to other cells may be restricted completely or only a portion of the stored UE-ESAI may be reported to other network nodes or to other cells.

In other example, only the data that is stored for a list of network nodes or for a list of cells may be reported to a specific network node or to a specific cell.

Reporting to other network nodes or to other cells may be restricted completely or only a portion of the stored UE-ESAI may be reported to other network nodes or to other cells.

In other example, only the portion of the data that is stored for the network nodes or for the cells that satisfy certain conditions (e.g., a network node used as Serving Node or a network node used as Master Node) may be reported to a specific network node or to a specific cell.

5.3 UE-ESAI Configuration for Regulating What Information is Included in UE-ESAI UE-ESAI configuration for regulating what information is included in UE-ESAI may configure UE-ESAI to include any one or more of the followings:

time stamp associated with collecting and/or storing UE-ESAI (e.g., a time stamp for the starting timing of collecting and/or storing UE-ESAI and a time stamp for the ending timing of collecting and/or storing UE-ESAI);

time interval during which UE-ESAI is stored;

UE specific information related to energy, power, and/or energy efficiency ("UE-ESAI metrics"), which may include:

information associated to an energy or power state of the UE (e.g., information related to energy consumption or energy efficiency of (1) the UE, (2) the UE configuration(s), and/or (3) the UE applications, etc.);

one or more measurements and/or estimates (e.g., predictions) of energy or power related metrics associated to:

one or more functions or operations of the UE when connected to a first network node or camping in a radio cell controlled by the first network node;

one or more functions or operations of the UE when connected to a second network node or camping in a radio cell controlled by a second network node;

one or more Discontinuous Transmission (DTX) configurations;

MIMO transmission mode;

MIMO configuration (e.g., the maximum number of layer);

radio measurements (e.g., RRM measurements configuration);

carrier aggregation configuration;

quality of service (QoS) configuration;

quality of experience (QoE) configuration;

(the amount of) power and/or battery consumption of the UE (measured or estimated (e.g., predicted)) associated with one or more of (i) operations, (ii) functions, or (iii) UE specific radio configurations, which are configured for the UE;

(the amount of) power and/or battery saved by the UE (measured or estimated (e.g., predicted)) associated with one or more of (i) operations, (ii) functions, or (iii) UE specific radio configurations, which are configured for the UE;

power and/or battery efficiency of the of the UE (measured, estimated, or predicted) associated with one or more of (i) operations, (ii) functions, or (iii) UE specific radio configurations, which are configured for the UE;

power and/or batter lifetime increase or decrease (measured, estimated, or predicted) associated with one or more of (i) operations, (ii) functions, or (iii) UE specific radio configurations, which are configured for the UE.

one or more formats for reporting measurements and/or estimates (e.g., predictions) of energy or power related metrics associated to one or more operations and/or functions of the UE, the formats including:

metrics indicated as absolute values (for power consumption, remaining power, energy consumption, energy efficiency).

For example, the power level may be indicated in mW and/or energy consumption may be indicated in Joule.

metrics indicated as percentage values (for power consumption, remaining power, energy consumption, energy efficiency);

For example, a value (e.g., 0) may indicate a minimum level and another value (e.g., 100) may indicate a maximum level.

metrics indicated as relative increment or decrement with respect to a reference value;

A positive value may indicate an increase of the metric (or vice versa) and a negative value indicate a decrease of the metric (or vice versa). For example, a positive value $X\_1$ may indicate that the energy efficiency has increased (positive effect) compared to a reference value of $X\_ref$ or a positive value $Y\_1$ may indicate that the energy consumption has increased (negative effect) compared to a reference value of $Y\_ref$ The relative increment or decrement can be in absolute values or in percentage.

metrics indicated in a qualitative manner for at least one of the power or energy metrics. For example, there may be provided a scalar value indicating if the energy efficiency is considered as good, medium, or poor.

a score value (measured, estimated, or predicted) associated to or more operations/functions configured for the user device;

a delta/offset value for a measurement, estimate, or prediction with respect to a reference value, wherein the value may refer to.

information that is not directly related to energy metrics, the information including any one or more of:

information related to UE brand, UE model, International Mobile Equipment Identity Software Version (IMEISV), software version number, and/or type allocation code (TAC), radio related measurements (e.g., RSRP, RSRQ, and/or RSSI) reported in one or more forms (e.g., average, maximum, minimum, or standard deviation), percentage of time spent in a certain range of values of signal strength, signal quality, and/or interference, indications related to random access channel (RACH) attempts and failures (e.g., a total number of the attempts/failures occurred within a defined time interval, a distribution of the attempts/failures in the defined time interval), indications related to radio link failures (e.g., a total number of the failures occurred within a defined time interval, a distribution of the failures in the defined time interval), indications related to connection establishment/reestablishment attempts, successes, and/or failures (e.g., a total number of the attempts/successes/failures occurred within a defined time interval, a distribution of attempts/successes/failures in the defined time interval), indications related to mobility events attempts, successes, and/or failures (e.g., a total number of the attempts/successes/failures occurred within a defined time interval, a distribution of attempts/successes/failures in the defined time interval), AS stratum configuration (e.g., RRC state, number of carriers in downlink (DL) and in uplink (UL), frequencies in use, carrier bandwidth, number of multiple input multiple output (MIMO) layers), indications related to entering/exiting to/from dual connectivity or being configured in dual connectivity, an indication indicating whether the cell serving the UE is a primary cell (PCell), a primary secondary cell (PSCell), or a secondary cell (SCell), an indication indicating whether the network node serving the UE is a Master Node (MN) or a Secondary Node (SN), per-RRC state usage (in absolute terms, in relative terms, or in percentage), Example) amount of time or a percentage of time spent in RRC_CONNECTED state, a percentage of (consumed or saved) energy associated to RRC_CONNECTED state, a difference in (consumed or saved) energy between when the UE is in RRC_CONNECTED state and when the UE is in RRC_IDLE state)

number of transitions between particular RRC states (e.g., from RRC_CONNECTED state to RRC_I-NACTIVE state, from RRC_IDLE state to RRC_CONNECTED state, etc.), service-related information, Example) QoS parameters, QoE related metrics visible to RAN, Single Network Slice Selection Assistance Information (S-NSSAIs) in use, and/or application identifiers.

data volume in uplink and/or downlink (in total or per RRC state) and/or throughput in uplink and/or downlink (in total or per RRC state), sensor information (e.g., temperature, battery level, velocity, orientation, etc.) detected by the UE or a device related to the UE, end-user behavior (e.g., one or more service types provided by the application layer and/or one or more application identifiers).

UE specific information related to energy, power, and/or energy efficiency ("UE-ESAI metrics") with respect to one or more network configurations in the group of:

TDD pattern configurations o Spectrum sharing configuration (e.g., between NR and LTE)

Configuration of unlicensed spectrum (e.g., license assisted access for LTE)

Downlink reference signals configuration, such as CRS configuration, SSB beams configurations, discovery reference signal configurations Number of configured/available component carriers at a network node Transmission mode configured in one or more radio cells of a network node MIMO transmission mode Bandwidth configuration Downlink transmission power configuration Cell sleeping mode Entry and/or exit conditions related to mobility events configured for at least a radio cell and/or a SSB coverage area of a network node (e.g., threshold/offset settings, time to trigger settings, etc.).

6. Operations of Network Node(s)

Figure 29:
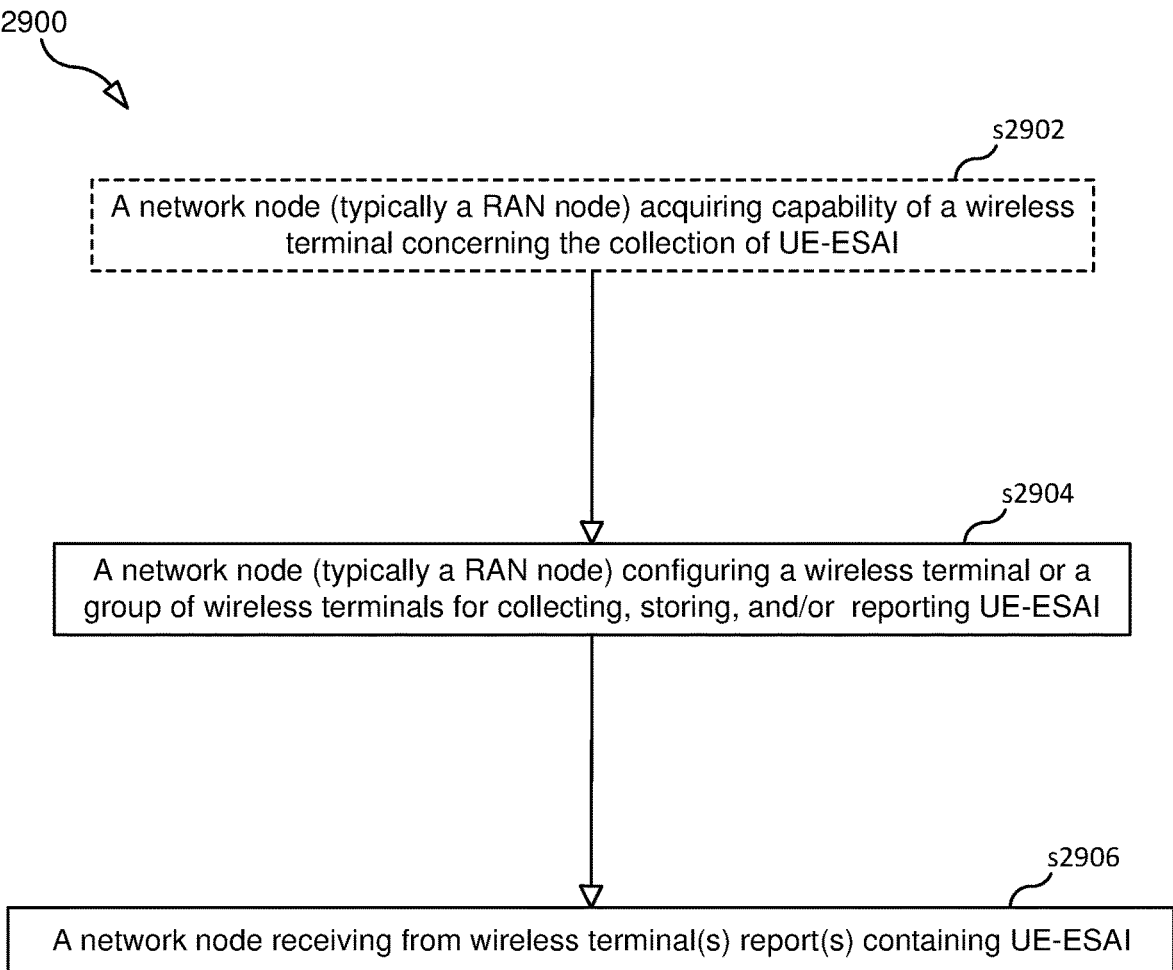
FIG. 29 is a flowchart illustrating a process according to some embodiments.

Referring back to FIG. 28, in some embodiments, network node 2812 may configure UE 2802 or UE group 2850 to collect, store, and/or report UE-ESAI (FIG. 29, step s2904). For example, network node 2812 may transmit to UE 2802 or UE group 2850 a first message including UE-ESAI configuration for configuring UE 2802 or UE group 2850 to collect, store, and/or report UE-ESAI.

After being configured, UE 2802 or each UE included UE group 2850 may report stored UE-ESAI to network node group 2860. One or more network nodes included in network node group 2860 may be any network entity such as first RAN node, another RAN node, an OAM node, an CN node, an SMO node, etc. UE 2802 or each UE included UE group 2850 may transmit to network node group 2860 a second message comprising at least a UE-ESAI report (FIG. 29, step s2906). A UE-ESAI report is a set of information that includes part of the UE-ESAI stored by the UE or all of the UE-ESAI stored by the UE. The UE-ESAI may comprise UE-ESAI metrics (a.k.a., energy metrics—note that in this disclosure, power metric is construed as a type of energy metric).

Even though FIG. 28 shows that network node 2812 does not belong to network group 2860, in some embodiments, network node 2812 belongs to network group 2860. In such embodiments, network node 2812 receives the second message.

Because network node group 2860 comprises more than one network node, the network node(s) receiving UE-ESAI from UE 2802 or each UE included UE group 2850 may forward the received UE-ESAI to the remaining network node(s). More specifically, in some embodiments, the network node(s) that received UE-ESAI from a UE or a group of UEs may forward the received UE-ESAI to final destination network node(s) through a series of other network node(s).

For example, network node 2816 may receive UE-ESAI from UE 2802 or each UE included in UE group 2850. Upon receiving the UE-ESAI, network node 2816 may forward the received UE-ESAI towards network node 2818. Upon receiving UE-ESAI, network node 2818 may forward the received UE-ESAI towards network node 2820.

In optional embodiments, there may be a network node 2814 configured to acquire knowledge about UEs 2802 and 2804's capabilities of supporting collecting and/or storing of UE-ESAI (FIG. 29, step s2902). Network node 2814 may obtain such knowledge by receiving information indicating UEs 2802 and 2804's (various) capabilities (sent by UEs 2802 and 2804 in response to network node 2814's instruction delivered to UEs 2802 and 2804) and/or obtaining preconfigured information about UEs 2802 and 2804 (e.g., hardcoded parameters or tables mandating a certain setting). In some embodiments, network node 2812 and network node 2814 may be the same entity. Additionally, or alternatively, network node 2814 may belong to network group 2860. In other words, the function of transmitting UE-ESAI configuration, the function of acquiring UE's capabilities, and the function of receiving UE-ESAI may be performed by any combination of one or more network nodes.

In some embodiment, network node 2812 may select the best configuration for UEs using AL/ML algorithms. Non limiting examples of AI/ML algorithms that could be trained and executed by network node 2812 to determine the best configuration in terms of energy efficiency or energy savings for user devices may include supervised learning algorithms, deep learning algorithms, reinforcement learning type of algorithms (such as DQN, A2C, A3C, etc), contextual multi-armed bandit algorithm, autoregression algorithms, etc, or combinations thereof. Such algorithms may exploit functional approximation models, such as neural networks (e.g. feedforward neural networks, deep neural networks, recurrent neural networks, convolutional neural networks etc), which can be trained approximate a value function providing an indication of how good a certain configuration is for a UE. Examples of reinforcement learning algorithms may include deep reinforcement learning (such as deep Q-network (DQN), proximal policy optimization (PPO), double Q-learning), actor-critic algorithms (such as Advantage actor-critic algorithms, e.g. A2C or A3C, actor-critic with experience replay, etc), policy gradient algorithms, off-policy learning algorithms, etc.

In one example, AI/ML algorithms could be trained to choose among a set of possible configurations providing different types of energy efficiency or energy savings for the user devices. Examples of such radio configuration may comprise discontinuous transmission or reception (DTX and DTX, respectively) periods, an indication to use a certain frequency carrier, and indication to reduce quality of service requirements, etc. In this case, the algorithm could be trained with data samples comprising, for instance, a radio configuration selected for the user device when operating in energy efficiency/savings mode, one or more information elements describing the state of the UE prior to being configured with the selected radio configuration, one or more information elements describing the state of the network prior to configuring the UE with the selected radio configuration, an indication of the network and/or user performance resulting from configuring the UE with the selected configuration.

When executing an AI/ML algorithm for choosing a energy efficiency/savings configuration for a user device among multiple possible/candidate energy efficiency/savings configurations for the UE, the network node may use one or more one or more information elements describing the current state of the UE, and one or more information elements describing the state of the network. In one example, based on this information, the AI/ML algorithm could determine the optimal energy efficiency/savings configuration for a user among a set of possible radio energy efficiency/savings configurations that can be applied to UE needing or requiring to operate in energy savings mode. In another example, the algorithm could provide a measure/ score for each of the available energy efficiency/savings that a certain configuration can achieve when applied to UE, wherein the measure/score indicating how good is each energy efficiency/savings configuration can be. In yet another example, the AI/ML algorithm could return a probability distribution function associated to set of possible energy efficiency/savings configurations that can be applied to UE, wherein the probability distribution function characterizes the probability of each of the available configurations being the best one for the UE.

7. Operations of UE 2802

As explained above, UE 2802 may be configured by network node 2812 to collect, store, and/or report UE-ESAI. For example, UE 2802 may receive a first message including UE-ESAI configuration (FIG. 30, s3004).

UE 2802 may collect and/or store UE-ESAI and report to network node group 2860 the stored UE-ESAI. For example, UE 2802 may transmit to network node group 2860 a second message comprising UE-ESAI (FIG. 30, s3006). In some embodiments, network node 2812 is included in network group 2860 such that network node 2812 receives the second message. As discussed above, in some embodiments, the network node(s) that received UE-ESAI from UE 2802 may forward the received UE-ESAI to final destination network node(s) through a series of other network node(s).

Figure 30:
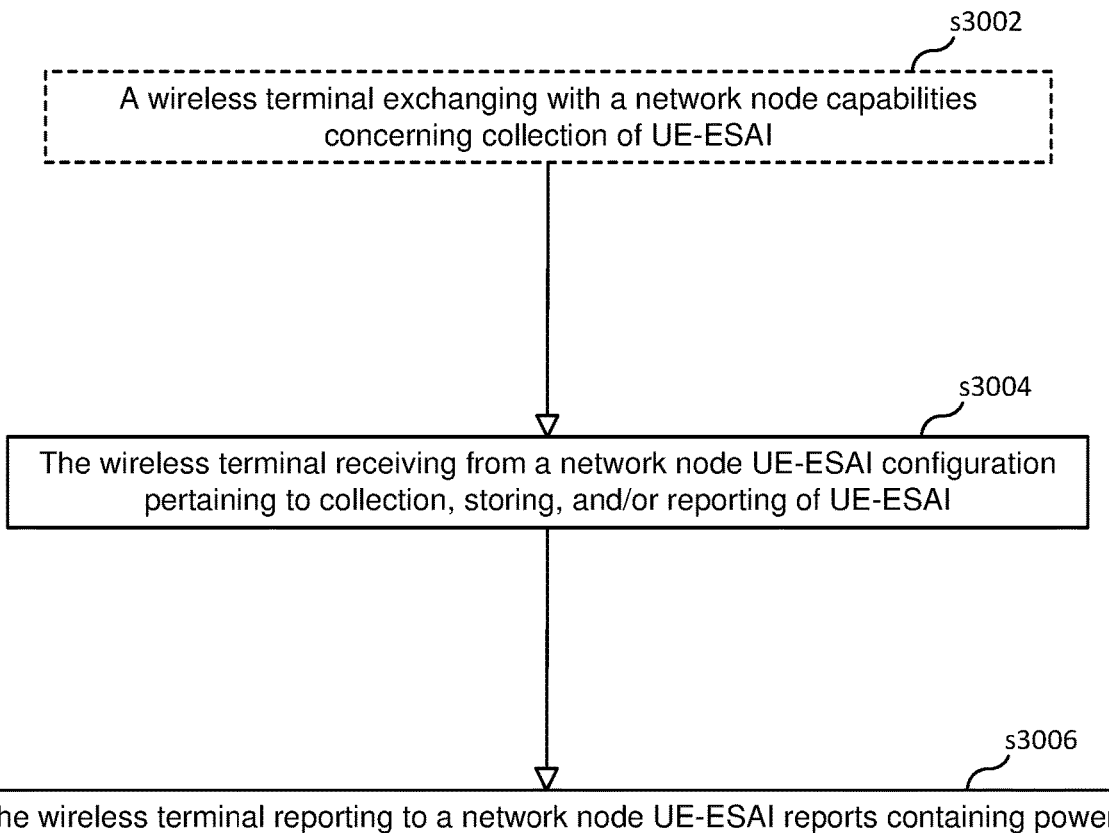
FIG. 30 is a flowchart illustrating a process according to some embodiments.

In optional embodiments, UE 2802 may exchange with network node 2814 UE capability information about one or more capabilities of UE 2802 to collect, store, and/or report UE-ESAI (FIG. 30, s3002). For example, UE 2802 may transmit toward network node 2814 a UE capability message including the UE capability information. In some embodiments, network node 2812 and network node 2814 may be the same entity. Additionally or alternatively, network node 2814 may belong to network group 2860. In other words, the function of transmitting UE-ESAI configuration, the function of acquiring UE's capabilities, and the function of receiving UE-ESAI may be performed by any combination of one or more network nodes.

8. Implementation Examples

In the implementation examples provided below, new parameters, functions, information elements, and indications that are added to the existing standard messages are indicated with bold letters.

8.1 First Implementation Example

In the first implementation example, the RRCReconfiguration procedure may be used to configure the UE for collecting, storing, and/or reporting UE-ESAI. For example, the UE may be reconfigured via RRCReconfiguration message to collect and/or store UE-ESAI, and report to a network node the stored UE-ESAI as part of a Measurement Report message. The RRC Reconfiguration procedure is described in 3GPP Technical Specification (TS) 38.331 v16.4.1 which is hereby incorporated by reference.

The RRCReconfiguration message contains a command to modify an RRC connection. The message may convey information for measurement configuration, mobility control, radio resource configuration (including Resource Blocks (RBs), MAC main configuration, and physical channel configuration), and AS security configuration.

As shown in Table 1 below, in the first implementation example, the configuration information related to configuring a UE to collect, store, and/or report UE-ESAI may be included in the RRCReconfiguration message. In Table 1, the configuration information is named "RRCReconfiguration-v170-IEs." The name of the configuration information is provided in Table 1 for illustration purpose only and does not limit embodiments of this disclosure in any way.

TABLE 1

| | |
|---|---|
| RRCReconfiguration-v1610-IEs ::= | SEQUENCE { |
| otherConfig-v1610 | OtherConfig-v1610 |
| OPTIONAL, -- Need M | |
| bap-Config-r16 | SetupRelease { BAP-Config-r16 } |
| OPTIONAL, -- Need M | |
| iab-IP-AddressConfigurationList-r16 | IAB-IP- |
| AddressConfigurationList-r16 OPTIONAL, -- Need M | |
| conditionalReconfiguration-r16 | |
| ConditionalReconfiguration-r16   OPTIONAL, -- Need M | |
| daps-SourceRelease-r16 | ENUMERATED {true} |
| OPTIONAL, -- Need N | |
| t316-r16 | SetupRelease {T316-r16} |
| OPTIONAL, -- Need M | |
| needForGapsConfigNR-r16 | SetupRelease |
| {NeedForGapsConfigNR-r16} | OPTIONAL, -- Need M |
| onDemandSIB-Request-r16 | SetupRelease { OnDemandSIB- |
| Request-r16 } OPTIONAL, -- Need M | |
| dedicatedPosSysInfoDelivery-r16 | OCTET STRING |
| (CONTAINING PosSystemInformation-r16-IEs) | OPTIONAL, |

TABLE 1-continued

```
-- Need N
  sl-ConfigDedicatedNR-r16 SetupRelease {SL-
ConfigDedicatedNR-r16} OPTIONAL, -- Need M
  sl-ConfigDedicatedEUTRA-Info-r16          SetupRelease      {SL-
ConfigDedicatedEUTRA-Info-r16}                                OPTIONAL,
-- Need M
  targetCellSMTC-SCG-r16                    SSB-MTC           OPTIONAL,
-- Need S
  nonCriticalExtension                      RRCReconfiguration-v170-IEs
OPTIONAL
}
```

As discussed above, the configuration information related to configuring a UE to collect, store, and/or report UE-ESAI may comprise various indications and/or parameters. Table 2 illustrates how such various indications and/or parameters are included in the configuration information—"RRCReconfiguration-v170-IEs." The names of the indications and parameters are provided in Table 2 for illustration purpose only and do not limit embodiments of this disclosure in any way.

TABLE 2

```
RRCReconfiguration-v17-IEs ::=                                 SEQUENCE {
    otherConfig-v17                       OtherConfig-v17
OPTIONAL, -- Need M
    nonCriticalExtension                  SEQUENCE { }
OPTIONAL
}
OtherConfig-v17 ::=                                            SEQUENCE {
    energyStateAssistanceInfoConfig
EnergyEfficiencyAssistanceInfoConfig                           OPTIONAL, -- Need M
}
EnergyEfficiencyAssistanceInfoConfig ::=                             SEQUENCE {
    measEnergyObjectToRemoveList
MeasEnergyObjectToRemoveList              OPTIONAL,        -- Need N
    measEnergyObjectToAddModList
MeasEnergyObjectToAddModList               OPTIONAL,          -- Need N
    reportEnergyConfigToRemoveList
ReportEnergyConfigToRemoveList             OPTIONAL,          -- Need N
    reportEnergyConfigToAddModList
ReportEnergyConfigToAddModList             OPTIONAL,          -- Need N
    measEnergyIdToRemoveList                       MeasEnergyIdToRemoveList
OPTIONAL, -- Need N
    measEnergyIdToAddModList                       MeasEnergyIdToAddModList
OPTIONAL, -- Need N
    ...
}
MeasEnergyObjectToRemoveList ::=               SEQUENCE (SIZE
    (1..maxNrofEnergyObjectId))            OF MeasEnergyObjectId
MeasEnergyIdToRemoveList ::=                   SEQUENCE (SIZE
    (1..maxNrofEnergyMeasId))             OF MeasEnergyId
ReportEnergyConfigToRemoveList ::=                 SEQUENCE (SIZE
    (1..maxEnergyReportConfigId))             OF ReportEnergyConfigId
MeasEnergyObjectId ::=                        INTEGER
    (1..maxNrofEnergyObjectId)
MeasEnergyId ::=                              INTEGER
    (1..maxNrofEnergyMeasId)
MeasEnergyIdToAddModList ::=                                   SEQUENCE (SIZE
    (1..maxNrofEnergyMeasId))             OF MeasEnergyIdToAddMod
MeasEnergyIdToAddMod ::=                                    SEQUENCE {
    measEnergyId                                  MeasEnergyId,
    measEnergyObjectId                            MeasEnergyObjectId,
    reportEnergyConfigId                          ReportEnergyConfigId
}
ReportEnergyConfigId ::=                      INTEGER
    (1..maxReportEnergyConfigId)
ReportEnergyConfigToAddModList ::=                 SEQUENCE (SIZE
    (1..maxReportEnergyConfigId))             OF ReportEnergyConfigToAddMod
ReportEnergyConfigToAddMod ::=                             SEQUENCE {
    reportEnergyConfigId                          ReportEnergyConfigId,
    reportEnergyConfig                            CHOICE {
        reportEnergyConfigNR
ReportEnergyConfigNR,
    ...,
```

TABLE 2-continued

```
    }
}
ReportEnergyConfigNR ::=                          SEQUENCE {
    reportEnergyType                              CHOICE {
        periodical
PeriodicalReportEnergyConfig,
        eventTriggered                                EventTriggerEnergyConfig,
        ...,
    }
}
EventTriggerEnergyConfig ::=                       ENUMERATED ('upon-
reconfiguration-with-sync' ,'upon-transition-to-rrc-
connected' ,'upon-reestablishment', ...)
        reportInterval                        ReportInterval,
        reportAmount                          ENUMERATED {r1, r2, r4, r8 r16, r32,
r64, infinity},
}
PeriodicalReportEnergyConfig ::=                                        SEQUENCE {
        reportInterval                        ReportInterval,
        reportAmount                          ENUMERATED {r1, r2, r4, r8 r16, r32,
r64, infinity},
            includeBatteryStatus              BOOLEAN OPTIONAL,
            includeTemperature             BOOLEAN OPTIONAL,
            includeNumCarrierUL               BOOLEAN OPTIONAL,
            includeNumCarrierDL               BOOLEAN OPTIONAL,
            includeArfcn-NR               BOOLEAN OPTIONAL,
            includeNR-CGI-Info             BOOLEAN OPTIONAL,
        ...,
}
maxNrofEnergyMeasId              INTEGER ::= 16          -- Maximum number of
configured Energy measurements
maxNrofEnergyObjectId            INTEGER ::= 16          -- Maximum number of
Energy measurement objects
maxNrofEnergyMeasId              INTEGER ::= 16          -- Maximum number of
configured Energy measurements
maxReportEnergyConfigId              INTEGER ::= 16
```

As discussed above, a UE may transmit to one or more network nodes a message comprising UE-ESAI Table 3 provided below shows an example of such message— "MeasurementEnergyReport." The names of the indications and/or parameters are provided in Table 3 for illustration purpose only and do not limit embodiments of this disclosure in any way.

8.2 Second Implementation Example

As discussed above, a UE may provide UE-ESAI in response to a request from a network node. In the second implementation example, UEInformation procedure may be used for the process of providing UE-ESAI in response to a request. More specifically, the network node may transmit to

TABLE 3

```
MeasurementEnergyReport ::=                       SEQUENCE {
    criticalExtensions                            CHOICE {
    measurementEnergyReport
MeasurementEnergyReport-IEs,
    criticalExtensionsFuture                      SEQUENCE { }
    }
}
MeasurementEnergyReport-IEs ::=                   SEQUENCE {
    measEnergyResults                             MeasEnergyResults,
    lateNonCriticalExtension                      OCTET STRING
OPTIONAL,
    nonCriticalExtension                          SEQUENCE { }
OPTIONAL
}
MeasEnergyResults ::=                             SEQUENCE {
    measEnergyId              MeasEnergyId,
    energyEfficiencyScore        INTEGER(0..100),
    batteryStatus          INTEGER(0..100)          OPTIONAL,
    temperature          INTEGER(-50..50,...)          OPTIONAL,
    numOfCarriersUL          INTEGER(1..4,...)          OPTIONAL,
    numOfCarriersDL          INTEGER(1..4,...)          OPTIONAL,
    arfcn-NR          ARFCN-ValueNR          OPTIONAL,
    nR-CGI-Info          CGI-InfoNR          OPTIONAL,
    ...,
}
``` the UE UEInformationRequest message including a request for UE-ESAI. Table 4 illustrates how the request for UE-ESAI is included in the UEInformationRequest message. The names of the bolded indications and/or parameters are provided in Table 4 for illustration purpose only and do not limit embodiments of this disclosure in any way.

TABLE 4

| | |
|---|---|
| UEInformationRequest-r16 ::= | SEQUENCE { |
| rrc-TransactionIdentifier | RRC- |
| TransactionIdentifier, | |
| criticalExtensions | CHOICE { |
| ueInformationRequest-r16 | |
| UEInformationRequest-r16-IEs, | |
| criticalExtensionsFuture | SEQUENCE { } |
| } | |
| } | |
| UEInformationRequest-r16-IEs ::= | SEQUENCE { |
| idleModeMeasurementReq-r16 | ENUMERATED{true} |
| OPTIONAL, -- Need N | |
| logMeasReportReq-r16 | ENUMERATED {true} |
| OPTIONAL, -- Need N | |
| connEstFailReportReq-r16 | ENUMERATED {true} |
| OPTIONAL, -- Need N | |

TABLE 4-continued

| | |
|---|---|
| ra-ReportReq-r16 | ENUMERATED {true} |
| OPTIONAL, -- Need N | |
| rlf-ReportReq-r16 | ENUMERATED {true} |
| OPTIONAL, -- Need N | |
| mobilityHistoryReportReq-r16 | ENUMERATED {true} |
| OPTIONAL, -- Need N | |
| lateNonCriticalExtension | OCTET STRING |
| OPTIONAL, | |
| nonCriticalExtension | SEQUENCE { |
| UEInformationRequest-v170-IEs | |
| OPTIONAL | |
| } | |
| UEInformationRequest-v17 ::= | SEQUENCE { |
| energyAssistanceInfoReporReq-r17 | ENUMERATED {true} |
| OPTIONAL, -- Need N | |
| } | |

After receiving the UEInformationRequest message, the UE may transmit to the network node UEInformationResponse message including the requested UE-ESAI. Table 5 illustrates how UE-ESAI can be included in the UEInformationResponse message. The names of the bolded indications and/or parameters are provided in Table 5 for illustration purpose only and do not limit embodiments of this disclosure in any way.

TABLE 5

| | |
|---|---|
| UEInformationResponse-r16-IEs ::= | SEQUENCE { |
| measResultIdleEUTRA-r16 | MeasResultIdleEUTRA-r16 |
| OPTIONAL, | |
| measResultIdleNR-r16 | MeasResultIdleNR-r16 |
| OPTIONAL, | |
| logMeasReport-r16 | LogMeasReport-r16 |
| OPTIONAL, | |
| connEstFailReport-r16 | ConnEstFailReport-r16 |
| OPTIONAL, | |
| ra-ReportList-r16 | RA-ReportList-r16 |
| OPTIONAL, | |
| rlf-Report-r16 | RLF-Report-r16 |
| OPTIONAL, | |
| mobilityHistoryReport-r16 | MobilityHistoryReport-r16 |
| OPTIONAL, | |
| lateNonCriticalExtension | OCTET STRING |
| OPTIONAL, | |
| nonCriticalExtension | SEQUENCE { |
| UEInformationResponse-v170-IEs | OPTIONAL |
| OPTIONAL | |
| } | |
| UEInformationResponse-v17 ::= | SEQUENCE { |
| energyAssistanceInfoReport-r17 | |
| EnergyAssistanceInfoReport-r17 | OPTIONAL, -- Need M |
| } | |
| EnergyAssistanceInfoReport-r17 ::= | SEQUENCE { |
| energyEfficiencyScore | INTEGER(0..100), |
| batteryStatus | INTEGER(0..100) OPTIONAL, |
| temperature | INTEGER(-50..50,...) OPTIONAL, |
| ... | |
| } | |

8.3 Third Implementation Example

The third implementation example is about how signaling of UE's capabilities of collecting, storing, and/or reporting UE-ESAI can be implemented. In 3GPP TS 38.331 v16.4.1, the information element (IE) "UE-NR-Capability" is used to convey the NR UE Radio Access Capability Parameters. In the third implementation example, UE's capabilities of collecting, storing, and/or reporting UE-ESAI may be included in the IE as illustrated in Table 6 below.

TABLE 6

| | |
|---|---|
| UE-NR-Capability-v1610 ::= | SEQUENCE { |
| inDeviceCoexInd-r16 | ENUMERATED {supported} |
| OPTIONAL, | |
| dl-DedicatedMessageSegmentation-r16 | ENUMERATED |
| {supported} OPTIONAL, | |
| nrdc-Parameters-v1610 | NRDC-Parameters-v1610 |
| OPTIONAL, | |
| powSav-Parameters-r16 | PowSav-Parameters-r16 |
| OPTIONAL, | |
| fr1-Add-UE-NR-Capabilities-v1610 | UE-NR-CapabilityAddFRX- |
| Mode-v1610   OPTIONAL, | |
| fr2-Add-UE-NR-Capabilities-v1610 | UE-NR-CapabilityAddFRX- |
| Mode-v1610   OPTIONAL, | |
| bh-RLF-Indication-r16 | ENUMERATED {supported} |
| OPTIONAL, | |
| directSN-AdditionFirstRRC-IAB-r16 | ENUMERATED {supported} |
| OPTIONAL, | |
| bap-Parameters-r16 | BAP-Parameters-r16 |
| OPTIONAL, | |
| referenceTimeProvision-r16 | ENUMERATED {supported} |
| OPTIONAL, | |
| sidelinkParameters-r16 | SidelinkParameters-r16 |
| OPTIONAL, | |
| highSpeedParameters-r16 | HighSpeedParameters-r16 |
| OPTIONAL, | |
| mac-Parameters-v1610 | MAC-Parameters-v1610 |
| OPTIONAL, | |
| mcgRLF-RecoveryViaSCG-r16 | ENUMERATED {supported} |
| OPTIONAL, | |
| resumeWithStoredMCG-SCells-r16 | ENUMERATED {supported} |
| OPTIONAL, | |
| resumeWithStoredSCG-r16 | ENUMERATED {supported} |
| OPTIONAL, | |
| resumeWithSCG-Config-r16 | ENUMERATED {supported} |
| OPTIONAL, | |
| ue-BasedPerfMeas-Parameters-r16 | UE-BasedPerfMeas- |
| Parameters-r16                OPTIONAL, | |
| son-Parameters-r16 | SON-Parameters-r16 |
| OPTIONAL, | |
| onDemandSIB-Connected-r16 | ENUMERATED {supported} |
| OPTIONAL, | |
| nonCriticalExtension | UE-NR-Capability-v17 |
| OPTIONAL | |
| } | |
| UE-NR-Capability-v17 ::= | SEQUENCE { |
| ue-BasedPerfMeas-Parameters-r17 | UE-BasedPerfMeas- |
| Parameters-r17                OPTIONAL, | |
| nonCriticalExtension | SEQUENCE { } |
| OPTIONAL | |
| } | |
| UE-BasedPerfMeas-Parameters-r17 ::= | SEQUENCE { |
| energyAssistanceInfoReport-r17 | ENUMERATED {supported} |
| OPTIONAL, | |
| ... | |
| } | |

In some embodiment, a new information element (e.g., named "UE-MeasurementAvailable-r17") may be provided to indicate all relevant available indicators for UE measurements in Rel-17, as illustrated in Table 7 below.

TABLE 7

UE-MeasurementsAvailable-r17 information element

```
-- ASN1START
-- TAG-UE-MeasurementsAvailable-r17-START
UE-MeasurementsAvailable-r17 ::=        SEQUENCE {
    energyAssistanceInfoReportAvailable-r17  ENUMERATED
{true}   OPTIONAL,
    ...
}
-- TAG-UE-MeasurementsAvailable-r17-STOP
-- ASN1STOP
```

Table 8 shows a list of existing UE-based performance measurement parameters in TS 38.306 v16.4.0. As shown in Table 8, the list may include a parameter—"energyAssistanceinfoReport-r17"—which indicates whether a UE supports UE-ESAI reporting upon a request from a network node. The name of the parameter is provided in Table 8 for illustration purpose and does not limit embodiments of this disclosure in any way.

Figure 31:
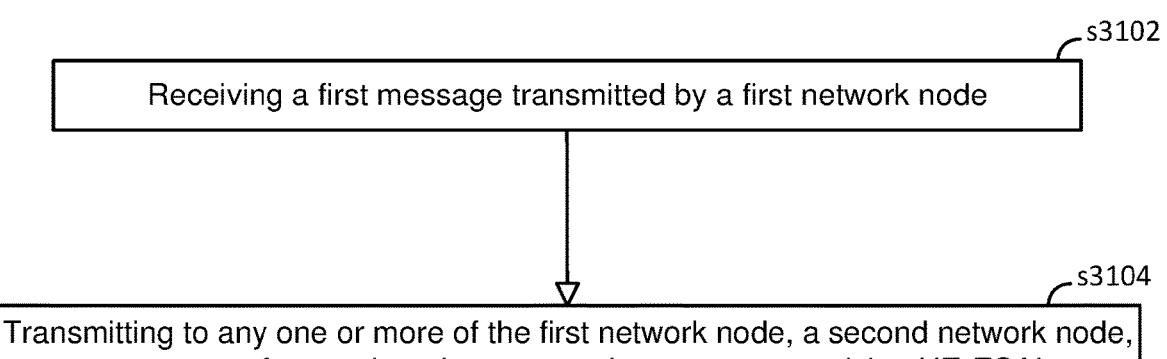
FIG. 31. is a flowchart illustrating a process according to some embodiments.

FIG. 31 illustrates a process 3100 according one embodiment. Process 3100 may be performed by a UE. Process 3100 may begin with step s3102. Step s3102 comprises receiving a first message transmitted by a first network node. The first message comprises configuration information related to configuring the UE or a group of UEs including the UE to store and/or report UE energy state assistance information, UE-ESAI. Step s3104 comprises after receiving the first message, transmitting to the first network node, a second network node, and/or a group of network nodes a second message comprising UE-ESAI. The UE-ESAI included in the second message comprises an energy metric.

Figure 32:
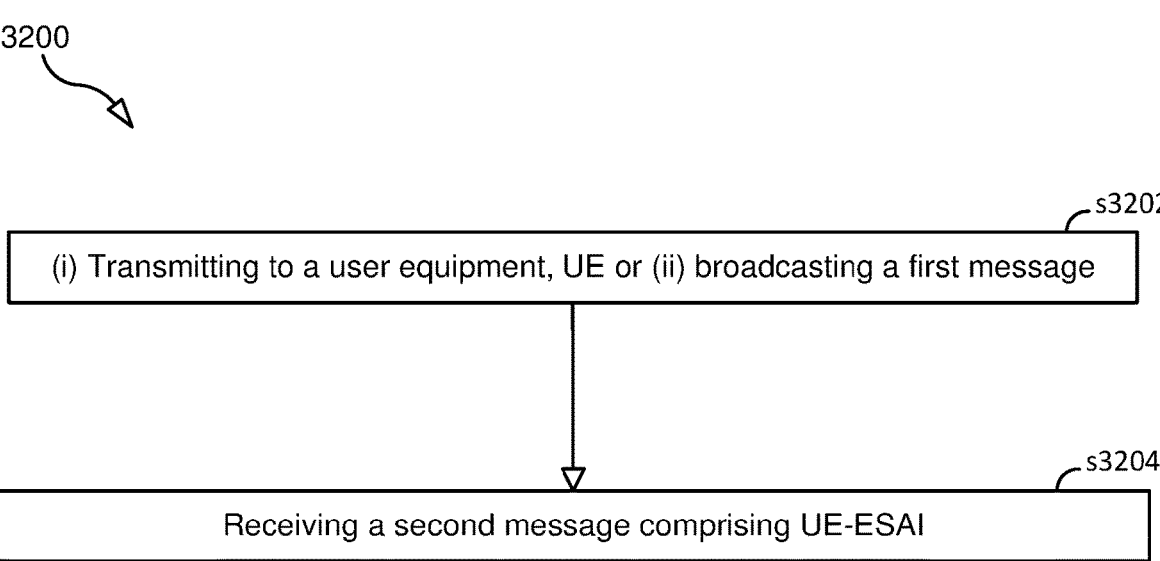
FIG. 32. is a flowchart illustrating a process according to some embodiments.

FIG. 32 illustrates a process 3200 according to one embodiment. Process 3200 may be performed by a network node. Process 3200 may begin with step s3202. Step s3202 comprises transmitting to a user equipment, UE, a first message. The first message comprises configuration information related to configuring the UE or a group of UEs to store and/or report UE energy state assistance information, UE-ESAI. Step s3204 comprises after transmitting the first message, receiving a second message comprising UE-ESAI. The second message was transmitted by the UE, and the UE-ESAI included in the second message comprises an energy metric.

TABLE 8

| Definitions for parameters | Per | M | FDD-TDD DIFF | FR1-FR2 DIFF |
|---|---|---|---|---|
| barometerMeasReport-r16 Indicates whether UE supports uncompensated barometric pressure measurement reporting upon request from the network. | UE | No | No | No |
| immMeasBT-r16 Indicates whether the UE supports Bluetooth measurements in RRC_CONNECTED state. | UE | No | No | No |
| immMeasWLAN-r16 Indicates whether the UE supports WLAN measurements in RRC_CONNECTED state. | UE | No | No | No |
| loggedMeasBT-r16 Indicates whether the UE supports Bluetooth measurements in RRC_IDLE and RRC_INACTIVE state. | UE | No | No | No |
| loggedMeasurements-r16 Indicates whether the UE supports logged measurements in RRC_IDLE and RRC_INACTIVE. A UE that supports logged measurements shall support both periodical logging and event-triggered logging. The memory size of MDT logged measurements is 64 KB. | UE | No | No | No |
| loggedMeasWLAN-r16 Indicates whether the UE supports WLAN measurements in RRC_IDLE and RRC_INACTIVE state. | UE | No | No | No |
| orientationMeasReport-r16 Indicates whether the UE supports orientation information reporting upon request from the network. | UE | No | No | No |
| speedMeasReport-r16 Indicates whether the UE supports speed information reporting upon request from the network. | UE | No | No | No |
| gnss-Location-r16 Indicates whether the UE is equipped with a GNSS or A-GNSS receiver that may be used to provide detailed location information along with SON or MDT related measurements in RRC_CONNECTED, RRC_IDLE and RRC_INACTIVE. | UE | No | No | No |
| ulPDCP-Delay-r16 Indicates whether the UE supports UL PDCP Packet Average Delay measurement (as specified in TS 38.314 [26] and reporting in RRC_CONNECTED state. | UE | No | No | No |
| energyAssistanceInfoReport-r17 Indicates whether the UE supports Energy related assistance information reporting upon request from the network. | UE | No | No | No |

The embodiments discussed below are applicable to process 3100 as well as process 3200.

In some embodiments, the configuration information includes any one or more of: (i) a set of one or more collect-parameters related to collecting UE-ESAI, (ii) a set of one or more contents of UE-ESAI, or (iii) a set of one or more report-parameters related to reporting stored UE-EASI.

In some embodiments, the set of one or more collect-parameters indicates any one or more of: (i) a collecting time interval during which UE-ESAI is to be stored in the UE, (ii) a validity time interval during which stored UE-ESAI is valid, (iii) a size limit of UE-ESAI to be stored at the UE, (iv) a maximum number of cells or network nodes that can be associated with UE-ESAI, (v) a frequency of collecting UE-ESAI at the UE, (vi) one or more conditions under which collecting and/or storing UE-ESAI is enabled and/or disabled, or (vii) one or more conditions upon which collecting UE-ESAI can continue.

In some embodiments, the set of one or more collect-parameters indicates one or more conditions under which the UE should start, stop, pause, resume, continue, and/or modify UE-ESAI collecting process.

In some embodiments, said one or more conditions are based on the level of an energy metric included in UE-ESAI collected at the UE with respect to one or more threshold levels.

In some embodiments, the set of one or more report-parameters indicates any one or more of: (i) a reporting periodicity for UE-ESAI, (ii) whether reporting of UE-ESAI should be made once or continuously, (iii) one or more conditions that trigger reporting of UE-ESAI, (iv) one or more conditions that prevent reporting of UE-ESAI, (v) one or more report destination cells or nodes for reporting of UE-ESAI, or (vi) one or more conditions for partial reporting or full reporting of UE-ESAI.

In some embodiments, said one or more conditions that trigger reporting of UE-ESAI comprises any one or more of: (i) an occurrence of a mobility event, (ii) a configuration or a reconfiguration of UE Access Stratum, (iii) receiving a request transmitted by a network entity, (iv) the size of collected UE-ESAI reaching a threshold size, (v) a change of services provided by an application layer, (vi) an energy metric included in collected UE-ESAI satisfying a particular condition with respect to a threshold energy level, (vii) a battery level of the UE satisfying a particular condition with respect to a threshold battery level, or (viii) a radio coverage of the UE satisfying a particular condition with respect to a threshold radio coverage.

In some embodiments, the set of one or more contents of UE-ESAI comprises any one or more of: (i) a time interval during which UE-ESAI is collected, (ii) one or more time stamps associated with UE-ESAI collection, (iii) one or more energy metrics, or (iv) UE related information.

In some embodiments, said one or more energy metrics are (i) measured and/or predicted energy consumption of the UE, (ii) measured and/or predicted energy efficiency of the UE, and/or (iii) measured and/or predicted energy saving amount.

In some embodiments, wherein said one or more energy metrics are associated with one or more UE configurations.

In some embodiments, wherein said one or more UE configurations comprises any one or more of: (i) one or more discontinuous transmission (DTX) configuration, (ii) MIMO transmission mode, (iii) MIMO configuration, (iv) radio measurements, (v) carrier aggregation configuration, (vi)

dual connectivity configuration, (vii) quality of service (QoS) configuration, or (viii) quality of experience (QoE) configuration.

In some embodiments, the UE related information indicates any one or more of: (i) a model of the UE, an operating system running on the UE, and/or a Type Allocation Code (TAC), (ii) radio related measurements, (iii) a time duration during which a particular level or range of values for at least one of signal strength, quality, or interference persists, (iv) information related to mobility events, connection reestablishment, radio link failures, and/or RACH attempts, (v) AS stratum configuration, (vi) information related to UE's dual connectivity, (vii) information about a network node or a cell serving the UE, (viii) per-RRC state usage, (ix) number of transitions between RRC states, (x) service-related information, (xi) volume of uplink and/or downlink data, (xii) operating conditions of the UE, or (xiii) end-user behaviors.

In some embodiments, said one or more energy metrics are associated with any one or more the following network configurations: (i) TDD pattern configurations, (ii) spectrum sharing configurations, (iii) configuration of unlicensed spectrum, (iv) downlink or uplink reference signal configuration, (v) number of configured or available component carriers at a network node, (vi) dual connectivity configuration, (vii) transmission mode configured in one or more radio cells of a network node, (viii) MIMO transmission mode, (ix) bandwidth configuration, (x) downlink transmission power configuration, (xi) cell sleeping mode, or (xii) entry and/or exit conditions related to mobility events.

In some embodiments, the method comprises receiving a request for capability information indicating the UE's capability of collecting, storing, and/or reporting UE-ESAI, wherein the request was transmitted by the first network node, and transmitting to the first network node the capability information.

In some embodiments, the first message is an RRCReconfiguration message which is configured to trigger the UE to modify an RRC connection, and the second message is a Measurement Report message.

In some embodiments, the first message is an UE Information Request message, and the second message is an UE Information Response message.

Embodiments provide a method for two network nodes to exchange user device reports comprising UE-ESAI that can be used for optimizing, for instance based on AI/ML techniques, the energy savings configurations for a user device and/or for a network node (e.g., a RAN node). The UE-ESAI may include UE specific information related to any or all of energy, power, energy efficiency, energy savings, power efficiency, power savings, energy consumption, power consumption, and a variation of any of these ("UE-ESAI metrics"). For example, such UE-ESAI metrics may include information associated to a UE specific radio configuration (e.g. a score, power consumption, or energy efficiency) and/or information not associated to a UE specific radio configuration. For example, information related to sensor information (e.g. temperature, battery level, velocity, orientation), end-user behavior (e.g. which service types are provided by the application layer, identity of the applications), are examples of information not associated to a UE specific radio configuration that may be included in UE-ESAI metrics. The UE-ESAI may further include indications pertaining to operational conditions and/or configurations under which the UE-ESAI is stored (e.g., logged).

A method at a first network node in a communication network is provided. The method is for exchanging user device reports comprising UE-ESAI with a second network node. The method includes receiving a first message from a second network node, the first message comprising one or more reports of UE-ESAI associated to one or more user devices served by the second network node or served by other network nodes and available at the second network node. The method further includes optimizing a configuration for energy savings for one or more of a user device served by the first network node and the first network node, where the optimizing is based on the contents of the first message.

Additional signaling may be employed in some embodiments. For example, the method may include transmitting a second message to the second network node, the second message comprising a request for one or more device reports of UE-ESAI associated user devices served by the second network node or UE-ESAI reports collected by other network nodes and available at the second network node. The method may further include receiving a third message from the second network node, the third message comprising at least a positive acknowledgment (ACK) or a negative acknowledgment (NACK) based on the information requested with the second message. The method may further include transmitting a fourth message to a third network node, the fourth message comprising one or more reports of UE-ESAI associated to one or more user devices served by the first network node and/or served by the second network node. In embodiments, the fourth network node may be an OAM, SMO, or another entity external to the RAN.

A method at a second network node in a communication network is provided. The method is for exchanging user device reports comprising UE-ESAI with a first network node. The method includes transmitting a first message to a first network node, the first message comprising one or more reports of UE-ESAI associated to one or more user devices served by the second network node or by other network nodes and available at the second network node.

Additional signaling may also be employed in some embodiments. For example, the method may include receiving a second message from the first network node, the second message comprising a request for one or more reports of UE-ESAI associated to user devices served by the second network node or UE-ESAI reports collected by other network nodes and available at the second network node. The method may include transmitting a third message to the first network node, the third message comprising at least a positive acknowledgment (ACK) or a negative acknowledgment (NACK) based on the information requested with the second message.

Disclaimers:

The term RAN node or network node can refer to LTE or NR technology and may be, for example, one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, IAB-node, IAB-donor DU, IAB-donor-CU, IAB-DU, IAB-MT, O-CU, O-CU-CP, O-CU-UP, O-DU, O-RU, O-eNB.

Figure 33:
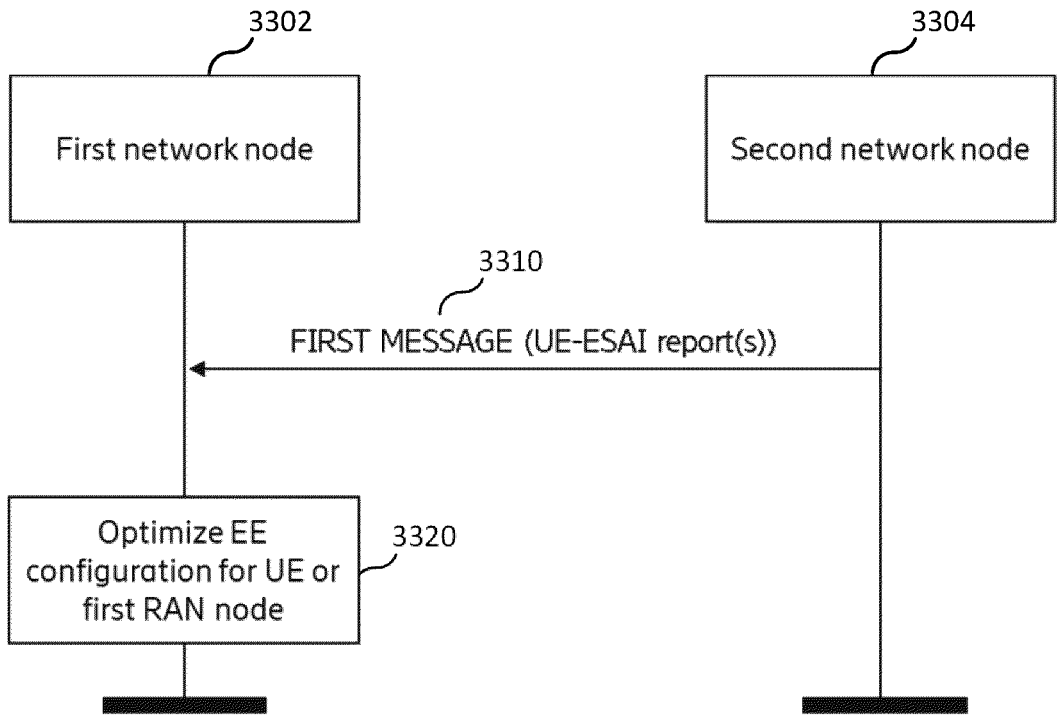
FIG. 33 illustrates a flow diagram according to some embodiments.

Method and embodiments for the first network node: The method for the first network node is illustrated in FIG. 33. The first network node 3302 receives a first message 3310 (including one or more UE-ESAI reports) from a second network node 3304 and then the first network node 3302 optimizes, at 3320, an energy savings configuration (e.g., an energy efficiency (EE) configuration) for one or more of the UE and the first network node (e.g., a first RAN node) based on the contents of the first message. The reports of UE-ESAI associated to one or more user devices served by the second network node comprised in the first message may be, in one example, historical reports collected by the second network node over a period of time from multiple user devices served by the second network node. The one or more UE-ESAI reports comprised in the first message, may be, in one example, historical reports collected at another network node and available at the second network node.

Upon receiving from the second network node UE-ESAI reports, the first network node can exploit data-driven optimization methods, such as for example AI/ML techniques, to optimize (e.g., train) an algorithm tasked to determine (e.g., infer) the best configuration in terms of energy savings for user devices served by the network node. In particular, the first network node may augment the available data set for training such an algorithm with the UE-ESAI reports received from the second network node, thereby enriching the experience associated to energy savings gathered from user devices served by the first network node with experience associated to energy savings gathered from user devices served by other network nodes in the radio access network. By enabling the first network node to train/optimize the AI/ML algorithm responsible for determining energy savings configurations of the user devices from a richer dataset of experience collected in other parts of the network has the advantage generalize and strengthen the algorithm, thereby resulting in better selection of the energy savings configuration for user devices.

Non limiting examples of AI/ML algorithms that could be trained and executed by a network node to determine the best configuration in terms of energy savings (e.g., energy efficiency) for user devices may include supervised learning algorithms, deep learning algorithms, reinforcement learning type of algorithms (such as DQN, A2C, A3C, etc.), contextual multi-armed bandit algorithm, autoregression algorithms, etc., or combinations thereof. Such algorithms may exploit functional approximation models, such as neural networks (e.g. feedforward neural networks, deep neural networks, recurrent neural networks, convolutional neural networks etc.), which can be trained approximate a value function providing an indication of how good a certain configuration is for a UE. Examples of reinforcement learning algorithms may include deep reinforcement learning (such as deep Q-network (DQN), proximal policy optimization (PPO), double Q-learning), actor-critic algorithms (such as Advantage actor-critic algorithms, e.g. A2C or A3C, actor-critic with experience replay, etc.), policy gradient algorithms, off-policy learning algorithms, etc.

In one example, AI/ML algorithms could be trained to choose among a set of possible configurations providing different types of energy savings (e.g., energy efficiency) for the user devices. Examples of such radio configuration may comprise discontinuous transmission or reception (DTX and DTX, respectively) periods, an indication to use a certain frequency carrier, and indication to reduce quality of service requirements, etc. In this case, the algorithm could be trained with data samples comprising, for instance, a radio configuration selected for the user device when operating in an energy savings (e.g., energy efficiency) mode, one or more information elements describing the state of the UE prior to being configured with the selected radio configuration, one or more information elements describing the state of the network prior to configuring the UE with the selected radio configuration, an indication of the network and/or user performance resulting from configuring the UE with the selected configuration.

Figure 34:
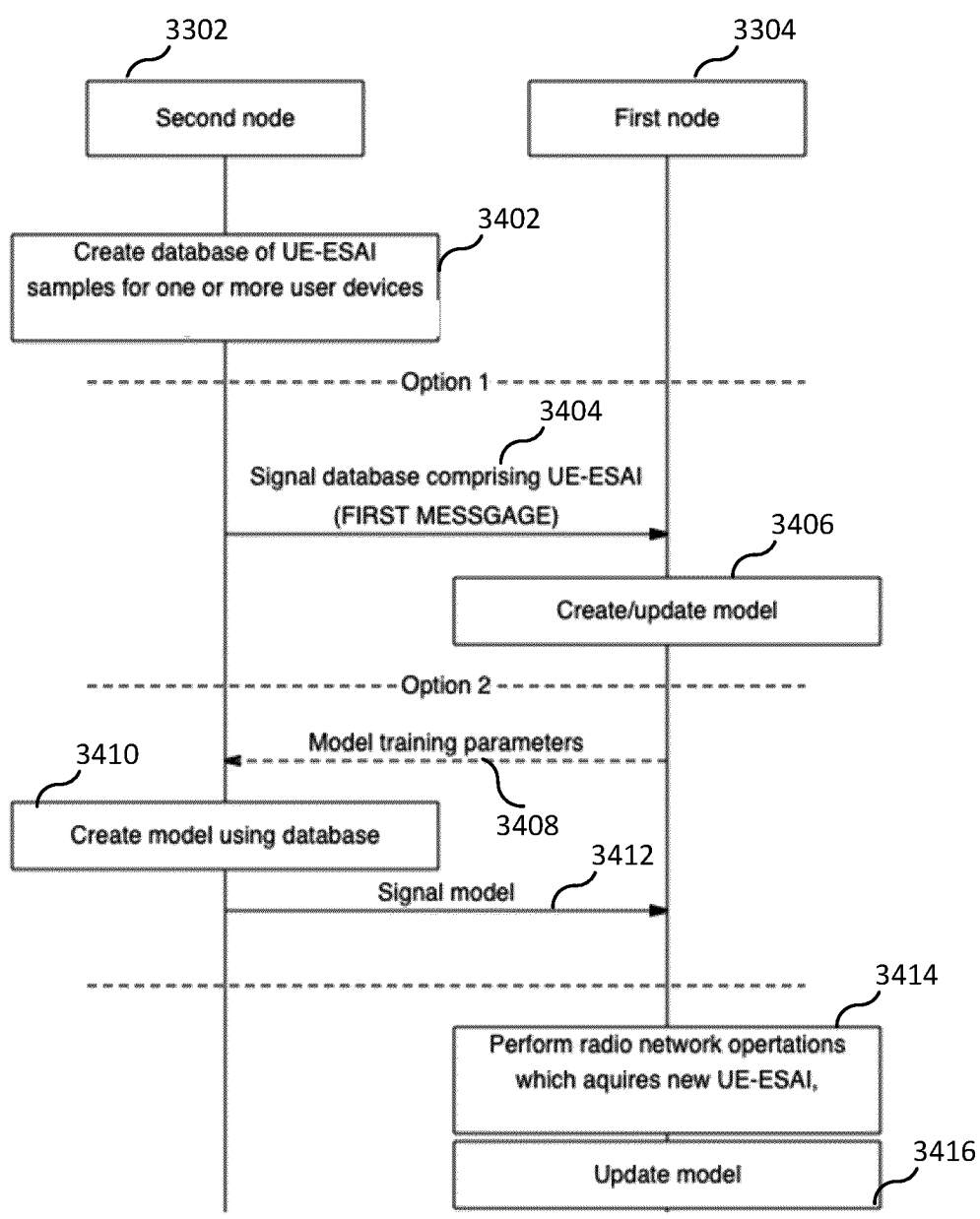
FIG. 34 illustrates a flow diagram according to some embodiments.

When executing an AI/ML algorithm for choosing an energy savings configuration for a user device among multiple possible energy savings configurations for the UE, the network node may use one or more information elements describing the current state of the UE, and one or more information elements describing the state of the network. In one example, based on this information, the AI/ML algorithm could determine the optimal energy savings configuration for a user among a set of possible radio energy savings configurations that can be applied to UE needing or requiring to operate in energy savings mode. In another example, the algorithm could provide a measure/score for each of the available energy savings that a certain configuration can achieve when applied to UE, wherein the measure/score indicating how good each energy savings configuration can be. In yet another example, the AI/ML algorithm could return a probability distribution function associated to set of possible energy savings configurations that can be applied to UE, where the probability distribution function characterizes the probability of each of the available configurations being the best one for the UE, FIG. 34 illustrates a flow diagram according to some embodiments. As shown in FIG. 34, different options for providing AI/ML techniques are available. For example, second node 3304 may have a database of UE-ESAI corresponding to one or more UEs. At 3402, second node 3304 may create (or update) this database with UE-ESAI samples from one or more UEs. In the first of the two options illustrated, the first node 3302 receives, at 3404, a dataset from the second node 3304, e.g. via a first message comprising UE-ESAI corresponding to one or more UEs, and creates or updates, and 3406, a model based on this dataset. In some embodiments, where the first node 3302 already has a dataset, the model is created or updated using the combined dataset including the original dataset and the dataset received from the second network node 3304. In the second of the two options illustrated, alternatively or additionally with respect to the first option, the first node 3302 sends, at 3408, its model parameters, responsible for determining energy savings configurations, to the second network node 3304. The model parameters may be parameters for an AI/ML algorithm, e.g. weights for a neural network. These parameters may be uninitialized (i.e. the first node 3302 does not have a trained model), or they can represent a previously trained model. This step may be optional. The first node 3302 may send to the second node 3304 a set of training parameters, describing its supported AI/ML models (e.g., neural networks or random forest), which the second node 3304 can use in order to train a model optimized for the first node 3302. The second network node 3304, at 3410, creates a model using its database of UE-ESAI, e.g. based on the model parameters received from the first network node 3302. For example, the second network node 3304 may update the model parameters that have been previously trained to additionally account for the UE-ESAI stored at the second node 3304. Second node 3304 may then, at 3412, signal the model back to the first network node 3302, e.g. by sending updated model parameters to the first network node 3302. By exchanging model parameters between first and second network nodes instead of UE-ESAI, the amount of data that has to be exchanged between the nodes can be reduced. This can, for example, enable the first node 3302 to find the best energy configuration faster. In either option 1 or option 2 as illustrated, the first node 3302 may, at 3414, additionally perform radio network operations to acquire new UE-ESAI associated with one or more UEs and may, at 3416, update its model based on the new UE-ESAI.

In one embodiment of the method, the UE-ESAI reports received by the first network node and associated to user devices served by the second network node or collected at another network node and available at the second network node may include user device specific information related to energy, power, energy savings, power efficiency/savings, energy consumption, power consumption, and a variation of any of these ("UE-ESAI metrics") For example, the UE-ESAI metrics may include information associated to a UE specific radio configuration (e.g. a score, power consumption, energy savings) and information not associated to a UE specific radio configuration. For example, information related to sensor information (e.g. temperature, battery level, velocity, orientation), end-user behavior (e.g. which service types are provided by the application layer, identity of the applications) are examples of UE-ESAI metrics that are not associated to a UE specific radio configuration. UE-ESAI may also include indications pertaining to operational conditions and/or configurations under which UE-ESAI is stored (e.g., logged).

In one embodiment, the first message may comprise a batch of N≥1 UE-ESAI report associate to user devices served by the second network node or collected by other network nodes and available at the second network node. Thereby the first network node may receive a batch of historical UE-ESAI reports, either in one shot or periodically for a certain period.

In one embodiment, the first message may comprise one or more UE-ESAI reports associated certain categories of user devices served by the second network node, such as associated to user devices with specified capabilities, and/or for user devices fulfilling one or more conditions or requirements related to traffic and/or signal strength/quality and/or quality of service (QoS) and/or quality of experience (QoE).

In particular, the first network node may transmit a request message to the second network node indicating to provide UE-ESAI reports for certain types of user devices and the first message may comprise one or more UE-ESAI reports based on the request of the first node. The first message may, in this case, additionally indicate to which type of user device and/or traffic the reported UE-ESAI reports are associated to.

In one embodiment, the first message may additionally comprise, for each reported UE-ESAI report, a time stamp. The time stamp may, for instance, indicate when the UE-ESAI report was generated by a user device served by the second network node and/or received by the second network node. In one embodiment, the first message may further comprise at least an indication of the configuration used by (or applied to) the user device to determine the corresponding UE-ESAI report comprised in the first message. The reported user device configuration may be, in one example, a configuration for energy savings applied by a network node to the user device to store (e.g., log) UE-ESAI information.

In one embodiment, the first message may comprise at least a UE configuration associated to one or more operations/functions configured for the user device including one or more of:

One or more Discontinuous Transmission (DTX) configurations

One or more MIMO transmission modes

MIMO configurations, such as a maximum number of layers

Radio measurements, such as RRM measurements configuration

Carrier aggregation configurations

Quality of service (QoS) configurations

Quality of experience (QoE) configurations

The first network node may therefore utilize the UE-ESAI reports received from the second network node for multiple user devices served by the second network node to optimize the energy configuration of user devices served by the first network node. In particular, data-driven optimization methods, such as AI/ML techniques, could be used to optimize an algorithm tasked to provide the energy configuration of user devices served by the first network node. In this case, UE-ESAI reports received from the second network node (as well as from other network nodes) combined with UE-ESAI reports available at the first network node for user devices served by the first network node can be used to train (e.g., optimize) an algorithm tasked to provide the energy configuration of user devices served by the first network node. Such an AI/ML algorithm would be able to learn from the experience collected from user devices served by multiple network nodes, thereby providing a better generalization and resulting in a better selection of the energy savings configuration to be applied to user devices served by the first network node.

When the first message additionally provides an indication of the configuration used by (or applied to) the user devices served by the second network node to determine the corresponding UE-ESAI reports, this may enable use of supervised learning techniques to train an algorithm for the first network node for determining the best energy savings configurations to be applied to user devices served by the first network node.

In one embodiment, the first network node receives the first message comprising one or more UE-ESAI for a user device served by the second network node as part of the handover preparation procedure.

Figure 35:
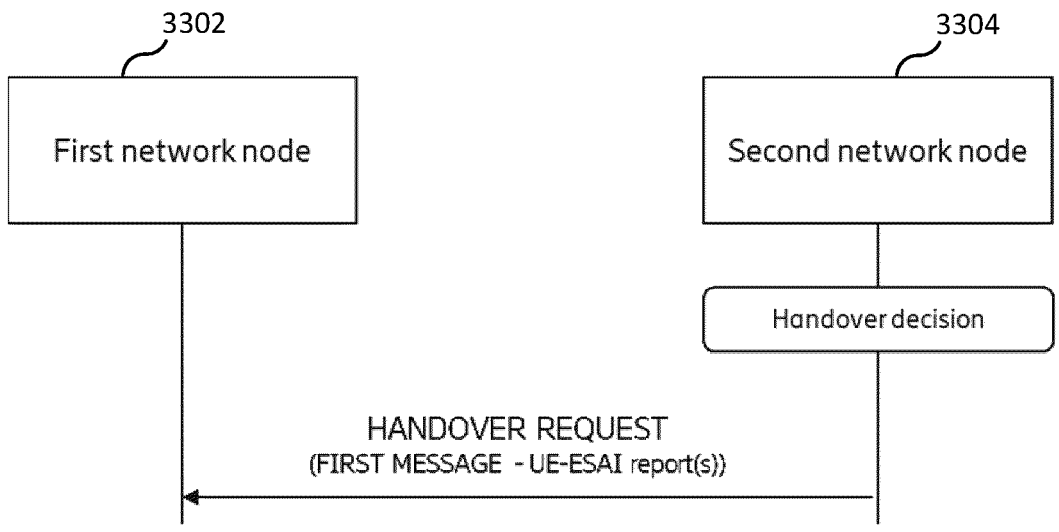
FIG. 35 illustrates a flow diagram according to some embodiments.

FIG. 35 illustrates a flow diagram according to some embodiments. As shown, first network node 3302 receives a handover request message from the second network node associated to a user device served by the second network node, where the handover request message (in addition to a handover request for the user device) may further comprise one or more UE-ESAI associated to the user device. This allows the first network node 3302 to optimize the energy saving configuration for the user device once a connection is established between the user device and the first network node 3302 (e.g., upon the completion of the handover procedure).

Figure 36:
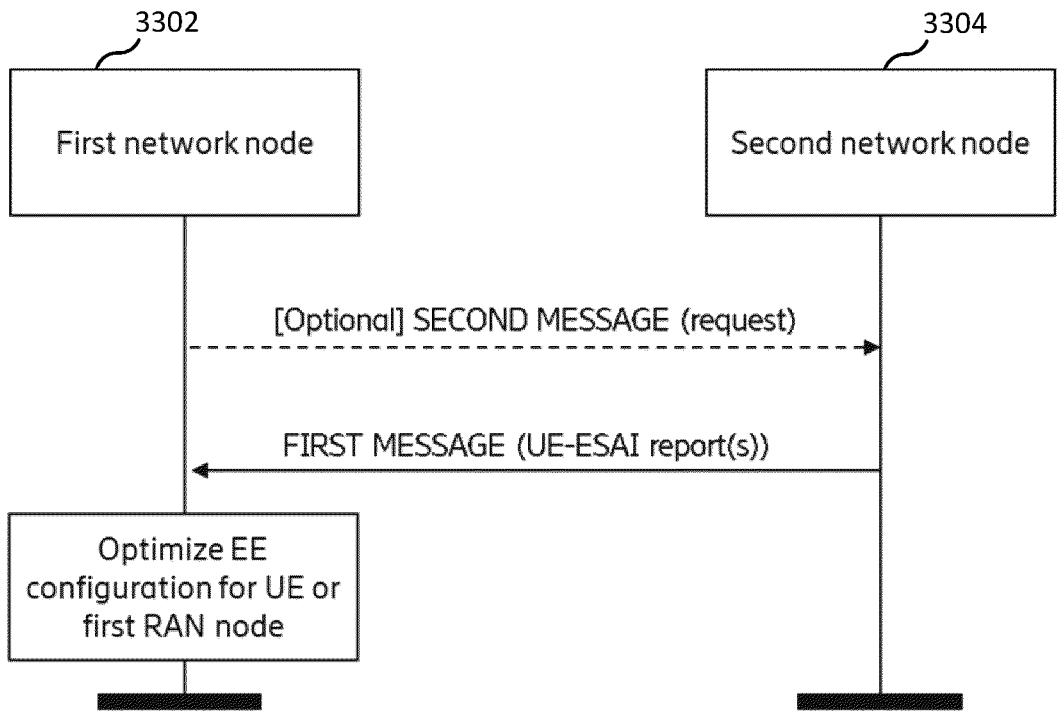
FIG. 36 illustrates a flow diagram according to some embodiments.

FIG. 36 illustrates a flow diagram according to some embodiments. As shown, the first network node 3302 may transmit a second message to the second network node 3304, the second message comprising a request for at least one or more device reports of UE-ESAI associated user devices served by the second network node 3304 or UE-ESAI reports collected by other network nodes and available at the second network 3304.

The first network node 3302 may make a request to the second network node 3304 to forward reports of UE-ESAI associated to one or more user devices served by the second network node, such as historical UE-ESAI reports collected by the second network node over a period of time from multiple user devices and/or UE-EASI reports collected by another network node and available at the second network node. It should be noted that the naming first message and second message do not reflect a specific ordering of the messages. As shown in FIG. 36, in some embodiments the first network node 3302 transmits the second message prior to receiving the first message.

Figure 37:
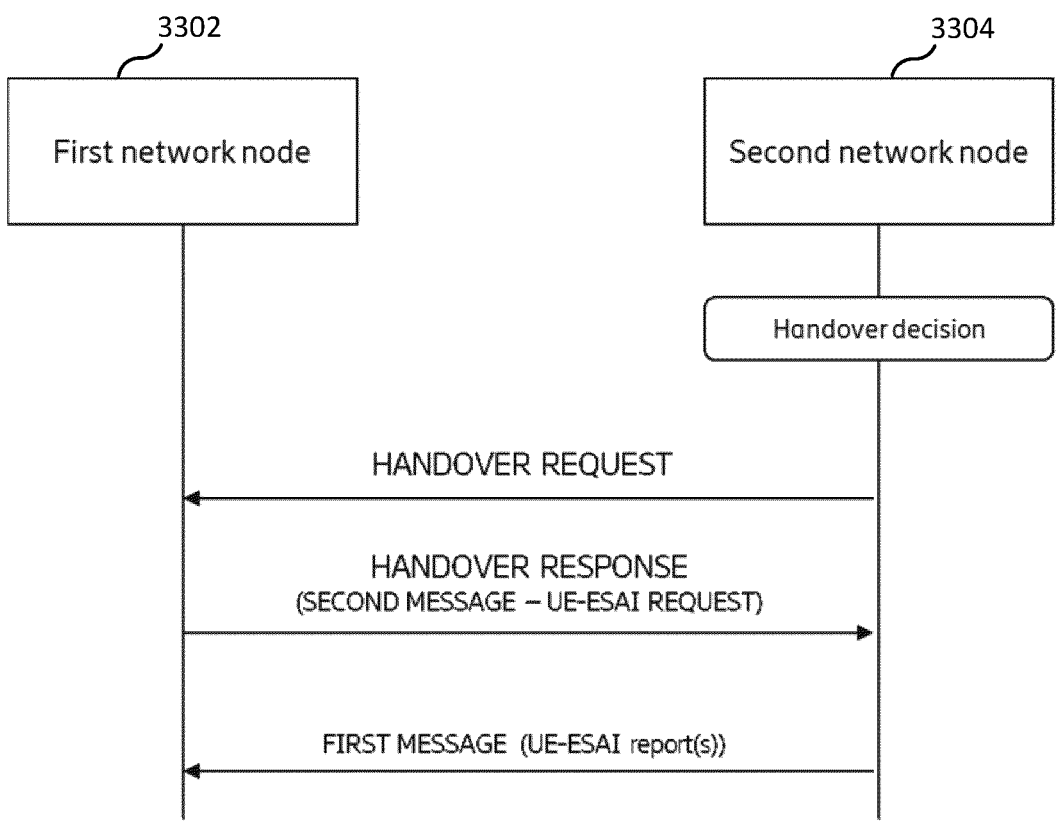
FIG. 37 illustrates a flow diagram according to some embodiments.

In one embodiment, the first network node may transmit the second message to the second network node as part of a handover preparation procedure. FIG. 37 illustrates a flow diagram according to some embodiments. As shown, the first network node 3302 may transmit a handover response message to the second network node 3304 in response to a handover request message. The handover response message may include the second message requesting one or more UE-ESAI reports associated to a user device served by the second node 3304 that can be handed over to the first network node 3302.

In this case, the first network node 3302 may receive from the second network node 3304 the first message comprising one or more UE-ESAI reports associated to a user device served by the second node 3304 that can be handed over to the first network node 3302 in a dedicated message upon the completion of or as an extension of the handover preparation. This allows the first network node 3302 to optimize the energy saving configuration for the user device once a connection is established between the user device and the first network node 3302, e.g. upon the completion of the handover procedure.

In one embodiment, the second message may additionally comprise a request for the second network node to report one or more of:

A full UE-ESAI report for user devices connected to the second network node.

A filtered UE-ESAI report for user devices connected to the second network node, comprising, for instance, a subset of the information elements of the UE-ESAI report.

A filtered UE-ESAI report comprising aggregated information associated to a group of user devices connected to the second network node.

A full or filtered UE-ESAI report collected by another network node and available at the second network node.

In one embodiment, the second message may additionally comprise a request for the second network node to report at least an indication of the user device configuration associated to the reported UE-ESAI for the user device. In one example, the first network node may make a request to the second network node to indicate one or more operations/functions configured for the user device for which UE-ESAI is reported including one or more of:

One or more Discontinuous Transmission (DTX) configuration

One or more MIMO transmission modes

MIMO configurations, such as maximum number of layer

Radio measurements, such as RRM measurements configuration

Carrier aggregation configurations

Quality of service (QoS) configurations

Quality of experience (QoE) configurations

In one embodiment, the second message may additionally comprise one or more instructions and/or events and/or conditions for reporting user device related reports of UE-ESAI to the first network node, selected from one or more of:

A reporting periodicity.

A one-time reporting.

A reporting criteria, such as, for example, upon network request, upon reaching a certain size for the stored (e.g., logged) UE-ESAI information at the second network node, upon reaching a maximum size of the stored (e.g., logged) UE-ESAI information at the second network node, upon reaching a certain number of user device UE-ESAI reports at the second network node, and/or upon reaching a minimum or a maximum number of user device UE-ESAI reports at the second network node.

Reporting a pre-defined number, such as minimum or a maximum number, of user device UE-ESAI reports (such as a batch of UE-ESAI reports).

Reporting UE-ESAI reports only that are generated prior to, after, and/or at a specified date in time. Thereby, the second message may additionally indicate a date and whether the first network node requests UE-ESAI reports generated prior to the indicated date, after the indicated date, and/or at the indicated date.

Reporting UE-ESAI reports only for certain categories of user devices served by the second network node, such as user devices with specified capabilities, user devices with specified conditions, or user devices with specified requirements. Examples of user devices for which the first network node may request the second network node to report UE-ESAI may comprise:

User devices with a certain quality of service requirements, such as user devices with latency requirements exceeding or below a first or a second threshold, respectively, and/or user devices with bit-rate requirements exceeding or below a first or a second threshold, respectively.

User devices reporting a quality of experience (QoE) measurement for at least a given service, whether the QoE reporting is visible to RAN or transparent to RAN.

User devices with a signal quality exceeding or below a first or a second threshold, respectively. For instance, the condition may refer to user devices at the cell border with another cell and/or at the cell center.

User devices with bit rate exceeding or below a first or a second threshold, respectively.

User device with battery level exceeding or below a first or a second threshold, respectively.

User devices with reported or estimated speed exceeding or below a first or a second threshold, respectively.

User devices with number of transmit or receive antennas exceeding, equal or below a first, a second, or a third threshold, respectively.

User devices with AI/ML capabilities.

User devices of a certain type that fulfil a list of capabilities.

User devices with a RRM measurement configuration fulfilling specified requirements, such as a RRM measurement window exceeding or below a first or a second threshold, respectively.

User devices with a DRX or DTX configuration fulfilling specified requirements, such as a DRX or DTX period exceeding or below a first or a second threshold, respectively.

User devices with number of transmit or receive antennas exceeding, equal or below a first, a second, or a third threshold, respectively.

User device capable of machine type communication.

User devices capable of device to device communication.

User deices capable of unlicensed assisted communication.

User devices capable of coordinate multi-point communication.

User devices capable of side-link communication.

User devices capable of multi-connectivity, such as dual connectivity (DC) and/or multi-RAT dual connectivity (MR-DC).

Reporting UE-ESAI only for a certain fraction of user devices served by the second network node.

Sending/forwarding all or only a certain fraction of UE-ESAI reports received at the second network node and collected at another network node.

Reporting UE-ESAI only for user devices served by the second network node with a certain type of traffic, such as user devices with video traffic exceeding or below a first or a second threshold, respectively; user devices with data video traffic exceeding or below a first or a second threshold, respectively; and/or URLLC user devices.

Reporting of UE-ESAI only for one or more configurations of the user device, such as, for example:

One or more Discontinuous Transmission (DTX) configurations.

One or more MIMO transmission modes.

MIMO configurations, such as maximum number of layer.

Radio measurements, such as RRM measurements configuration.

Carrier aggregation configurations.

Quality of service (QoS) configurations.

Quality of experience (QoE) configurations.

A list of instructions to start, stop, pause, resume or modify the reporting of UE-ESAI reports.

A list of instructions and/or filtering criteria to aggregate UE-ESAI reports of multiple user devices.

A list of instructions and/or filtering criteria to filter UE-ESAI reports reported to the first network node.

These instructions and/or events and/or conditions for reporting user device related reports of UE-ESAI to the first network node may instruct the second network node regarding transmitting UE-ESAI to the first network node, e.g. in terms of how to transmit, when to transmit, and what to transmit in the first message.

Figure 38:
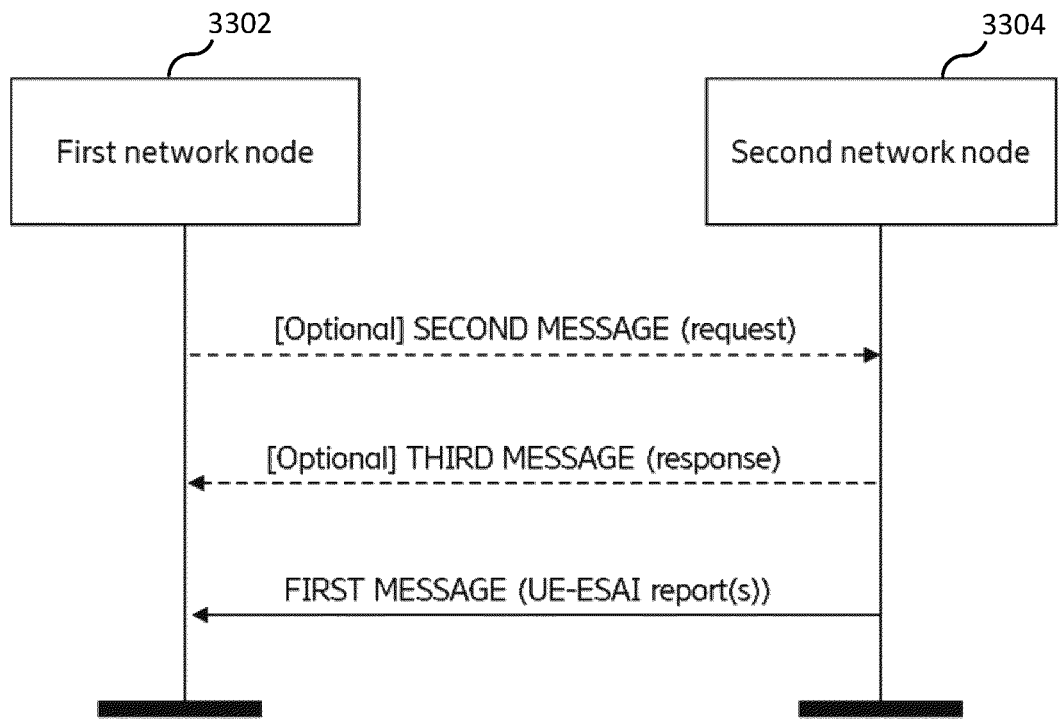
FIG. 38 illustrates a flow diagram according to some embodiments.

FIG. 38 illustrates a flow diagram according to some embodiments. As shown, the first network node 3302 may additionally receive a third message from the second network node 3304, the third message comprising at least one of (i) a positive acknowledgement (ACK) indicating a successful or partially successful initialization of a UE-ESAI reporting procedure between the first and the second network node and (ii) a negative acknowledgement (NACK) indicating an unsuccessful initialization of a UE-ESAI reporting procedure between the first and the second network node.

In one embodiment, in case of a or partially successful initialization of the UE-ESAI reporting procedure between the first and the second network node, the third message may additionally comprise an indication of the information that can be reported from the second network node to the first network node.

In one embodiment, in case of an unsuccessful initialization of the UE-ESAI reporting procedure between the first and the second network node, the third message may additionally comprise an indication of the cause for the failure.

FIG. 38 illustrates a flow diagram according to some embodiments. As shown, the first network node 3302 may additionally receive a fourth message form a third network node 3902, the fourth message comprising a request to provide one or more reports of UE-ESAI associated to one or more user devices served by the first network node and/or served the second network node and/or served by other network nodes not necessarily neighbors of the first network node.

The third network node 3902, in some embodiments, may be an OAM, SMO, or another entity external to RAN. In this case, the first network node 3302 may receive a request from the third network node to provide UE-ESAI associated to user devices served by the first network node or by another network node.

In one embodiment, the first network node 3302 may transmit the second message to the second network node 3304 upon receiving the fourth message from the third network node 3902. Therefore, the transmission and the content of the second message may be dependent on the request received by the first network node 3302 with the fourth message. In one example, illustrated in FIG. 39, the first network node 3302 and the second network node 3304 are RAN nodes, and the third network node 3902 is one of an OAM or a SMO node.

In one embodiment, the first network node 3302 may additionally transmit a fifth message to a third network node 3902, the fifth message comprising one or more reports of UE-ESAI associated to one or more user devices served by the first network node 3302 and/or UE-ESAI reports received from second network node 3304 via the first message.

Figure 39:
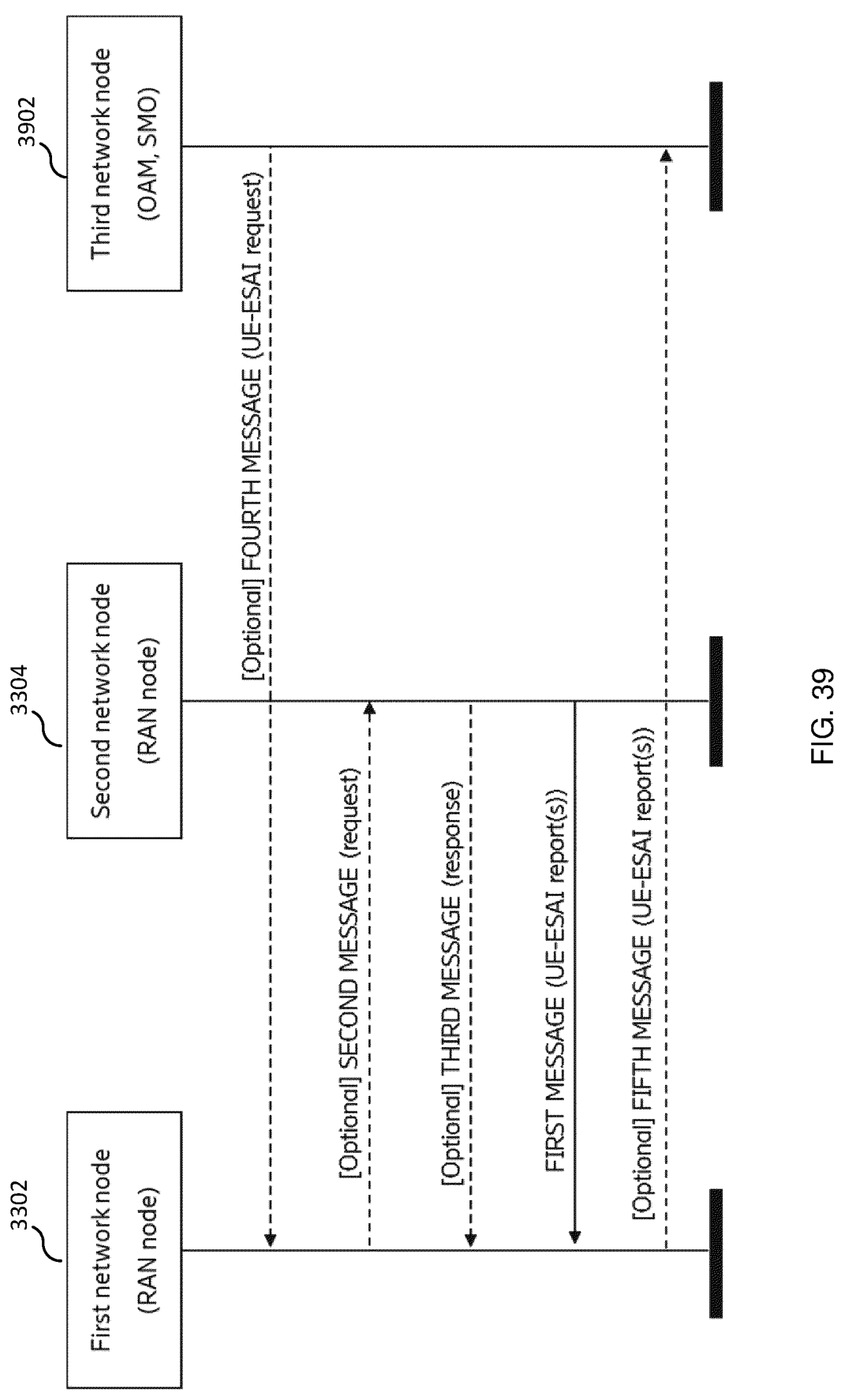
FIG. 39 illustrates a flow diagram according to some embodiments.

Therefore, the first network node 3302 may forward to a third network node 3902 UE-ESAI associated to user devices served by the first network node 3302 (reports collected by the first network node itself) and/or UE-ESAI reports received from second network node 3304 via the first message (which may comprise UE-ESAI reports associated to user devices served by the second network node, as well as UE-ESAI reports associated to user devices served by other network nodes that are available at the second network node). In one example, the first network node may transmit the fifth message in response to a fourth message received from the third network node, as illustrated in FIG. 39.

UE-ESAI Metrics and Report

In one embodiment, the UE-ESAI that the first network node may receive from and/or make a request to the second network node for, may comprise one or more measurements and/or predictions and/or estimates of energy related metrics of the user device, such as power/energy consumption, power/energy efficiency, etc., in association to one or more operations/functions configured for the user device including one or more of:

One or more Discontinuous Transmission (DTX) configu-
    rations
  One or more MIMO transmission modes
  MIMO configurations, such as maximum number of
    layers
  Radio measurements, such as RRM measurements con-
    figuration
  Carrier aggregation configurations
  Quality of service (QoS) configurations
  Quality of experience (QoE) configurations In one example, each operation/function for which the user device has stored (e.g., logged) and/or reported one or more UE-ESAI may comprise a list of parameter settings. In addition, each operation/function for which the user device has stored (e.g., logged) and/or reported one or more UE-ESAI may comprise a operation/function configured at the user device or potential configurations for the user device.

In one embodiment, UE-ESAI may further comprise a measurement and/or a prediction and/or an estimate of energy related metrics including one or more of:

The power and/or battery consumption of the user device
    (measured, estimated, or predicted) associated to or
    more operations/functions configured for the user
    device.
  The power and/or battery saved by the user device (mea-
    sured, estimated, or predicted) associated to or more
    operations/functions configured for the user device
  The power and/or battery efficiency of the of the user
    device (measured, estimated, or predicted) associated
    to or more operations/functions configured for the user
    device.
  Power and/or batter lifetime increase or decrease (mea-
    sured, estimated, or predicted) associated to or more
    operations/functions configured for the user device.

In one embodiment, the UE-ESAI may further comprise an indication of the time when the UE-ESAI information is taken and/or the time validity of the UE-ESAI, including one or more of:

A timestamp indicating when at least one measurement,
    estimate or prediction of a least one energy related
    metric of the user device comprised in the UE-ESAI
    has been taken, and/or when it was received.
  A first time interval indicating for how long at least one
    measurement, estimate or prediction of a least one
    energy related metric of the user device comprised in
    the UE-ESAI has been taken.
  A second time interval indicating for how long at least one
    measurement, estimate or prediction of a least one
    energy related metric of the user device comprised in
    the UE-ESAI is valid.

In one embodiment, an UE-ESAI measurement and/or prediction and/or estimate of energy related metrics associated to one or more operations/functions of the user device may be reported in one or more reporting formats including one or more of:

A metric indicated as absolute values (e.g., for power
    consumption, remaining power, energy consumption,
    energy savings). For example: power level in mW,
    energy consumption in Joule, energy savings.
  A metric indicated as percentage values (e.g., for power
    consumption, remaining power, energy consumption,
    energy savings), wherein a value (e.g. 0) indicates a
    minimum level and another value (e.g. 100) indicates a
    maximum level.
  A metric indicated as relative increase or decrease, com-
    pared to a reference, wherein a positive value indicates
    an increase of the metric (or vice versa) and a negative
    value indicate a decrease of the metric (or vice versa).
    For example, a positive value X_1 can indicate that the
    energy savings has increased (positive effect) compared
    to a reference value of X_ref; or a positive value Y_1
    can indicate that the energy consumption has increased
    (negative effect) compared to a reference value of
    Y_ref. A relative increase or decrease can be in absolute
    value form or in a percentage.
  A metric indicated in a qualitative sense for at least one of
    the power or energy metrics. For example, a scalar
    indicating if the energy savings is considered as good,
    medium, poor.
  A score value (measured, estimated, or predicted) asso-
    ciated to or more operations/functions configured for
    the user device.
  A delta/offset value for a measurement, estimate, or
    prediction with respect to a reference value, where the
    value may refer to an actual measurement, estimate, or
    prediction and/or a score value.

In one embodiment, the UE-ESAI comprises one or more measurements and/or predictions and/or estimates of energy related metrics associated to the operation of the user device when connected with the first network node or camping in a radio cell controlled by the first network node. In one embodiment, the UE-ESAI comprises one or more measurements and/or predictions and/or estimates of energy related metrics associated to the operation of the user device when connected with the second network node or camping in a radio cell controlled by the second network node. In one embodiment, the UE-ESAI may comprise measurements and/or predictions and/or estimates of energy related metrics of the user device, such as power/energy consumption, power/energy efficiency, etc., in association to one or more network configurations including one or more of:

TDD pattern configurations

Spectrum sharing configuration (e.g., between NR and LTE)

Configuration of unlicensed spectrum (e.g., license assisted access for LTE)

Downlink reference signals configuration, such as CRS configuration, SSB beams configurations, discovery reference signal configurations, etc.

Number of configured/available component carriers at a network node

Transmission mode configured in one or more radio cells of a network node

MIMO transmission mode

Bandwidth configuration

Downlink transmission power configuration

Cell sleeping mode

Entry and/or exit conditions related to mobility events configured for at least a radio cell and/or a SSB coverage area of a network node, e.g. threshold/offset settings, time to trigger settings, and/or hysteresis settings Method and embodiments for the second node: Embodiments provide a method executed by a second network node in a communication network for exchanging user device reports comprising UE-ESAI with a first network node. The method may include transmitting a first message to a first network node, the first message comprising one or more reports of UE-ESAI associated to one or more user devices served by the second network node or by another network node and available at the second network node.

Additional signaling may be employed in some embodiments. For example, the method may include receiving a second message from the first network node, the second message comprising request for one or more reports of UE-ESAI associated to user devices served by the second network node or UE-ESAI reports collected by other network nodes and available at the second network. The method may also include transmitting a third message to the first network node, the third message comprising at least a positive acknowledgment (ACK) or a negative acknowledgment (NACK) based on the information requested with the second message.

Embodiment for node level architecture: Non-limiting examples of exemplary realizations of a system according to some embodiments are provided for specific technologies (e.g. the 3GPP LTE and NG-RAN systems).

In one embodiment, the first network node is a first RAN node (e.g. a gNB or an eNB) and a second network node is a second RAN node (e.g. another gNB or another eNB), the third network node is a third RAN node or a CN node, or a OAM, and the communication between the first network node and the second network node can occur directly or indirectly (e.g. via XnAP, X2AP) or via a third network node (e.g. NGAP, S1AP).

In one example, the first network node and the second network node are enhanced NodeBs of 3GPP E-UTRAN system. In this case, the first, second, and third messages can be exchanged using a X2 interface of the E-UTRAN system (e.g., LTE and/or LTE-A).

In another example, the first network node and the second network node are NG-RAN nodes (e.g., gNB) of a 3GPP NG-RAN system (also knowns as NR system). In this case the first, second, and third messages can be exchanged using a Xn interface of the NG-RAN system.

In another example, the first network node is an NG-RAN node of an NG-RAN system, while the second network node is enhanced NodeB (e.g., eNB or en-eNB) of an E-UTRAN system. In this case, the first, second, and third messages can be exchanged using a X2 interface between the E-UTRAN system and NG-RAN system. Without loss of generality, the first network node could be a RAN node or a logical node of a RAN node, such as a gNB-CU.

In one embodiment, a distributed architecture may be used. For example, a first network node is a first logical entity of a RAN node and the second network node is a second logical entity of a RAN node. In one scenario, the first network node and the second network node can be two different logical entities of the same RAN node. In another scenario, the first network node and the second network node are two logical entities of two different RAN nodes. Examples of logical entities of a RAN node are, for in instance, the centralized unit (CU) of an NG-RAN node (e.g., a gNB-CU or the relative control plane node gNB-CU-CP) and the distributed unit (DU) of an NG-RAN node (e.g., a gNB-DU).

In one embodiment, the first network node is a distributed unit (DU) of an NG-RAN node (e.g., a gNB-DU), while the second network node is a centralized unit (CU) of an NG-RAN node (e.g., a gNB-CU or a gNB-CU-CP). In this case the first, second, and third messages can be exchanged using a F1 interface of the NG-RAN system.

In one embodiment of the method, the first network node is a first centralized unit (CU) of a NG-RAN node (e.g., a gNB-CU), while the second network node is a second decentralized unit (DU) of a NG-RAN node (e.g., a gNB-CU). In this case, the first message and the second message can be exchanged using a F1 interface of the NG-RAN system.

In one embodiment, the first network node may be an orchestration and management (OAM) node whereas the second network node may be a RAN node.

Example of possible implementation for NG-RAN and/or LTE systems: In one embodiment, the first, second, and third messages may be realized by signaling procedure inspired to the Resource Status Reporting procedure of the LTE and NR systems. The second message may be a UE-ESAI REPORT REQUEST message transmitted by the first network node to the second network node. The third message may be one of a UE-ESAI REPORT ACKNOWLEDGMENT message received by network node from the second network node and a UE-ESAI REPORT FAILURE message received by network node from the second network node. The first message may be a UE-ESAI REPORT UPDATE message received by network node from the second network node.

Figure 40A:
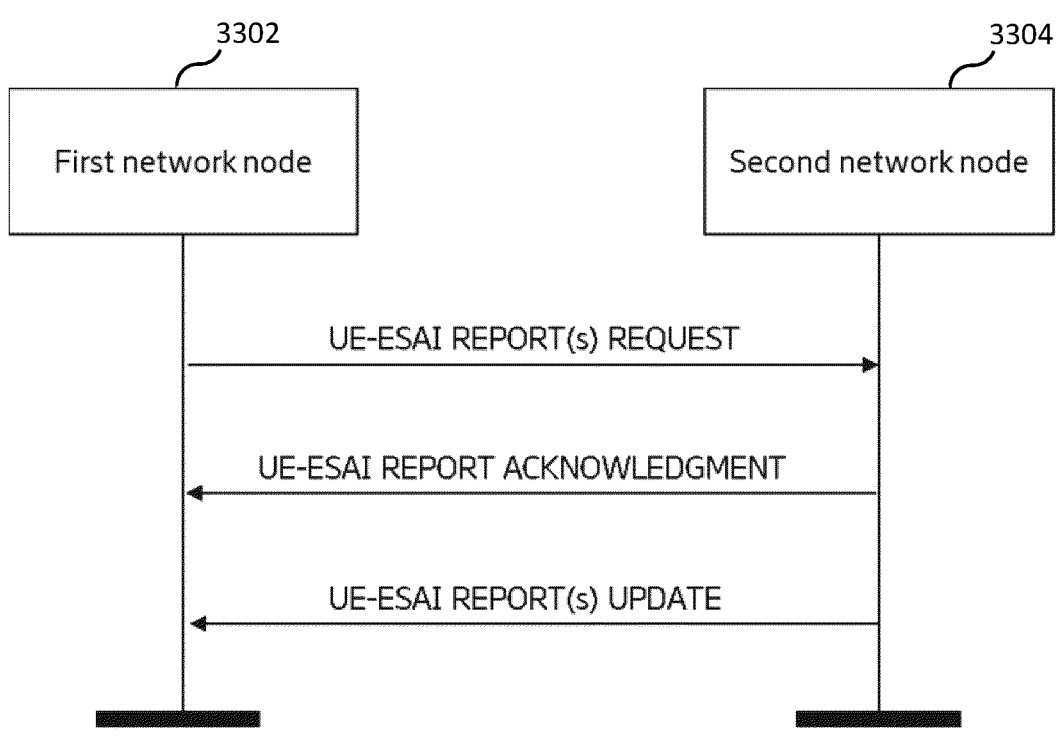
FIG. 40A illustrates a flow diagram according to some embodiments.
Figure 40B:
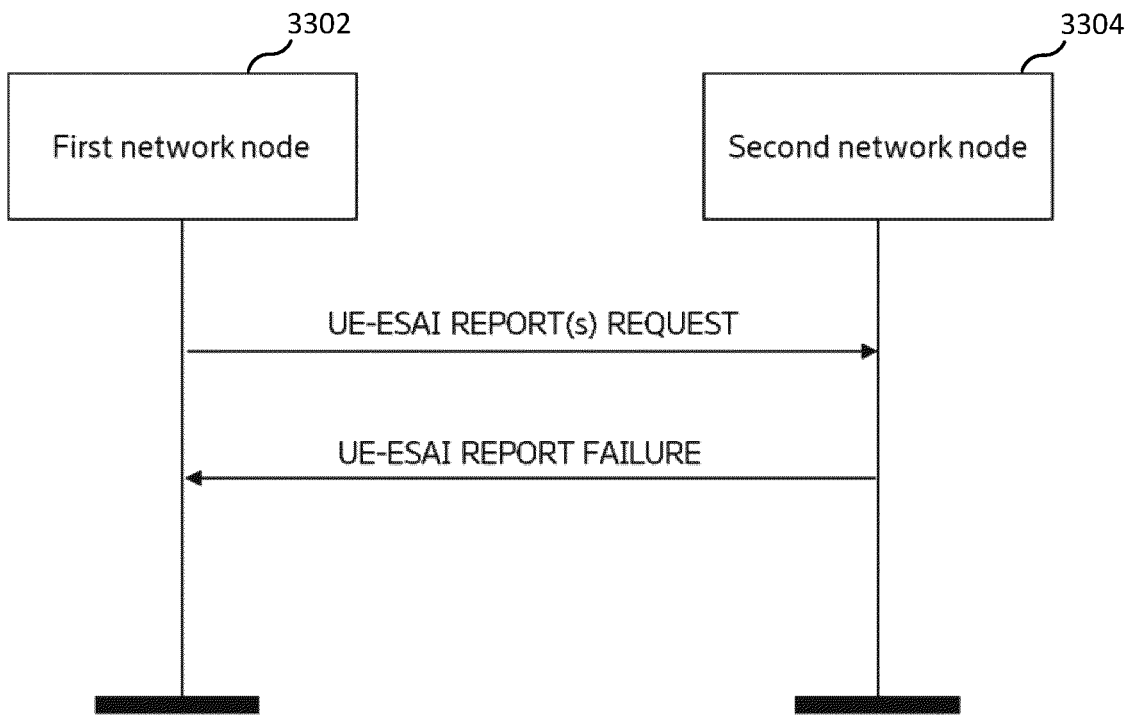
FIG. 40B illustrates a flow diagram according to some embodiments.

FIGS. 40A and 40B illustrate flow diagrams according to some embodiments. As shown, FIG. 40A illustrates a successful initialization of the reporting procedure, while FIG. 40B illustrates a failure in initializing the reporting procedure.

Example of signaling implementation: In this clause an example of implementation is provided for XnAP procedures. The example below represents an entirely new contribution related to this disclosure:

Retrieve UE Assistance Report Request

This message is sent by NG-RAN node₁ to NG-RAN node₂ to request UE Assistance Report according to the parameters given in the message. Direction: NG-RAN node₁ ⮕NG-RAN node₂.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node 1 Measurement ID | M | | INTEGER (1 . . . 4095, . . .) | Allocated by NG-RAN node₁ | YES | reject |
| NG-RAN node2 Measurement ID | M | | INTEGER (1 . . . 4095, . . .) | Allocated by NG-RAN node₂ | YES | reject |
| Registration Request | M | | ENUMERATED (start, stop, add, . . .) | Type of request for which the UE Assistance Report is required. | YES | reject |
| Report Characteristics | C-ifRegistrationRequestStart | | BITSTRING (SIZE(32)) | Each position in the bitmap indicates the type of UE Assistance Report the NG-RAN node2 is requested to report. First Bit = Energy Efficiency, Other bits shall be ignored by the NG-RAN node2. | YES | reject |
| Reporting Periodicity | M | | ENUMERATED (0, 500 ms, 1000 ms, 2000 ms, 5000 ms, 10000 ms, . . .) | Periodicity that can be used in the reporting of UE Assistance Reporting. Value 0 indicates one time reporting | YES | ignore |

Retrieve UE Assistance Report Acknowledge

This message is sent by NG-RAN node₂ to NG-RAN node₁ to confirm that the requested UE Assistance Report can be provided. Direction: NG-RAN node₁ ⮕NG-RAN node₂.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1 . . . 4095, . . .) | Allocated by NG-RAN node₁ | YES | reject |
| NG-RAN node2 Measurement ID | M | | INTEGER (1 . . . 4095, . . .) | Allocated by NG-RAN node₂ | YES | Reject |
| Cause | M | | 9.2.3.2 | | YES | ignore |
| Criticality Diagnostics | O | | 9.2.3.3 | | YES | ignore |

UE Assistance Report Update

This message is sent by NG-RAN node$_2$ to NG-RAN node$_1$ to report the requested UE Assistance Report. Direction: NG-RAN node$_2$ ▯ NG-RAN node$_1$.

message to the third node is performed in response to receiving the fourth message transmitted by the third node. In some embodiments, the third node comprises one of an Operations, Administration, and Maintenance (OAM) node,

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1 . . . 4095, . . .) | Allocated by NG-RAN node$_1$ | YES | reject |
| NG-RAN node2 Measurement ID | M | | INTEGER (1 . . . 4095, . . .) | Allocated by NG-RAN node$_2$ | YES | Reject |
| UE Assistance Report List | | | | | | |
| >UE-Energy Efficiency Report Item | | 0 . . . 1 | | | YES | Ignore |
| >>Energy Efficiency score | M | | INTEGER (0 . . . 100, . . .) | Indicates an Energy Efficiency score associated to an UE configuration | YES | Reject |

FIG. 41A is a flowchart illustrating a process 1100A, according to an embodiment, performed by a first node for optimizing energy savings configurations. Process 1100A may begin in step s4102.

Step s4102 comprises receiving at the first node a first message transmitted by a second node, wherein the first node and the second node are in a communication network that serves one or more user equipments (UEs), and wherein the first message comprises one or more UE-related energy state assistance information (UE-ESAI), each UE-ESAI being associated with a UE.

Step s4104 comprises optimizing one or more of (i) an energy savings configuration for one or more UEs of the UEs associated with the one or more UE-ESAI; and (ii) an energy savings configuration for the first node, wherein the optimizing is based on the one or more UE-ESAI.

In some embodiments, each of the one or more UE-ESAI being associated with the UE, either the second node serves or has served the UE or the second node stores the UE-ESAI and the UE is served or has been served by another node. In some embodiments, the method further includes transmitting a second message to the second node, wherein the second message comprises a request for one or more UE-ESAI, each UE-ESAI being associated with a UE. In some embodiments, the method further includes receiving a third message transmitted by the second node, wherein the third message comprises a positive acknowledgement (ACK) or a negative acknowledgement (NACK) corresponding to the information requested by the second message. In some embodiments, the method further includes receiving a fourth message transmitted by a third node, wherein the fourth message comprises a request for one or more UE-ESAI, each UE-ESAI being associated with a UE. In some embodiments, the request for one or more UE-ESAI, each UE-ESAI being associated with a UE, comprises an indication that the first node is requesting one or more of: UE-ESAI associated to one or more user devices (i) served by the first network node, (ii) served the second network node and (iii) served by network nodes different from the first or second node.

In some embodiments, the method further includes transmitting a fifth message to a third node, wherein the fifth message comprises one or more UE-ESAI available at the first node. In some embodiments, transmitting the fifth a Service Management and Orchestration (SMO) node, and an entity external to a Radio Access Network (RAN). In some embodiments, optimizing comprises using an artificial intelligence (AI) or machine-learning (ML) based model or algorithm, the method further comprising creating or updating the AI or ML based model or algorithm based on the UE-ESAI received at the first node. In some embodiments, optimizing comprises using an artificial intelligence (AI) or machine-learning (ML) based model or algorithm, the method further comprising transmitting model or algorithm training parameters for the AI or ML based model or algorithm to the second node and receiving updated model or algorithm training parameters for the AI or ML based model or algorithm transmitted by the second node.

In some embodiments, the one or more UE-ESAI each comprise a UE-ESAI metric, wherein the UE-ESAI metric comprises one or more of device-specific information related to any or all of energy, power, energy efficiency, energy savings, power efficiency, power savings, energy consumption, power consumption, and a variation of any of these. In some embodiments, the UE-ESAI metric further includes one or more of: information associated to a UE specific radio configuration; information related to sensor information and/or end-user behavior; and information pertaining to operational conditions and/or configurations under which UE-ESAI is stored (e.g., logged). In some embodiments, the first message comprises a single batch message containing each of the one or more UE-ESAI. In some embodiments, the first message comprises multiple messages collectively containing each of the one or more UE-ESAI.

In some embodiments, the one or more UE-ESAI are associated with a category of UE. In some embodiments, the category of UE comprises one or more of: UEs served by the second node, UEs with specified capabilities, and UEs fulfilling one or more conditions or requirements related to traffic and/or signal strength and/or signal quality and/or quality of service (QoS) and/or quality of experience (QoE). In some embodiments, the request for one or more UE-ESAI in the second message comprises a category request such that the requested UE-ESAI are associated with a category of UE. In some embodiments, the first message further comprises, for each of the one or more UE-ESAI, one or more of a time stamp and information indicating a configuration used by or applied to the associated UE.

In some embodiments, the first message is received at the first node in connection with a handover request initiated by the second node. In some embodiments, the first message is comprised within a handover request message transmitted by the second node. In some embodiments, the second message is transmitted to the second node in connection with a handover response message responsive to a handover request transmitted by the second node. In some embodiments, the third message further comprises an indication of the information available in the one or more UE-ESAI in the second node. In some embodiments, the first node is a first Radio Access Network (RAN) node and the second node is a second RAN node. In some embodiments, the second message further comprises information relating to reporting of UE-ESAI, the information comprising one or more of: a reporting periodicity; a one-time reporting; a reporting criteria; a predetermined, minimum or a maximum number of user device UE-ESAI reports; a percentage of user device UE-ESAI reports; a relevant time window; a set of relevant categories of user devices; a network node source identifier; a traffic threshold; a set of relevant configurations; a list of instructions to start, stop, pause, or modify reporting; and a set of filtering criteria.

FIG. 41B is a flowchart illustrating a process 1100B, according to an embodiment, performed by a second node for optimizing energy savings configurations. Process 1100B may begin in step s4106.

Step s4106 comprises transmitting to a first node a first message, wherein the first node and the second node are in a communication network that serves one or more user equipments (UEs), and wherein the first message comprises one or more UE-related energy state assistance information (UE-ESAI), each UE-ESAI being associated with a UE.

In some embodiments, for each of the one or more UE-ESAI being associated with the UE, either the second node serves or has served the UE or the second node stores the UE-ESAI and the UE is served or has been served by another node. In some embodiments, the method further includes receiving a second message transmitted by the first node, wherein the second message comprises a request for one or more UE-ESAI. In some embodiments, the method further includes transmitting to the first node a third message, wherein the third message comprises a positive acknowledgement (ACK) or a negative acknowledgement (NACK) corresponding to the information requested by the second message. In some embodiments, the method further includes receiving model training parameters transmitted by first node for an artificial intelligence (AI) or machine learning (ML) based model and transmitting to the first node updated model training parameters for the AI or ML based model.

In some embodiments, the one or more UE-ESAI each comprise a UE-ESAI metric, wherein the UE-ESAI metric comprises one or more of device-specific information related to any or all of energy, power, energy efficiency, energy savings, power efficiency, power savings, energy consumption, power consumption, and a variation of any of these. In some embodiments, the UE-ESAI metric further includes one or more of: information associated to a UE specific radio configuration; information related to sensor information and/or end-user behavior; and information pertaining to operational conditions and/or configurations under which UE-ESAI is stored (e.g., logged). In some embodiments, the first message comprises a single batch message containing each of the one or more UE-ESAI. In some embodiments, the first message comprises multiple messages collectively containing each of the one or more UE-ESAI.

In some embodiments, the one or more UE-ESAI are associated with a category of UE. In some embodiments, the category of UE comprises one or more of: UEs served by the second node, UEs with specified capabilities, and UEs fulfilling one or more conditions or requirements related to traffic and/or signal strength and/or signal quality and/or quality of service (QoS) and/or quality of experience (QoE). In some embodiments, the request for one or more UE-ESAI in the second message comprises a category request such that the requested UE-ESAI are associated with a category of UE. In some embodiments, the first message further comprises, for each of the one or more UE-ESAI, one or more of a time stamp and information indicating a configuration used by or applied to the associated UE. In some embodiments, the first message is transmitted to the first node in connection with a handover request initiated by the second node.

In some embodiments, the first message is comprised within a handover request message transmitted by the second node. In some embodiments, the second message is received at the second node in connection with a handover response message transmitted by the first node and responsive to a handover request transmitted by the second node. In some embodiments, the third message further comprises an indication of the information available in the one or more UE-ESAI in the second node. In some embodiments, the first node is a first Radio Access Network (RAN) node and the second node is a second RAN node. In some embodiments, the second message further comprises information relating to reporting of UE-ESAI, the information comprising one or more of: a reporting periodicity; a one-time reporting; a reporting criteria; a predetermined, minimum or a maximum number of user device UE-ESAI reports; a percentage of user device UE-ESAI reports; a relevant time window; a set of relevant categories of user devices; a network node source identifier; a traffic threshold; a set of relevant configurations; a list of instructions to start, stop, pause, or modify reporting; and a set of filtering criteria. In some embodiments, transmitting to a first node (3302) a first message (3310) is based on the information relating to reporting of UE-ESAI. For example, the timing of the first message, the contents of the first message, including the number and/or scope of UE-ESAI comprised in the first message, may be based on the information relating to reporting of UE-ESAI.

SUMMARY OF VARIOUS EMBODIMENTS

Figure 23:
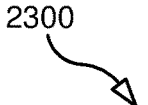
FIG. 23 is a flowchart illustrating a process according to some embodiments.
Figure 23:
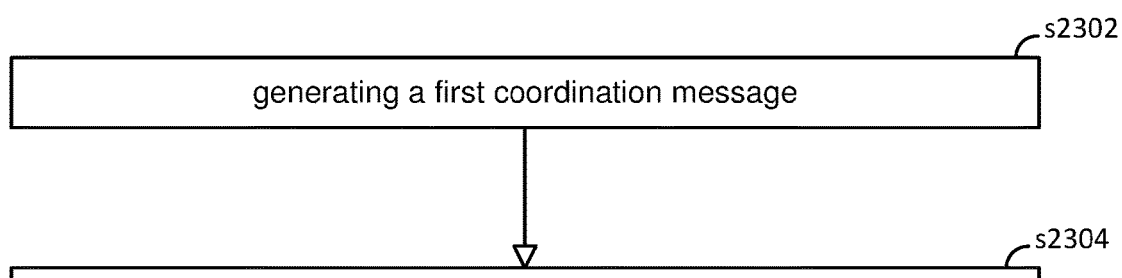

A1. A method (2300) (see FIG. 23) performed by a first network node (901) for coordinating with a second network node (902) with respect to a user equipment, UE, energy state assistance information, UE-ESAI, configuration for a UE (900) or a group of UEs currently being served by the first network node, the method comprising: generating (s2302) a first coordination message; and transmitting (s2304) the first coordination message to the second network node, wherein the first coordination message comprises information related to configuring the UE or the group of UEs to store and/or report UE-ESAI, and the UE-ESAI comprises a measured or estimated first energy metric.

A2. The method of embodiment A1, wherein the information comprised in the first coordination message and related to configuring the UE or the group of UEs comprises a recommended or preferred UE-ESAI configuration for the UE or the group of UEs.

A3. The method of embodiment A1, wherein the information related to configuring the UE or the group of UEs to store and/or report UE-ESAI comprises a request to the second network node for the second network node to provide one or more configuration parameters that should be used for configuring the UE or the group of UE to store and/or report UE-ESAI.

A4. The method of any one of embodiments A1-A3, further comprising: receiving a second coordination message transmitted by the second network node and responding to the first coordination message, wherein the second coordination message comprises a UE-ESAI configuration generated by the second network node based on the information included in the first coordination message.

A5. The method of any one of embodiments A1-A4, wherein the first energy metric comprises: an energy consumption metric indicating an amount of energy consumed by the UE over a certain period of time, an energy consumption metric indicating an estimated amount of energy that the UE is expected to consume over a certain period of time, an estimated or measured energy efficiency metric, a battery metric (e.g., a metric indicating a battery lifetime increase or decrease or a metric indicating battery energy saved), a power metric indicating an average rate at which the UE consumed energy during a given period of time, a power metric indicating an estimate average rate at which the UE is expected to consume energy during a given period of time, or an estimated or measured power efficiency metric.

A6a. The method of any one of embodiments A1-A5, wherein the first energy metric is associated with a first configuration, and the first configuration comprises: a Discontinuous Transmission, DTX, configuration, a Multiple-Input-Multiple-Output, MIMO, configuration, a Radio Resource Management, RRM, measurement configuration, a Carrier Aggregation, CA, configuration, a dual-connectivity configuration, a Quality-of-Service, QoS, configuration, or a Quality-of-Experience, QoE, configuration.

A6b. The method of any one of embodiment A1-A6a, wherein the UE-ESAI further comprises a second energy metric that is associated with a second configuration.

A7. The method of any one of embodiments A1-A6b, wherein transmitting the first coordination message to the second network node comprises: transmitting to the second network node a handover request message comprising the first coordination message.

A8. The method of embodiment A7, further comprising: receiving a handover response transmitted by the second network node in response to the handover request, wherein the handover response comprises a second coordination message, and the second coordination message comprises information related to configuring the UE or the group of UEs to store and/or report UE-ESAI.

A9. The method of any one of embodiments A1-A8, further comprising: transmitting to the UE a first UE-ESAI message comprising a UE-ESAI configuration comprising configuration information related to configuring the UE to store and/or report UE-ESAI (e.g., the UE-ESAI configuration may contain configuration information specifying the type or types of UE-ESAI that the UE should store and report).

A10. The method of embodiment A9, wherein the UE-ESAI configuration comprises an instruction for causing the UE to transmit to a target node a UE-ESAI report after or during a handover process for handing the UE over to the target node.

A11. The method of embodiment A9 or A10, wherein the UE-ESAI configuration comprises an instruction for causing the UE to store UE-ESAI associated with a period of time during which the UE was connected with the first network node and/or UE-ESAI associated with a period of time during which the UE was connected with the second network node.

A12. The method of embodiment A11, wherein the instruction for causing the UE to store the UE-ESAI causes the UE to measure and/or estimate UE-ESAI prior to, and/or during, and/or after handover from the first network node to the second network node and store the measured and/or estimated UE-ESAI.

A13a. The method of embodiment A11 or A2, wherein the UE-ESAI configuration causes the UE to report UE-ESAI to the second network node, wherein the reported UE-ESAI comprises: UE-ESAI associated with a period of time during which the UE was connected with the first network node, and/or UE-ESAI associated with a period of time during which the UE was connected with the second network node.

A13b. The method of embodiment A11 or A2, wherein the UE-ESAI configuration causes the UE to send a second UE-ESAI message comprising a first UE-ESAI report to the first network node or to the second network node, wherein the first UE-ESAI report comprises: UE-ESAI associated with a period of time during which the UE was connected with the first network node, and/or UE-ESAI associated with a period of time during which the UE was connected with the second network node.

A14. The method of any one of embodiments A1-A13b, further comprising the first network node transmitting to the second network node a third coordination message (963) indicating a successful or unsuccessful termination of the coordination procedure.

A15. The method of any one of embodiments A1-A13b, further comprising the first network node transmitting to the second network node a third coordination message (963) comprising information associated with a UE-ESAI configuration determined for the UE based on information or an acknowledgment received from the second network node.

A16. The method of any one of embodiments A1-A15, further comprising the first network node receiving a fourth coordination message (1002) transmitted by the second network node indicating a successful or unsuccessful termination of the coordination procedure.

A17. The method of any one of embodiments A1-A15, further comprising the first network node receiving a fifth coordination message (1302) transmitted by the second network node, the fifth coordination message comprising at least a first UE-ESAI report associated with a UE or a group of UEs.

A18. The method of embodiment A17, wherein the first UE-ESAI report comprises UE-ESAI associated with the UE when connected to the first and/or to the second network node.

A19. The method of embodiment A17 or A18, wherein the first UE-ESAI report comprises UE-ESAI that the UE transmitted to the second network node when the UE has completed a mobility event from the first network node to the second network node.

A20. The method of any one of embodiments A1-A19, further comprising, before a mobility event, the first network node configuring the UE to store and/or report the UE-ESAI (e.g., prior to the mobility event, the first network node may have transmitted a UE-ESAI configuration to the UE which configured the UE to store UE-ESAI).

A21. The method of any one of embodiments A17-A20, further comprising the first network node using the first UE-ESAI report to generate a UE configuration for the UE.

A22. The method of any one of embodiments A17-A21, wherein the fifth coordination message further comprise a UE-ESAI configuration and/or an indication of a UE state corresponding to the report (the UE state information may include: i) antenna configuration, Carrier Aggregation and transmission mode; ii) traffic information; iii) service type; iv) mobility information; and/or radio related measurements, such as RSRP, RSRQ, RSSI, Timing advance (distance to Base Station)).

A23. The method of any one of embodiments A17-A22, wherein the fifth coordination message further comprises a UE configuration associated with the first UE-ESAI report, wherein the UE configuration included in the fifth coordination message may be a new or modified configuration that the second network node has applied to the UE after the mobility event and with respect to which the UE has stored and/or reported UE-ESAI to the second network node.

A24. The method of any one of embodiments A17-A23, wherein the fifth coordination message comprises multiple UE-ESAI reports from one or more UEs.

A25. The method of any one of embodiments A17-A24, wherein the first UE-ESAI report comprises combined and/or aggregated and/or processed information associated with one or multiple UE-ESAI reports.

A26. The method of embodiment A25, wherein the first UE-ESAI report comprises statistical measurements, such as standard average, deviation, maximum and minimum values for at least a type of energy metric comprised in the UE-ESAI report(s) received from one or more UEs.

Figure 24:
FIG. 24. is a flowchart illustrating a process according to some embodiments.

B1. A method (2400) (see FIG. 24) performed by a second network node (902) for coordinating with a first network node (901) with respect to a user equipment, UE, energy state assistance information, UE-ESAI, configuration for a UE (900) or a group of UEs currently being served by the first network node, the method comprising: receiving (s2402) a first coordination message transmitted by the first network node; and processing (s2404) the received first coordination message (e.g., obtaining information included in the message), wherein the first coordination message comprises information related to configuring the UE or the group of UEs to store and/or report UE-ESAI, and the UE-ESAI comprises a measured or estimated energy metric.

B2. The method of embodiment B1, wherein the information related to configuring the UE or the group of UEs comprises a recommended UE-ESAI configuration for the UE or the group of UEs.

B3. The method of embodiment B1 or B2, wherein the information related to configuring the UE or the group of UEs to store and/or report UE-ESAI comprises a request to the second network node for the second network node to provide one or more configuration parameters that should be used for configuring the UE or the group of UE to store and/or report UE-ESAI.

B4. The method of any one of embodiments B1-B3, further comprising: generating information related to configuring the UE or the group of UEs to store and/or report UE-ESAI based on the information included in the first coordination message; and transmitting to the first network node a second coordination message comprising the information related to configuring the UE or the group of UEs to store and/or report UE-ESAI.

B4.1. The method of embodiment B4, wherein the information related to configuring the UE or the group of UEs to store and/or report UE-ESAI comprises: a UE-ESAI configuration produced by the second network node; an indication to the first network node to configure the UE or group of UE to store and report UE-ESAI to the second network node; and/or a UE-ESAI configuration recommended or preferred by the first network node.

B5. The method of any one of embodiments B1-B4.1, wherein the UE-ESAI comprises a first energy metric, and the first energy metric comprises: an energy consumption metric indicating an amount of energy consumed by the UE over a certain period of time, an energy consumption metric indicating an estimated amount of energy that the UE is expected to consume over a certain period of time, an estimated or measured energy efficiency metric, a battery metric (e.g., a metric indicating a battery lifetime increase or decrease or a metric indicating battery energy saved), a power metric indicating an average rate at which the UE consumed energy during a given period of time, a power metric indicating an estimate average rate at which the UE is expected to consume energy during a given period of time, or an estimated or measured power efficiency metric.

B6. The method of any one of embodiments B1-B5, wherein the first energy metric is associated with a first configuration, and the first configuration comprises: a Discontinuous Transmission, DTX, configuration, a Multiple-Input-Multiple-Output, MIMO, configuration, a Radio Resource Management, RRM, measurement configuration, a Carrier Aggregation, CA, configuration, a dual connectivity configuration a Quality-of-Service, QoS, configuration, or a Quality-of-Experience, QoE, configuration.

B6.1. The method of embodiment B6, wherein the UE-ESAI further comprises a second energy metric that is associated with a second configuration.

B7. The method of any one of embodiments B1-B6.1, wherein receiving the first coordination message comprises: receiving a handover request message transmitted by the first network node, wherein the handover message comprises the first coordination message.

B8. The method of embodiment B7, further comprising: transmitting to the first network node a handover response in response to the handover request, wherein the handover response comprises a second coordination message, and the second coordination message comprises information related to configuring the UE or the group of UEs to store and/or report UE-ESAI.

B9. The method of any one of embodiments B1-B8, further comprising: transmitting to the UE a first UE-ESAI message comprising a UE-ESAI configuration comprising configuration information related to configuring the UE to store and/or report UE-ESAI (e.g., the UE-ESAI configuration may contain configuration information specifying the type or types of UE-ESAI that the UE should store and report).

B10. The method of embodiment B9, wherein the UE-ESAI configuration comprises an instruction for causing the UE to transmit to a target node a UE-ESAI report after or during a handover process for handing the UE over to the target node.

B11. The method of any one of embodiments B1-B10, further comprising the second network node receiving a third coordination message (963) transmitted by the first network node, the third coordination message indicating a successful or unsuccessful termination of the coordination procedure.

B12. The method of any one of embodiments B1-B11, further comprising the second network node receiving a third coordination message (963) transmitted by the first network node, the third coordination message comprising information associated with a UE-ESAI configuration determined by the first network node for the UE based on information or an acknowledgment received from the second network node.

B13. The method of any one of embodiments B1-B12, further comprising the second network node transmitting a fourth coordination message (1002) to the first network node, the fourth coordination message indicating a successful or unsuccessful termination of the coordination procedure.

B14. The method of any one of embodiments B1-B12, further comprising the second network node transmitting to the first network node a fifth coordination message (1302), the fifth coordination message comprising at least a first UE-ESAI report associated with a UE or a group of UEs.

B15. The method of embodiment B14, wherein the first UE-ESAI report comprises UE-ESAI associated with the UE when connected to the first and/or to the second network node.

B16. The method of embodiment B14 or B15, wherein the first UE-ESAI report comprises UE-ESAI that the UE transmitted to the second network node when the UE has completed a mobility event from the first network node to the second network node.

B17. The method of any one of embodiments B14-B16, wherein the fifth coordination message further comprise a UE-ESAI configuration and/or an indication of a UE state corresponding to the report (the UE state information may include: i) antenna configuration, Carrier Aggregation and transmission mode; ii) traffic information; iii) service type; iv) mobility information; and/or radio related measurements, such as RSRP, RSRQ, RSSI, Timing advance (distance to Base Station)).

B18. The method of any one of embodiments B14-B17, wherein the fifth coordination message further comprises a UE configuration associated with the first UE-ESAI report, wherein the UE configuration included in the fifth coordination message may be a new or modified configuration that the second network node has applied to the UE after the mobility event and with respect to which the UE has stored and/or reported UE-ESAI to the second network node.

B19. The method of any one of embodiments B14-B18, wherein the fifth coordination message comprises multiple UE-ESAI reports from one or more UEs.

B20. The method of any one of embodiments B14-B18, wherein the first UE-ESAI report comprises combined and/or aggregated and/or processed information associated with one or multiple UE-ESAI reports.

B21. The method of embodiment B20, wherein the first UE-ESAI report comprises statistical measurements, such as standard average, deviation, maximum and minimum values for at least a type of energy metric comprised in the UE-ESAI report(s) received from one or more UEs.

B22. The method of embodiment B4, further comprising generating a UE-ESAI configuration based on the information included in the first coordination message, wherein the information related to configuring the UE or the group of UEs to store and/or report UE-ESAI that is included in the second coordination message comprises the UE-ESAI configuration.

B23. The method of embodiment B4, wherein the information related to configuring the UE or the group of UEs to store and/or report UE-ESAI that is included in the second coordination message comprises information for indicating to the first network node that the first network node should configure the UE for storing and/or reporting UE-ESAI.

B24. The method of any one of embodiments B1-B23, further comprising the second network node transmitting to the UE a third UE-ESAI message for: triggering the UE to send a UE-ESAI report; requesting the UE to send a UE-ESAI report; and/or configuring the UE to continue storing and/or reporting UE-ESAI while the UE is connected to the second network node.

C1. A method (2500) (see FIG. 25) performed by a user equipment, UE, for reporting UE energy state assistance information, UE-ESAI, the method comprising: receiving (s2502) a first UE-ESAI message transmitted by a first network node, the first UE-ESAI message comprising a UE-ESAI configuration for configuring the UE to store and/or report UE-ESAI to the first network node and/or to a second network node, wherein the UE-ESAI comprises a measured or estimated energy metric.

C2. The method of embodiment C1, further comprising: transmitting a second UE-ESAI message to the first network node and/or the second network node, the second UE-ESAI message comprising a first UE-ESAI report comprising UE-ESAI stored by the UE.

C3. The method of embodiment C1 or C2, further comprising: receiving a handover command transmitted by the first network node; and in response to receiving the handover command, initiating an handover process, wherein the handover process comprises the UE transmitting a message to the second network node, and the message includes the UE-ESAI report.

C4. The method of embodiment C3, wherein the message is a Radio Resource Control (RRC) message or a random access channel (RACH) message transmitted as part of a process for establishing an RRC connection with the second network node.

C5. The method of any one of embodiments C1-C4, wherein the UE-ESAI comprises a first energy metric, and the first energy metric comprises: an energy consumption metric indicating an amount of energy consumed by the UE over a certain period of time, an energy consumption metric indicating an estimated amount of energy that the UE is expected to consume over a certain period of time, an estimated or measured energy efficiency metric, a battery metric (e.g., a metric indicating a battery lifetime increase or decrease or a metric indicating battery energy saved), a power metric indicating an average rate at which the UE consumed energy during a given period of time, a power metric indicating an estimate average rate at which the UE is expected to consume energy during a given period of time, or an estimated or measured power efficiency metric.

C6. The method of any one of embodiments C1-C5, further comprising: receiving a UE-ESAI message transmitted by the second network node, the UE-ESAI message transmitted by the second network node requesting the UE to report part of or the complete set of the UE-ESAI stored by the UE.

D1. A computer program (2643) comprising instructions (2644) which when executed by processing circuitry (2655) of a first network node (901) causes the first network node to perform the method of any one of embodiments A1-A26.

D2. A carrier containing the computer program of embodiment D1, wherein the carrier is one of an electronic signal, an optical signal, a radio signal, and a computer readable storage medium (2642).

D3. A first network node apparatus (1500) that is configured to perform the method of any one of embodiments A1-A26.

E1. A computer program (2643) comprising instructions (2644) which when executed by processing circuitry (2655) of a second network node (902) causes the second network node to perform the method of any one of embodiments B1-B24.

E2. A carrier containing the computer program of embodiment E1, wherein the carrier is one of an electronic signal, an optical signal, a radio signal, and a computer readable storage medium (2642).

E3. A second network node apparatus (1500) that is configured to perform the method of any one of embodiments B1-B24.

F1. A computer program (2743) comprising instructions (2744) which when executed by processing circuitry (2755) of a UE (901) causes the UE to perform the method of any one of embodiments C1-C6.

F2. A carrier containing the computer program of embodiment E1, wherein the carrier is one of an electronic signal, an optical signal, a radio signal, and a computer readable storage medium (2742).

F3. A UE (901) that is configured to perform the method of any one of embodiments C1-C6.

XA1. A method (3100) performed by a user equipment, UE (2802), the method comprising: receiving (s3102) a first message transmitted by a first network node (2812), wherein the first message comprises configuration information related to configuring the UE or a group of UEs (2850) including the UE to store and/or report UE energy state assistance information, UE-ESAI; and after receiving the first message, transmitting (s3104) to any one or more of the first network node (2812), a second network node (2814, 2816, 2818, or 2820), or a group of network nodes (2860) a second message comprising UE-ESAI, wherein the UE-ESAI included in the second message comprises an energy metric.

XA2. The method of embodiment XA1, wherein the configuration information includes any one or more of: a set of one or more collect-parameters related to collecting UE-ESAI, a set of one or more contents of UE-ESAI, or a set of one or more report-parameters related to reporting stored UE-EASI.

XA3. The method of embodiment XA2, wherein the set of one or more collect-parameters indicates any one or more of: a collecting time interval during which UE-ESAI is to be stored in the UE, a validity time interval during which stored UE-ESAI is valid, a size limit of UE-ESAI to be stored at the UE, a maximum number of cells or network nodes that can be associated with UE-ESAI, a frequency of collecting UE-ESAI at the UE, one or more conditions under which collecting and/or storing UE-ESAI is enabled and/or disabled, or one or more conditions upon which collecting UE-ESAI can continue.

XA4. The method of embodiment XA2 or XA3, wherein the set of one or more collect-parameters indicates one or more conditions under which the UE should start, stop, pause, resume, continue, and/or modify UE-ESAI collecting process.

XA5. The method of embodiment XA4, wherein said one or more conditions are based on the level of an energy metric included in UE-ESAI collected at the UE with respect to one or more threshold levels.

XA6. The method of any of embodiments XA2-XA5, wherein the set of one or more report-parameters indicates any one or more of: a reporting periodicity for UE-ESAI, whether reporting of UE-ESAI should be made once or continuously, one or more conditions that trigger reporting of UE-ESAI, one or more conditions that prevent reporting of UE-ESAI, one or more report destination cells or nodes for reporting of UE-ESAI, or one or more conditions for partial reporting or full reporting of UE-ESAI.

XA7. The method of embodiment XA6, wherein said one or more conditions that trigger reporting of UE-ESAI comprises any one or more of: an occurrence of a mobility event, a configuration or a reconfiguration of UE Access Stratum, receiving a request transmitted by a network entity, the size of collected UE-ESAI reaching a threshold size, a change of services provided by an application layer, an energy metric included in collected UE-ESAI satisfying a particular condition with respect to a threshold energy level, a battery level of the UE satisfying a particular condition with respect to a threshold battery level, or a radio coverage of the UE satisfying a particular condition with respect to a threshold radio coverage.

XA8. The method of any one of embodiments XA2-XA7, wherein the set of one or more contents of UE-ESAI comprises any one or more of: a time interval during which UE-ESAI is collected, one or more time stamps associated with UE-ESAI collection, one or more energy metrics, or UE related information.

XA9. The method of embodiment XA8, wherein said one or more energy metrics are (i) measured and/or predicted energy consumption of the UE, (ii) measured and/or predicted energy efficiency of the UE, and/or (iii) measured and/or predicted energy saving amount.

XA10. The method of embodiment XA8 or XA9, wherein said one or more energy metrics are associated with one or more UE configurations.

XA11. The method of embodiment XA10, wherein said one or more UE configurations comprises any one or more of: one or more discontinuous transmission (DTX) configuration, MIMO transmission mode, MIMO configuration, radio measurements, carrier aggregation configuration, dual connectivity configuration, quality of service (QoS) configuration, or quality of experience (QoE) configuration.

XA12. The method of any of embodiments XA8-XA11, wherein the UE related information indicates any one or more of: a model of the UE, an operating system running on the UE, and/or a Type Allocation Code (TAC), radio related measurements, a time duration during which a particular level or range of values for at least one of signal strength, quality, or interference persists, information related to mobility events, connection reestablishment, radio link failures, and/or RACH attempts, AS stratum configuration, information related to UE's dual connectivity, information about a network node or a cell serving the UE, per-RRC state usage, number of transitions between RRC states, service-related information, volume of uplink and/or downlink data, operating conditions of the UE, or end-user behaviors.

XA13. The method of any of embodiments XA8-XA12, wherein said one or more energy metrics are associated with any one or more the following network configurations: TDD pattern configurations, spectrum sharing configurations, configuration of unlicensed spectrum, downlink or uplink reference signal configuration, number of configured or available component carriers at a network node, dual connectivity configuration, transmission mode configured in one or more radio cells of a network node, MIMO transmission mode, bandwidth configuration, downlink transmission power configuration, cell sleeping mode, or entry and/or exit conditions related to mobility events.

XA14. The method of any of embodiments XA1-XA13, the method comprising: receiving a request for capability information indicating the UE's capability of collecting, storing, and/or reporting UE-ESAI, wherein the request was transmitted by the first network node; and transmitting to the first network node the capability information.

XA15. The method of any of embodiments XA1-XA14, wherein the first message is an RRCReconfiguration message which is configured to trigger the UE to modify an RRC connection, and the second message is a Measurement Report message.

XA16. The method of any of embodiments XA1-XA14, wherein the first message is an UE Information Request message, and the second message is an UE Information Response message.

XB1. A method (3200) performed by a network node (2812), the method comprising: (i) transmitting (s3202) to a user equipment, UE (2802) or (ii) broadcasting a first message, wherein the first message comprises configuration information related to configuring the UE or a group of UEs including the UE to store and/or report UE energy state assistance information, UE-ESAI; and after transmitting or broadcasting the first message, receiving (s3204) a second message comprising UE-ESAI, wherein the second message was transmitted by the UE, and the UE-ESAI included in the second message comprises an energy metric.

XB2. The method of embodiment XB1, wherein the configuration information includes any one or more of: a set of one or more collect-parameters related to collecting UE-ESAI, a set of one or more contents of UE-ESAI, or a set of one or more report-parameters related to reporting stored UE-EASI.

XB3. The method of embodiment XB2, wherein the set of one or more collect-parameters indicates any one or more of: a collecting time interval during which UE-ESAI is to be stored in the UE, a validity time interval during which stored UE-ESAI is valid, a size limit of UE-ESAI to be stored at the UE, a maximum number of cells or network nodes that can be associated with UE-ESAI, a frequency of collecting UE-ESAI at the UE, one or more conditions under which collecting and/or storing UE-ESAI is enabled and/or disabled, or one or more conditions upon which collecting UE-ESAI can continue.

XB4. The method of embodiment XB2 or XB3, wherein the set of one or more collect-parameters indicates one or more conditions under which the UE should start, stop, pause, resume, continue, and/or modify UE-ESAI collecting process.

XB5. The method of embodiment XB4, wherein said one or more conditions are based on the level of an energy metric included in UE-ESAI collected at the UE with respect to one or more threshold levels.

XB6. The method of any of embodiments XB2-XB5, wherein the set of one or more report-parameters indicates any one or more of: a reporting periodicity for UE-ESAI, whether reporting of UE-ESAI should be made once or continuously, one or more conditions that trigger reporting of UE-ESAI, one or more conditions that prevent reporting of UE-ESAI, one or more report destination cells or nodes for reporting of UE-ESAI, or one or more conditions for partial reporting or full reporting of UE-ESAI.

XB7. The method of embodiment XB6, wherein said one or more conditions that trigger reporting of UE-ESAI comprises any one or more of: an occurrence of a mobility event, a configuration or a reconfiguration of UE Access Stratum, receiving a request transmitted by a network entity, the size of collected UE-ESAI reaching a threshold size, a change of services provided by an application layer, an energy metric included in collected UE-ESAI satisfying a particular condition with respect to a threshold energy level, a battery level of the UE satisfying a particular condition with respect to a threshold battery level, or a radio coverage of the UE satisfying a particular condition with respect to a threshold radio coverage.

XB8. The method of any one of embodiments XB2-XB7, wherein the set of one or more contents of UE-ESAI comprises any one or more of: a time interval during which UE-ESAI is collected, one or more time stamps associated with UE-ESAI collection, one or more energy metrics, or UE related information.

XB9. The method of embodiment XB8, wherein said one or more energy metrics are (i) measured and/or predicted energy consumption of the UE, (ii) measured and/or predicted energy efficiency of the UE, and/or (iii) measured and/or predicted energy saving amount.

XB10. The method of embodiment XB8 or XB9, wherein said one or more energy metrics are associated with one or more UE configurations.

XB11. The method of embodiment XB10, wherein said one or more UE configurations comprises any one or more of: one or more discontinuous transmission (DTX) configuration, MIMO transmission mode, MIMO configuration, radio measurements, carrier aggregation configuration, dual connectivity configuration, quality of service (QoS) configuration, or quality of experience (QoE) configuration.

XB12. The method of any of embodiments XB8-XB11, wherein the UE related information indicates any one or more of: a model of the UE, an operating system running on the UE, and/or a Type Allocation Code (TAC), radio related measurements, a time duration during which a particular level or range of values for at least one of signal strength, quality, or interference persists, information related to mobility events, connection reestablishment, radio link failures, and/or RACH attempts, AS stratum configuration, information related to UE's dual connectivity, information about a network node or a cell serving the UE, per-RRC state usage, number of transitions between RRC states, service-related information, volume of uplink and/or downlink data, operating conditions of the UE, or end-user behaviors.

XB13. The method of any of embodiments XB8-XB12, wherein said one or more energy metrics are associated with any one or more the following network configurations: TDD pattern configurations, spectrum sharing configurations, configuration of unlicensed spectrum, downlink or uplink reference signal configuration, number of configured or available component carriers at a network node, dual connectivity configuration, transmission mode configured in one or more radio cells of a network node, MIMO transmission mode, bandwidth configuration, downlink transmission power configuration, cell sleeping mode, or entry and/or exit conditions related to mobility events.

XB14. The method of any of embodiments XB1-XB13, the method comprising: receiving a request for capability information indicating the UE's capability of collecting, storing, and/or reporting UE-ESAI, wherein the request was transmitted by the first network node; and transmitting to the first network node the capability information.

XB15. The method of any of embodiments XB1-XB14, wherein the first message is an RRCReconfiguration message which is configured to trigger the UE to modify an RRC connection, and the second message is a Measurement Report message.

XB16. The method of any of embodiments XB1-XB14, wherein the first message is an UE Information Request message, and the second message is an UE Information Response message.

XC1. A computer program (2743) comprising instructions (2744) which when executed by processing circuitry (2755) of a user equipment (2802) causes the user equipment to perform the method of any one of embodiments XA1-XA16.

XC2. A carrier containing the computer program of embodiment XC1, wherein the carrier is one of an electronic signal, an optical signal, a radio signal, and a computer readable storage medium (2742).

XD1. A user equipment (2802) that is configured to perform the method of any one of embodiments XA1-XA16.

XE1. A computer program (2643) comprising instructions (2644) which when executed by processing circuitry (2655) of a network node (2812) causes the network node to perform the method of any one of embodiments XB1-XB16.

XE2. A carrier containing the computer program of embodiment XE1, wherein the carrier is one of an electronic signal, an optical signal, a radio signal, and a computer readable storage medium (2642).

XF1. A network node apparatus (2812) that is configured to perform the method of any one of embodiments XB1-XB16.

YA1. A method performed by a first node (3302) for optimizing energy savings configurations, the method comprising: receiving at the first node (3302) a first message (33310) transmitted by a second node (3304), wherein the first node (3302) and the second node (3304) are in a communication network that serves one or more user equipments (UEs), and wherein the first message (33310) comprises one or more UE-related energy state assistance information (UE-ESAI), each UE-ESAI being associated with a UE; and optimizing one or more of (i) an energy savings configuration for one or more UEs of the UEs associated with the one or more UE-ESAI; and (ii) an energy savings configuration for the first node (3302), wherein the optimizing is based on the one or more UE-ESAI.

YA2. The method of embodiment YA1, wherein for each of the one or more UE-ESAI being associated with a UE, either the second node (3304) serves or has served the UE or the second node (3304) stores the UE-ESAI and the UE is served or has been served by another node.

YA3. The method of any one of embodiments YA1-YA2, further comprising: transmitting a second message to the second node (3304), wherein the second message comprises a request for one or more UE-ESAI available at the second node (3304), each UE-ESAI being associated with a UE.

YA4. The method of embodiment YA3, further comprising: receiving a third message transmitted by the second node (3304), wherein the third message comprises a positive acknowledgement (ACK) or a negative acknowledgement (NACK) corresponding to the information requested by the second message.

YA5. The method of any one of embodiments YA1-YA4, further comprising: receiving a fourth message transmitted by a third node (3902), wherein the fourth message comprises a request for one or more UE-ESAI, each UE-ESAI being associated with a UE.

YA6. The method of embodiment YA5, wherein the request for one or more UE-ESAI comprises an indication that the first node (3302) is requesting one or more of: UE-ESAI associated to one or more user devices (i) served by the first network node (3302), (ii) served the second network node (3304) and (iii) served by network nodes different from the first (3302) or second (3304) node.

YA8. The method of any one of embodiments YA1-YA6, further comprising: transmitting a fifth message to a third node (3902), wherein the fifth message comprises one or more UE-ESAI available at the first node (3302).

YA9. The method of embodiment YA8, wherein transmitting the fifth message to the third node (3902) is performed in response to receiving the fourth message transmitted by the third node (3902).

YA10. The method of any one of embodiments YA5-YA9, wherein the third node (3902) comprises one of an Operations, Administration, and Maintenance (OAM) node, a Service Management and Orchestration (SMO) node, and an entity external to a Radio Access Network (RAN).

YA11. The method of any one of embodiments YA1-YA10, wherein optimizing comprises using an artificial intelligence (AI) or machine-learning (ML) based model or algorithm, the method further comprising creating or updating the AI or ML based model or algorithm based on the UE-ESAI received at the first node (3302).

YA12. The method of any one of embodiments YA1-YA10, wherein optimizing comprises using an artificial intelligence (AI) or machine-learning (ML) based model or algorithm, the method further comprising transmitting model or algorithm training parameters for the AI or ML based model or algorithm to the second node (3304) and receiving updated model or algorithm training parameters for the AI or ML based model or algorithm transmitted by the second node (3304).

YA13. The method of any one of embodiments YA1-YA12, wherein the one or more UE-ESAI each comprise a UE-ESAI metric, wherein the UE-ESAI metric comprises one or more of device-specific information related to any or all of energy, power, energy efficiency, energy savings, power efficiency, power savings, energy consumption, power consumption, and a variation of any of these.

YA14. The method of embodiment YA13, wherein the UE-ESAI metric further includes one or more of: information associated to a UE specific radio configuration; information related to sensor information and/or end-user behavior; and information pertaining to operational conditions and/or configurations under which UE-ESAI is stored.

YA15. The method of any one of embodiments YA1-YA14, wherein the first message (33310) comprises a single batch message containing each of the one or more UE-ESAI.

YA16. The method of any one of embodiments YA1-YA14, wherein the first message (33310) comprises multiple messages collectively containing each of the one or more UE-ESAI.

YA17. The method of any one of embodiments YA1-YA16, wherein the one or more UE-ESAI are associated with a category of UE.

YA18. The method of embodiment YA17, wherein the category of UE comprises one or more of: UEs served by the second node (3304), UEs with specified capabilities, and UEs fulfilling one or more conditions or requirements related to traffic and/or signal strength and/or signal quality and/or quality of service (QoS) and/or quality of experience (QoE).

YA19. The method of any one of embodiments YA3-YA18, wherein the request for one or more UE-ESAI in the second message comprises a category request such that the requested UE-ESAI are associated with a category of UE.

YA20. The method of any one of embodiments YA1-YA19, wherein the first message (33310) further comprises, for each of the one or more UE-ESAI, one or more of a time stamp and information indicating a configuration used by or applied to the associated UE.

YA21. The method of any one of embodiments YA1-YA20, wherein the first message (33310) is received at the first node (3302) in connection with a handover request initiated by the second node (3304).

YA22. The method of embodiment YA21, wherein the first message (33310) is comprised within a handover request message transmitted by the second node (3304) and associated to a UE served by the second node (3304).

YA23. The method of any one of embodiments YA3-YA22, wherein the second message is transmitted to the second node (3304) in connection with a handover response message responsive to a handover request transmitted by the second node (3304).

YA24. The method of any one of embodiments YA4-YA23, wherein the third message further comprises an indication of the information available in the one or more UE-ESAI in the second node (3304).

YA25. The method of any one of embodiments YA1-YA24, wherein the first node (3302) is a first Radio Access Network (RAN) node and the second node (3304) is a second RAN node.

YA26. The method of any one of embodiments YA3-YA25, wherein the second message further comprises information relating to reporting of UE-ESAI, the information comprising one or more of: a reporting periodicity; a one-time reporting; a reporting criteria; a predetermined, minimum or a maximum number of user device UE-ESAI reports; a percentage of user device UE-ESAI reports; a relevant time window; a set of relevant categories of user devices; a network node source identifier; a traffic threshold; a set of relevant configurations; a list of instructions to start, stop, pause, or modify reporting; and a set of filtering criteria.

YB1. A method performed by a second node (3304) for optimizing energy savings configurations, the method comprising: transmitting to a first node (3302) a first message (33310), wherein the first node (3302) and the second node (3304) are in a communication network that serves one or more user equipments (UEs), and wherein the first message (33310) comprises one or more UE-related energy state assistance information (UE-ESAI), each UE-ESAI being associated with a UE.

YB2. The method of embodiment YB1, wherein for each of the one or more UE-ESAI being associated with the UE, either the second node (3304) serves or has served the UE or the second node (3304) stores the UE-ESAI and the UE is served or has been served by another node.

YB3. The method of any one of embodiments YB1-YB2, further comprising: receiving a second message transmitted by the first node (3302), wherein the second message comprises a request for one or more UE-ESAI available at the second node (3304), each UE-ESAI being associated with a UE.

YB4. The method of embodiment YB3, further comprising: transmitting to the first node (3302) a third message, wherein the third message comprises a positive acknowledgement (ACK) or a negative acknowledgement (NACK) corresponding to the information requested by the second message.

YB5. The method of any one of embodiments YB1-YB4, further comprising receiving model training parameters transmitted by first node (3302) for an artificial intelligence (AI) or machine learning (ML) based model and transmitting to the first node (3302) updated model training parameters for the AI or ML based model.

YB6. The method of any one of embodiments YB1-YB5, wherein the one or more UE-ESAI each comprise a UE-ESAI metric, wherein the UE-ESAI metric comprises one or more of device-specific information related to any or all of energy, power, energy efficiency, energy savings, power efficiency, power savings, energy consumption, power consumption, and a variation of any of these.

YB7. The method of embodiment YB6, wherein the UE-ESAI metric further includes one or more of: information associated to a UE specific radio configuration; information related to sensor information and/or end-user behavior; and information pertaining to operational conditions and/or configurations under which UE-ESAI is stored.

YB8. The method of any one of embodiments YB1-YB7, wherein the first message (33310) comprises a single batch message containing each of the one or more UE-ESAI.

YB9. The method of any one of embodiments YB1-YB7, wherein the first message (33310) comprises multiple messages collectively containing each of the one or more UE-ESAI.

YB10. The method of any one of embodiments YB1-YB9, wherein the one or more UE-ESAI are associated with a category of UE.

YB11. The method of embodiment YB10, wherein the category of UE comprises one or more of: UEs served by the second node (3304), UEs with specified capabilities, and UEs fulfilling one or more conditions or requirements related to traffic and/or signal strength and/or signal quality and/or quality of service (QoS) and/or quality of experience (QoE).

YB12. The method of any one of embodiments YB3-YB11, wherein the request for one or more UE-ESAI in the second message comprises a category request such that the requested UE-ESAI are associated with a category of UE.

YB13. The method of any one of embodiments YB1-YB12, wherein the first message (33310) further comprises, for each of the one or more UE-ESAI, one or more of a time stamp and information indicating a configuration used by or applied to the associated UE.

YB14. The method of any one of embodiments YB1-YB13, wherein the first message (33310) is transmitted to the first node (3302) in connection with a handover request initiated by the second node (3304).

YB15. The method of embodiment YB14, wherein the first message (33310) is comprised within a handover request message transmitted by the second node (3304) and associated to a UE served by the second network node (3304).

YB16. The method of any one of embodiments YB3-YB15, wherein the second message is received at the second node (3304) in connection with a handover response message transmitted by the first node (3302) and responsive to a handover request transmitted by the second node (3304).

YB17. The method of any one of embodiments YB4-YB16, wherein the third message further comprises an indication of the information available in the one or more UE-ESAI in the second node (3304).

YB18. The method of any one of embodiments YB1-YB17, wherein the first node (3302) is a first Radio Access Network (RAN) node and the second node (3304) is a second RAN node.

YB19. The method of any one of embodiments YB3-YB25, wherein the second message further comprises information relating to reporting of UE-ESAI, the information comprising one or more of: a reporting periodicity; a one-time reporting; a reporting criteria; a predetermined, minimum or a maximum number of user device UE-ESAI reports; a percentage of user device UE-ESAI reports; a relevant time window; a set of relevant categories of user devices; a network node source identifier; a traffic threshold; a set of relevant configurations; a list of instructions to start, stop, pause, or modify reporting; and a set of filtering criteria.

YB20. The method of embodiment YB19, wherein transmitting to a first node (3302) a first message (33310) is based on the information relating to reporting of UE-ESAI.

YC1. A computer program (2643) comprising instructions which when executed by processing circuitry (2602) of a node (3302, 3304, 3902, 2600), causes the node (2600) to perform the method of any one of embodiments YA1-YA26 and YB1-YB20.

YC2. A carrier containing the computer program (2643) of embodiment YC1, wherein the carrier is one of an electronic signal, an optical signal, a radio signal, and a computer readable storage medium (2642).

YD1. A network node (3302, 3304, 3902, 2600), the network node comprising: processing circuitry (2602); and a memory, the memory containing instructions (2644) executable by the processing circuitry (2602), whereby the network node (3302, 3304, 3902, 2600) is configured to perform the method of any one the embodiments YA1-YA26 and YB1-YB20.

E1. A network node (3302, 2600) configured to optimizing energy savings configurations, the network node (3302, 2600) being a first node, the network node (3302, 2600) being further configured to: receive at the first node (3302, 2600) a first message (33310) transmitted by a second node (3304), wherein the first node (3302, 2600) and the second node (3304) are in a communication network that serves one or more user equipments (UEs), and wherein the first message (33310) comprises one or more UE-related energy state assistance information (UE-ESAI), each UE-ESAI being associated with a UE; and optimize one or more of (i) an energy savings configuration for one or more UEs of the UEs associated with the one or more UE-ESAI; and (ii) an energy savings configuration for the first node, wherein the optimizing is based on the one or more UE-ESAI.

E2. The network node of embodiment E1, wherein the network node (3302, 2600) is further configured to perform the method of any one of embodiments YA2-YA26.

F1. A network node (3304, 2600) configured to optimizing energy savings configurations, the network node (3304, 2600) being a second node, the network node (3304, 2600) being further configured to: transmit to a first node (3302) a first message (33310), wherein the first node (3302) and the second node (3304, 2600) are in a communication network that serves one or more user equipments (UEs), and wherein the first message (33310) comprises one or more UE-related energy state assistance information (UE-ESAI), each UE-ESAI being associated with a UE.

F2. The network node (3304, 2600) of embodiment F1, wherein the network node (3304, 2600) is further configured to perform the method of any one of embodiments YB2-YB20.

CONCLUSION

This disclosure provides methods for at least two network nodes to coordinate and determine a configuration for a UE to store and/or report UE-ESAI.

In the case of user mobility from a source node to a target node, the source node and the target node can coordinate and negotiate a configuration for the UE to store the UE-ESAI prior to, and/or during, and/or after the mobility event. Thereby, the source node can configure UE to collect the UE-ESAI when the UE is still connected to the source node (e.g., when the UE has an RRC connection with the source node) and/or when the UE is connected to the target node (e.g., when the UE has established a new RRC connection with the target node). The UE can additionally be configured to report the stored UE-ESAI either to the source node (prior to the completion of the mobility event) or to the target node (upon a successful completion of the mobility event) or to both the source and the target node.

This disclosure also provides methods for the second network node to retrieve the UE-ESAI that a UE(s) has (have) been configured to store by a first network node. Examples of retrieval methods may consist of triggering and/or (re)configuring and/or requesting the UE(s) to report the available UE-ESAI. In one example, UE-ESAI related configuration may have been issued to UE(s) prior to a mobility event from the first network node (i.e., the source node) to the second network node (the target node).

This disclosure provides embodiments wherein the second network node receives reports of UE-ESAI from at least a UE pre-configuration for reporting UE-ESAI. In this case, the UE is assumed to be configured by a first network node to report UE-ESAI to the second network node.

This disclosure also provides embodiments wherein the second network node (re)configures UE(s) to report UE-ESAI. A configuration message may specify the UE-ESAI content the UE shall report, with what granularity (in time, frequency, space, etc), the reporting format, the radio resources to be used for reporting.

This disclosure also provides embodiments wherein the second network node requests UE(s) to report UE-ESAI (handshake procedure for reporting), that is the network node may request what UE-ESAI is available and request a subset or all the UE-ESAI, such as: UE-ESAI stored when UE connected to/served by a second network node and/or UE-ESAI stored when UE connected to/served by a first network node.

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first network node for coordinating with a second network node with respect to a user equipment (UE) energy state assistance information (UE-ESAI) configuration for a UE or a group of UEs currently being served by the first network node, the method comprising:

generating a first coordination message; and transmitting the first coordination message to the second network node, the first coordination message comprising information related to configuring the UE or the group of UEs to store and/or report UE-ESAI, the UE-ESAI comprising a measured or estimated first energy metric, and the UE-ESAI configuration causing the UE to send a second UE-ESAI message comprising a first UE-ESAI report to the first network node or to the second network node, the first UE-ESAI report comprising one or more of:

UE-ESAI associated with a period of time during which the UE was connected with the first network node; and/or UE-ESAI associated with a period of time during which the UE was connected with the second network node.

2. The method of claim 1, wherein the information related to configuring the UE or the group of UEs comprises:

a recommended or preferred UE-ESAI configuration for the UE or the group of UEs; and/or a request to the second network node for the second network node to provide to the first network node one or more configuration parameters that should be used by the first network node for configuring the UE or the group of UE to store and/or report UE-ESAI.

3. The method of claim 1, further comprising:

receiving a second coordination message transmitted by the second network node, wherein the second coordination message comprises a UE-ESAI configuration generated by the second network node based on the information included in the first coordination message.

4. The method of claim 1, further comprising:

transmitting to the UE a first UE-ESAI message comprising a UE-ESAI configuration comprising configuration information related to configuring the UE to store and/or report UE-ESAI, wherein the UE-ESAI configuration comprises:

an instruction for causing the UE to transmit to a target node a UE-ESAI report after or during a handover process for handing the UE over to the target node; and/or an instruction for causing the UE to store UE-ESAI associated with a period of time during which the UE was connected with the first network node and/or UE-ESAI associated with a period of time during which the UE was connected with the second network node.

5. The method of claim 1, further comprising the first network node transmitting to the second network node a third coordination message comprising information associated with a UE-ESAI configuration determined for the UE based on information or an acknowledgment received from the second network node, or an indication of successful or unsuccessful termination of the coordination procedure.

6. The method of claim 1, further comprising the first network node receiving a fourth coordination message transmitted by the second network node indicating a successful or unsuccessful termination of the coordination procedure.

7. The method of claim 1, wherein the method further comprises the first network node receiving a fifth coordination message transmitted by the second network node, the fifth coordination message comprising at least a first UE-ESAI report associated with a UE or a group of UEs, and the first UE-ESAI report comprises UE-ESAI associated with the UE when connected to the first and/or to the second network node.

8. The method of claim 1, wherein the method further comprises the first network node receiving a fifth coordination message transmitted by the second network node, the fifth coordination message comprising at least a first UE-ESAI report associated with a UE or a group of UEs, and the first UE-ESAI report comprises UE-ESAI that the UE transmitted to the second network node when the UE has completed a mobility event from the first network node to the second network node.

9. The method of claim 1, further comprising the first network node receiving a fifth coordination message transmitted by the second network node, the fifth coordination message comprising at least a first UE-ESAI report associated with a UE or a group of UEs; and the first network node using the first UE-ESAI report to generate a UE configuration for the UE.

10. The method of claim 1, wherein the method further comprises the first network node receiving a fifth coordination message transmitted by the second network node, the fifth coordination message comprising at least a first UE-ESAI report associated with a UE or a group of UEs, and the fifth coordination message further comprises a UE configuration associated with the first UE-ESAI report, wherein the UE configuration included in the fifth coordination message may be a new or modified configuration that the second network node has applied to the UE after a mobility event and with respect to which the UE has stored and/or reported UE-ESAI to the second network node.

11. A method performed by a user equipment (UE) for reporting UE energy state assistance information (UE-ESAI) the method comprising:

receiving a first UE-ESAI message transmitted by a first network node, the first UE-ESAI message comprising a UE-ESAI configuration for configuring the UE to store and/or report UE-ESAI to the first network node and/or to a second network node, the UE-ESAI comprising a measured or estimated energy metric, and the UE-ESAI configuration causing the UE to send a second UE-ESAI message comprising a first UE-ESAI report to the first network node or to the second network node, the first UE-ESAI report comprising:

UE-ESAI associated with a period of time during which the UE was connected with the first network node, and/or UE-ESAI associated with a period of time during which the UE was connected with the second network node.

12. The method of claim 11, wherein the first UE-ESAI report further comprising UE-ESAI stored by the UE.

13. The method of claim 11, further comprising:

receiving a handover command transmitted by the first network node; and in response to receiving the handover command, initiating an handover process, wherein the handover process comprises the UE transmitting a message to the second network node, the message includes the UE-ESAI report, and the message is a Radio Resource Control (RRC) message or a random access channel (RACH) message transmitted as part of a process for establishing an RRC connection with the second network node.

14. The method of claim 11, wherein the UE-ESAI comprises a first energy metric, and the first energy metric comprises:

an energy consumption metric indicating an amount of energy consumed by the UE over a certain period of time, an energy consumption metric indicating an estimated amount of energy that the UE is expected to consume over a certain period of time, an estimated or measured energy efficiency metric, a battery metric, a power metric indicating an average rate at which the UE consumed energy during a given period of time, a power metric indicating an estimate average rate at which the UE is expected to consume energy during a given period of time, or an estimated or measured power efficiency metric.

15. The method of claim 11, wherein the method further comprises:

receiving a UE-ESAI message transmitted by the second network node, the UE-ESAI message transmitted by the second network node requesting the UE to report part of or the complete set of the UE-ESAI stored by the UE.

16. A non-transitory computer readable storage medium storing a computer program comprising instructions which when executed by processing circuitry of a first network node causes the first network node to:

generate a first coordination message; and transmit the first coordination message to the second network node, the first coordination message comprising information related to configuring the UE or the group of UEs to store and/or report UE-ESAI, the UE-ESAI comprising a measured or estimated first energy metric, and the UE-ESAI configuration causing the UE to send a second UE-ESAI message comprising a first UE-ESAI report to the first network node or to the second network node, the first UE-ESAI report comprising:

UE-ESAI associated with a period of time during which the UE was connected with the first network node, and/or UE-ESAI associated with a period of time during which the UE was connected with the second network node.

17. A first network node apparatus comprising processing circuitry configured to:

generate a first coordination message; and transmit the first coordination message to the second network node, the first coordination message comprising information related to configuring the UE or the group of UEs to store and/or report UE-ESAI, the UE-ESAI comprising a measured or estimated first energy metric, and the UE-ESAI configuration causing the UE to send a second UE-ESAI message comprising a first UE-ESAI report to the first network node or to the second network node, the first UE-ESAI report comprising:

UE-ESAI associated with a period of time during which the UE was connected with the first network node, and/or UE-ESAI associated with a period of time during which the UE was connected with the second network node.

18. A non-transitory computer readable storage medium storing a computer program comprising instructions which when executed by processing circuitry of a UE causes the UE to:

receive a first UE-ESAI message transmitted by a first network node, the first UE-ESAI message comprising a UE-ESAI configuration for configuring the UE to store and/or report UE-ESAI to the first network node and/or to a second network node, the UE-ESAI comprising a measured or estimated energy metric, and the UE-ESAI configuration causing the UE to send a second UE-ESAI message comprising a first UE-ESAI report to the first network node or to the second network node, the first UE-ESAI report comprising:

UE-ESAI associated with a period of time during which the UE was connected with the first network node, and/or UE-ESAI associated with a period of time during which the UE was connected with the second network node.

19. A user equipment (UE) comprising processing circuitry configured to:

receive a first UE-ESAI message transmitted by a first network node, the first UE-ESAI message comprising a UE-ESAI configuration for configuring the UE to store and/or report UE-ESAI to the first network node and/or to a second network node, the UE-ESAI comprising a measured or estimated energy metric, and the UE-ESAI configuration causing the UE to send a second UE-ESAI message comprising a first UE-ESAI report to the first network node or to the second network node, the first UE-ESAI report comprising:

UE-ESAI associated with a period of time during which the UE was connected with the first network node, and/or UE-ESAI associated with a period of time during which the UE was connected with the second network node.

\* \* \* \* \*